(12) United States Patent
Jung et al.

(10) Patent No.: US 8,733,952 B2
(45) Date of Patent: May 27, 2014

(54) METHODS AND SYSTEMS FOR COORDINATED USE OF TWO OR MORE USER RESPONSIVE PROJECTORS

(75) Inventors: Edward K. Y. Jung, Bellevue, WA (US);
Eric C. Leuthardt, St. Louis, MO (US);
Royce A. Levien, Lexington, MA (US);
Richard T. Lord, Tacoma, WA (US);
Robert W. Lord, Seattle, WA (US);
Mark A. Malamud, Seattle, WA (US);
John D. Rinaldo, Jr., Bellevue, WA (US); Lowell L. Wood, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 485 days.

(21) Appl. No.: 12/380,595

(22) Filed: Feb. 27, 2009

(65) Prior Publication Data

US 2009/0310104 A1 Dec. 17, 2009

Related U.S. Application Data

(63) Continuation-in-part of application No. 12/217,115, filed on Jun. 30, 2008, and a continuation-in-part of application No. 12/229,518, filed on Aug. 22, 2008, (Continued)

(51) Int. Cl.
*G03B 21/00* (2006.01)

(52) U.S. Cl.
USPC .......................................... 353/122

(58) Field of Classification Search
USPC .................................... 353/79, 122
See application file for complete search history.

(56) References Cited

U.S. PATENT DOCUMENTS 3,622,223 A 11/1971 Brakell
3,623,804 A 11/1971 Spreitzer (Continued)

FOREIGN PATENT DOCUMENTS

JP 2005-165129 A 6/2005
WO WO 2006/027855 A1 3/2006

(Continued)

OTHER PUBLICATIONS

U.S. Appl. No. 12/459,581, Jung et al.

(Continued)

*Primary Examiner* — Thanh Luu

(57) ABSTRACT

The present disclosure relates to systems and methods that are related to coordinated projection from two or more projectors.

37 Claims, 23 Drawing Sheets

Related U.S. Application Data

(63) and a continuation-in-part of application No. 12/214,422, filed on Jun. 17, 2008, and a continuation-in-part of application No. 12/217,118, filed on Jun. 30, 2008, now Pat. No. 8,403,501, and a continuation-in-part of application No. 12/217,116, filed on Jun. 30, 2008, now Pat. No. 8,430,515, and a continuation-in-part of application No. 12/217,123, filed on Jun. 30, 2008, now Pat. No. 8,540,381, and a continuation-in-part of application No. 12/217,135, filed on Jun. 30, 2008, now Pat. No. 8,376,558, and a continuation-in-part of application No. 12/217,117, filed on Jun. 30, 2008, now Pat. No. 8,608,321, and a continuation-in-part of application No. 12/218,269, filed on Jul. 11, 2008, now Pat. No. 8,384,005, and a continuation-in-part of application No. 12/218,266, filed on Jul. 11, 2008, and a continuation-in-part of application No. 12/218,267, filed on Jul. 11, 2008, and a continuation-in-part of application No. 12/218,268, filed on Jul. 11, 2008, and a continuation-in-part of application No. 12/220,906, filed on Jul. 28, 2008, now Pat. No. 8,641,203, and a continuation-in-part of application No. 12/229,534, filed on Aug. 22, 2008, and a continuation-in-part of application No. 12/229,519, filed on Aug. 22, 2008, and a continuation-in-part of application No. 12/229,505, filed on Aug. 22, 2008, now Pat. No. 8,602,564, and a continuation-in-part of application No. 12/229,536, filed on Aug. 22, 2008, and a continuation-in-part of application No. 12/229,508, filed on Aug. 22, 2008, and a continuation-in-part of application No. 12/286,731, filed on Sep. 30, 2008, and a continuation-in-part of application No. 12/286,750, filed on Sep. 30, 2008, now abandoned, and a continuation-in-part of application No. 12/290,240, filed on Oct. 27, 2008, now Pat. No. 8,267,526, and a continuation-in-part of application No. 12/290,241, filed on Oct. 27, 2008, now Pat. No. 8,308,304, and a continuation-in-part of application No. 12/291,019, filed on Oct. 30, 2008, and a continuation-in-part of application No. 12/291,024, filed on Oct. 30, 2008, and a continuation-in-part of application No. 12/291,023, filed on Oct. 30, 2008, and a continuation-in-part of application No. 12/291,025, filed on Oct. 30, 2008, and a continuation-in-part of application No. 12/322,063, filed on Jan. 27, 2009, and a continuation-in-part of application No. 12/322,875, filed on Feb. 5, 2009, and a continuation-in-part of application No. 12/322,867, filed on Feb. 5, 2009, and a continuation-in-part of application No. 12/380,571, filed on Feb. 27, 2009, and a continuation-in-part of application No. 12/380,582, filed on Feb. 27, 2009.

(56) References Cited

U.S. PATENT DOCUMENTS

| | | | |
|---|---|---|---|
| 3,644,027 | A | 2/1972 | Bennett |
| 3,874,787 | A | 4/1975 | Taylor |
| 3,905,695 | A | 9/1975 | Taylor |
| 4,012,133 | A | 3/1977 | Burton |
| 4,320,664 | A | 3/1982 | Rehn et al. |
| 4,684,136 | A | 8/1987 | Turner |
| 4,739,567 | A | 4/1988 | Cardin |
| 4,779,240 | A | 10/1988 | Dorr |
| 5,026,152 | A | 6/1991 | Sharkey |
| 5,469,258 | A | 11/1995 | Grasso |
| 5,515,079 | A | 5/1996 | Hauck |
| 5,581,637 | A | 12/1996 | Cass et al. |
| 5,581,783 | A | 12/1996 | Ohashi |
| 5,602,566 | A | 2/1997 | Motosyuku et al. |
| 5,635,725 | A | 6/1997 | Cooper |
| 5,689,287 | A | 11/1997 | Mackinlay et al. |
| 5,747,690 | A | 5/1998 | Park et al. |
| 5,757,490 | A | 5/1998 | Martin |
| 5,793,470 | A | 8/1998 | Haseltine et al. |
| 5,838,889 | A | 11/1998 | Booker |
| 5,902,030 | A | 5/1999 | Blanchard |
| 5,914,756 | A | 6/1999 | Maeda et al. |
| 5,951,015 | A | 9/1999 | Smith et al. |
| 6,002,505 | A | 12/1999 | Kraenert et al. |
| 6,115,022 | A | 9/2000 | Mayer, III et al. |
| 6,266,048 | B1 | 7/2001 | Carau, Sr. |
| 6,272,231 | B1 | 8/2001 | Maurer et al. |
| 6,310,650 | B1 | 10/2001 | Johnson et al. |
| 6,310,988 | B1 | 10/2001 | Flores et al. |
| 6,334,063 | B1 | 12/2001 | Charlier et al. |
| 6,340,976 | B1 | 1/2002 | Oguchi et al. |
| 6,362,797 | B1 | 3/2002 | Dehmlow |
| 6,414,672 | B2 | 7/2002 | Rekimoto et al. |
| 6,424,998 | B2 | 7/2002 | Hunter |
| 6,456,339 | B1 | 9/2002 | Surati et al. |
| 6,489,934 | B1 | 12/2002 | Klausner |
| 6,498,651 | B1 | 12/2002 | Loil |
| 6,516,666 | B1 | 2/2003 | Li |
| 6,527,395 | B1 | 3/2003 | Raskar et al. |
| 6,549,487 | B2 | 4/2003 | Gualtieri |
| 6,550,331 | B2 | 4/2003 | Fujii et al. |
| 6,551,493 | B2 | 4/2003 | Mori et al. |
| 6,554,431 | B1 | 4/2003 | Binsted et al. |
| 6,563,504 | B1 | 5/2003 | Rose et al. |
| 6,573,883 | B1 | 6/2003 | Bartlett |
| 6,573,887 | B1 | 6/2003 | O'Donnell, Jr. |
| 6,577,496 | B1 | 6/2003 | Gioscia et al. |
| 6,583,864 | B1 | 6/2003 | Stanners |
| 6,595,644 | B2 | 7/2003 | Kostrzewski et al. |
| 6,601,037 | B1 | 7/2003 | Kolls |
| 6,611,252 | B1 | 8/2003 | DuFaux |
| 6,611,253 | B1 | 8/2003 | Cohen |
| 6,614,422 | B1 | 9/2003 | Rafii et al. |
| 6,626,543 | B2 | 9/2003 | Derryberry |
| 6,636,203 | B1 * | 10/2003 | Wong et al. .................. 345/173 |
| 6,665,100 | B1 | 12/2003 | Klug et al. |
| 6,675,630 | B2 | 1/2004 | Challoner et al. |
| 6,695,451 | B1 | 2/2004 | Yamasaki et al. |
| 6,708,087 | B2 | 3/2004 | Matsumoto |
| 6,710,754 | B2 | 3/2004 | Hanson et al. |
| 6,710,770 | B2 | 3/2004 | Tomasi et al. |
| 6,727,864 | B1 | 4/2004 | Johnson et al. |
| 6,733,138 | B2 | 5/2004 | Raskar |
| 6,750,849 | B2 | 6/2004 | Potkonen |
| 6,755,537 | B1 | 6/2004 | Raskar et al. |
| 6,760,075 | B2 | 7/2004 | Mayer, III et al. |
| 6,760,442 | B1 | 7/2004 | Scott |
| 6,764,185 | B1 | 7/2004 | Beardsley et al. |
| 6,793,350 | B1 | 9/2004 | Raskar et al. |
| 6,798,401 | B2 | 9/2004 | DuFaux |
| 6,802,614 | B2 | 10/2004 | Haldiman |
| 6,811,264 | B2 | 11/2004 | Raskar et al. |
| 6,840,627 | B2 | 1/2005 | Olbrich |
| 6,844,893 | B1 | 1/2005 | Miller et al. |
| 6,857,746 | B2 | 2/2005 | Dyner |
| 6,909,670 | B1 | 6/2005 | Li |
| 6,919,892 | B1 | 7/2005 | Cheiky et al. |
| 6,955,297 | B2 | 10/2005 | Grant |
| 6,984,039 | B2 | 1/2006 | Agostinelli |
| 6,997,563 | B1 | 2/2006 | Wang et al. |
| 7,013,029 | B2 | 3/2006 | Keskar et al. |
| 7,016,711 | B2 | 3/2006 | Kurakane |
| 7,036,936 | B2 | 5/2006 | Hattori et al. |
| 7,043,987 | B2 | 5/2006 | Jeong et al. |
| 7,071,924 | B2 | 7/2006 | Wilbrink et al. |
| 7,088,352 | B2 | 8/2006 | Wampler |
| 7,088,440 | B2 | 8/2006 | Buermann et al. |
| 7,103,313 | B2 | 9/2006 | Heinonen et al. |
| 7,118,220 | B2 | 10/2006 | Castaldi et al. |

(56) References Cited

U.S. PATENT DOCUMENTS

| | | |
|---|---|---|
| 7,134,078 B2 | 11/2006 | Vaarala |
| 7,151,530 B2 | 12/2006 | Roeber et al. |
| 7,151,764 B1 | 12/2006 | Heinonen et al. |
| 7,155,978 B2 | 1/2007 | Lo et al. |
| 7,159,441 B2 | 1/2007 | Challoner et al. |
| 7,173,605 B2 | 2/2007 | Fong et al. |
| 7,185,987 B2 | 3/2007 | Tamura |
| 7,191,653 B2 | 3/2007 | Park et al. |
| 7,193,241 B2 | 3/2007 | Hayashi et al. |
| 7,195,170 B2 | 3/2007 | Matsumoto et al. |
| 7,209,569 B2 | 4/2007 | Boesen |
| 7,216,799 B2 | 5/2007 | Amemiya |
| 7,231,063 B2 | 6/2007 | Naimark et al. |
| 7,232,700 B1 | 6/2007 | Kubena |
| 7,234,119 B2 * | 6/2007 | Wu et al. .................... 715/864 |
| 7,239,445 B2 | 7/2007 | Pouslen |
| 7,242,388 B2 | 7/2007 | Lieberman et al. |
| 7,245,381 B2 | 7/2007 | Marino et al. |
| 7,248,151 B2 | 7/2007 | Mc Call |
| 7,252,002 B2 | 8/2007 | Zerbini et al. |
| 7,256,923 B2 | 8/2007 | Liu et al. |
| 7,257,255 B2 | 8/2007 | Pittel |
| 7,259,658 B2 | 8/2007 | Noguchi et al. |
| 7,266,391 B2 | 9/2007 | Warren |
| 7,270,003 B2 | 9/2007 | Sassolini et al. |
| 7,282,712 B2 | 10/2007 | Shibayama |
| 7,284,866 B2 | 10/2007 | Buchmann |
| 7,287,428 B2 | 10/2007 | Green |
| 7,290,885 B2 | 11/2007 | Salvatori et al. |
| 7,301,648 B2 | 11/2007 | Foxlin |
| 7,305,368 B2 | 12/2007 | Lieberman et al. |
| 7,328,616 B2 | 2/2008 | Won et al. |
| 7,330,269 B2 | 2/2008 | Zurn et al. |
| 7,332,717 B2 | 2/2008 | Murata et al. |
| 7,336,271 B2 | 2/2008 | Ozeki et al. |
| 7,337,669 B2 | 3/2008 | Nozoe |
| 7,350,923 B2 | 4/2008 | Olson et al. |
| 7,355,583 B2 | 4/2008 | Beardsley et al. |
| 7,355,584 B2 | 4/2008 | Hendriks et al. |
| 7,355,796 B2 | 4/2008 | Robinson |
| 7,358,986 B1 | 4/2008 | Knighton et al. |
| 7,361,899 B2 | 4/2008 | Iida |
| 7,363,816 B2 | 4/2008 | Judy et al. |
| 7,373,833 B2 | 5/2008 | Hopper et al. |
| 7,379,630 B2 | 5/2008 | Lagakos et al. |
| 7,382,599 B2 | 6/2008 | Kikuiri et al. |
| 7,460,185 B2 | 12/2008 | Saletta |
| 7,484,855 B2 | 2/2009 | Kobayashi et al. |
| 7,549,754 B2 | 6/2009 | Furui |
| 7,595,809 B2 | 9/2009 | Widdowson |
| 7,630,522 B2 | 12/2009 | Popp et al. |
| 7,647,613 B2 | 1/2010 | Drakoulis et al. |
| 7,690,797 B2 | 4/2010 | Higashi |
| 7,742,949 B2 | 6/2010 | Evangelist et al. |
| 7,783,892 B2 | 8/2010 | Russell et al. |
| 7,810,114 B2 | 10/2010 | Flickinger et al. |
| 7,870,592 B2 | 1/2011 | Hudson et al. |
| 7,874,679 B2 | 1/2011 | Stonier |
| 7,891,826 B2 | 2/2011 | Fujinawa et al. |
| 7,936,943 B2 | 5/2011 | Way et al. |
| 7,967,445 B2 | 6/2011 | Hamano et al. |
| 7,980,707 B2 | 7/2011 | Murphy |
| 8,024,762 B2 | 9/2011 | Britt |
| 8,049,721 B2 | 11/2011 | Tagawa |
| 8,055,907 B2 | 11/2011 | Deem et al. |
| 2001/0000300 A1 | 4/2001 | Haile-mariam |
| 2001/0012001 A1 | 8/2001 | Rekimoto et al. |
| 2001/0024231 A1 | 9/2001 | Nakamura et al. |
| 2002/0039177 A1 | 4/2002 | Fukushima et al. |
| 2002/0055892 A1 | 5/2002 | Brown et al. |
| 2002/0105624 A1 | 8/2002 | Quori |
| 2002/0135739 A1 | 9/2002 | Standard et al. |
| 2002/0154091 A1 | 10/2002 | Uchida et al. |
| 2002/0184098 A1 * | 12/2002 | Giraud et al. .................... 705/14 |
| 2002/0186676 A1 | 12/2002 | Milley et al. |
| 2003/0017846 A1 | 1/2003 | Estevez et al. |
| 2003/0018539 A1 | 1/2003 | La Poutre et al. |
| 2003/0038925 A1 | 2/2003 | Choi |
| 2003/0038927 A1 | 2/2003 | Alden |
| 2003/0038928 A1 | 2/2003 | Alden |
| 2003/0051256 A1 | 3/2003 | Uesaki et al. |
| 2003/0061607 A1 | 3/2003 | Hunter et al. |
| 2003/0088463 A1 | 5/2003 | Kanevsky et al. |
| 2003/0216185 A1 | 11/2003 | Varley |
| 2004/0003398 A1 | 1/2004 | Donian et al. |
| 2004/0012849 A1 | 1/2004 | Cruz-Uribe et al. |
| 2004/0027539 A1 | 2/2004 | Plunkett |
| 2004/0036844 A1 | 2/2004 | Wood et al. |
| 2004/0051704 A1 | 3/2004 | Goulthorpe |
| 2004/0075820 A1 | 4/2004 | Chu et al. |
| 2004/0141162 A1 | 7/2004 | Olbrich |
| 2004/0158865 A1 | 8/2004 | Kubler et al. |
| 2004/0181807 A1 | 9/2004 | Theiste et al. |
| 2004/0183775 A1 | 9/2004 | Bell |
| 2004/0183896 A1 | 9/2004 | Takamine et al. |
| 2004/0184010 A1 | 9/2004 | Raskar et al. |
| 2004/0184013 A1 | 9/2004 | Raskar et al. |
| 2004/0222983 A1 * | 11/2004 | Kakemura .................... 345/204 |
| 2004/0239884 A1 * | 12/2004 | Nagashima et al. ............ 353/30 |
| 2004/0243482 A1 | 12/2004 | Laut |
| 2005/0030486 A1 | 2/2005 | Lee et al. |
| 2005/0036117 A1 | 2/2005 | Kobayashi |
| 2005/0043060 A1 | 2/2005 | Brandenberg et al. |
| 2005/0046803 A1 | 3/2005 | Akutsu |
| 2005/0060210 A1 | 3/2005 | Levi et al. |
| 2005/0068501 A1 | 3/2005 | Nonaka et al. |
| 2005/0076372 A1 | 4/2005 | Moore et al. |
| 2005/0086056 A1 | 4/2005 | Yoda et al. |
| 2005/0091671 A1 | 4/2005 | Deem et al. |
| 2005/0099432 A1 | 5/2005 | Chavis et al. |
| 2005/0099603 A1 | 5/2005 | Thomas et al. |
| 2005/0099607 A1 | 5/2005 | Yokote et al. |
| 2005/0117130 A1 | 6/2005 | Bohn et al. |
| 2005/0128437 A1 | 6/2005 | Pingali et al. |
| 2005/0153759 A1 | 7/2005 | Varley |
| 2005/0153760 A1 | 7/2005 | Varley |
| 2005/0179875 A1 | 8/2005 | Aoyanagi |
| 2005/0184958 A1 | 8/2005 | Gnanamgari et al. |
| 2005/0206856 A1 | 9/2005 | Ishii |
| 2005/0219467 A1 | 10/2005 | Nomizo et al. |
| 2005/0237492 A1 | 10/2005 | Shinozaki |
| 2005/0240417 A1 | 10/2005 | Savage |
| 2005/0253776 A1 | 11/2005 | Lee et al. |
| 2005/0259084 A1 | 11/2005 | Popovich et al. |
| 2005/0259231 A1 | 11/2005 | Salvatori et al. |
| 2005/0280628 A1 | 12/2005 | Adams et al. |
| 2006/0001543 A1 | 1/2006 | Raskar et al. |
| 2006/0015375 A1 | 1/2006 | Lee et al. |
| 2006/0017890 A1 | 1/2006 | Inazumi |
| 2006/0020481 A1 | 1/2006 | Lee et al. |
| 2006/0020515 A1 | 1/2006 | Lee et al. |
| 2006/0022214 A1 | 2/2006 | Morgan et al. |
| 2006/0028624 A1 | 2/2006 | Kaise et al. |
| 2006/0038814 A1 | 2/2006 | Rivera |
| 2006/0038965 A1 | 2/2006 | Hennes |
| 2006/0044513 A1 | 3/2006 | Sakurai |
| 2006/0059002 A1 | 3/2006 | Shibata et al. |
| 2006/0059739 A1 | 3/2006 | Sondergaard |
| 2006/0066564 A1 | 3/2006 | Yee et al. |
| 2006/0075019 A1 | 4/2006 | Donovan et al. |
| 2006/0087555 A1 | 4/2006 | Boyd et al. |
| 2006/0095515 A1 | 5/2006 | Forstadius |
| 2006/0103811 A1 | 5/2006 | May et al. |
| 2006/0109237 A1 | 5/2006 | Morita et al. |
| 2006/0129551 A1 | 6/2006 | Teicher |
| 2006/0146291 A1 | 7/2006 | Olson et al. |
| 2006/0158425 A1 | 7/2006 | Andrews et al. |
| 2006/0158623 A1 | 7/2006 | Kobayashi et al. |
| 2006/0158626 A1 | 7/2006 | Baselmans et al. |
| 2006/0164526 A1 | 7/2006 | Suzuki et al. |
| 2006/0170875 A1 * | 8/2006 | Falck et al. .................... 353/52 |
| 2006/0170885 A1 | 8/2006 | Kitahara |
| 2006/0171008 A1 | 8/2006 | Mintz et al. |
| 2006/0181510 A1 | 8/2006 | Faith |

(56) References Cited

U.S. PATENT DOCUMENTS

| | | |
|---|---|---|
| 2006/0184977 A1 | 8/2006 | Mueller et al. |
| 2006/0187421 A1 | 8/2006 | Hattori et al. |
| 2006/0198550 A1 | 9/2006 | Jung et al. |
| 2006/0234784 A1 | 10/2006 | Reinhorn |
| 2006/0256076 A1 | 11/2006 | Liou et al. |
| 2006/0266135 A1 | 11/2006 | Nishikawa et al. |
| 2006/0271486 A1 | 11/2006 | Cross et al. |
| 2007/0005450 A1 | 1/2007 | Krishnamoorthy et al. |
| 2007/0005809 A1 | 1/2007 | Kobayashi et al. |
| 2007/0024580 A1 | 2/2007 | Sands et al. |
| 2007/0024763 A1 | 2/2007 | Chung |
| 2007/0040800 A1 | 2/2007 | Forlines et al. |
| 2007/0040989 A1 | 2/2007 | Weng et al. |
| 2007/0064208 A1 | 3/2007 | Giegerich et al. |
| 2007/0074906 A1 | 4/2007 | Tanaka et al. |
| 2007/0075982 A1 | 4/2007 | Morrison et al. |
| 2007/0085977 A1 | 4/2007 | Fricke et al. |
| 2007/0091277 A1 | 4/2007 | Damera-Venkata et al. |
| 2007/0091278 A1 | 4/2007 | Zakoji et al. |
| 2007/0103652 A1 | 5/2007 | Nijim et al. |
| 2007/0106950 A1 | 5/2007 | Hutchinson et al. |
| 2007/0109500 A1 | 5/2007 | Kobori et al. |
| 2007/0109505 A1 | 5/2007 | Kubara et al. |
| 2007/0109509 A1 | 5/2007 | Lee |
| 2007/0115440 A1 | 5/2007 | Wiklof |
| 2007/0146321 A1 | 6/2007 | Sohn et al. |
| 2007/0178973 A1 | 8/2007 | Camhi |
| 2007/0180409 A1* | 8/2007 | Sohn et al. .......... 715/863 |
| 2007/0188450 A1 | 8/2007 | Hernandez et al. |
| 2007/0199108 A1* | 8/2007 | Angle et al. .......... 901/17 |
| 2007/0218432 A1* | 9/2007 | Glass et al. .......... 434/156 |
| 2007/0219928 A1 | 9/2007 | Madhogarhia |
| 2007/0220575 A1 | 9/2007 | Cooper et al. |
| 2007/0242033 A1 | 10/2007 | Cradick et al. |
| 2007/0242233 A1 | 10/2007 | Sokeila et al. |
| 2007/0247422 A1 | 10/2007 | Vertegaal et al. |
| 2007/0266412 A1 | 11/2007 | Trowbridge et al. |
| 2007/0273842 A1 | 11/2007 | Morrison et al. |
| 2007/0273848 A1 | 11/2007 | Fan et al. |
| 2007/0282564 A1 | 12/2007 | Sprague et al. |
| 2008/0002159 A1 | 1/2008 | Liu et al. |
| 2008/0022328 A1 | 1/2008 | Miller |
| 2008/0036969 A1 | 2/2008 | Otsuka et al. |
| 2008/0056544 A1 | 3/2008 | Aikawa et al. |
| 2008/0060014 A1 | 3/2008 | Bentley et al. |
| 2008/0066111 A1 | 3/2008 | Ellis et al. |
| 2008/0079752 A1 | 4/2008 | Gates et al. |
| 2008/0121701 A1 | 5/2008 | Gabriel |
| 2008/0129647 A1 | 6/2008 | Canova |
| 2008/0136976 A1 | 6/2008 | Ajito et al. |
| 2008/0168523 A1 | 7/2008 | Ansari et al. |
| 2008/0180519 A1 | 7/2008 | Cok |
| 2008/0183820 A1 | 7/2008 | Golovchinsky et al. |
| 2008/0186255 A1 | 8/2008 | Cohen et al. |
| 2008/0192017 A1 | 8/2008 | Hildebrandt et al. |
| 2008/0212039 A1 | 9/2008 | Taylor |
| 2008/0224251 A1 | 9/2008 | Troost et al. |
| 2008/0227500 A1 | 9/2008 | Heyworth et al. |
| 2008/0256453 A1 | 10/2008 | Fein et al. |
| 2008/0275769 A1 | 11/2008 | Shao |
| 2008/0291213 A1* | 11/2008 | Bhogal et al. .......... 345/589 |
| 2008/0303747 A1 | 12/2008 | Velicescu |
| 2008/0316432 A1 | 12/2008 | Tejada |
| 2008/0319857 A1 | 12/2008 | Dobbins et al. |
| 2009/0019078 A1 | 1/2009 | Chisholm et al. |
| 2009/0021162 A1 | 1/2009 | Cope et al. |
| 2009/0031027 A1 | 1/2009 | Abernethy, Jr. et al. |
| 2009/0037382 A1 | 2/2009 | Ansari et al. |
| 2009/0051961 A1 | 2/2009 | Ohsawa |
| 2009/0063274 A1 | 3/2009 | Dublin, III et al. |
| 2009/0070276 A1 | 3/2009 | Kodimer et al. |
| 2009/0070881 A1 | 3/2009 | Yellepeddy et al. |
| 2009/0079945 A1 | 3/2009 | Klosowiak et al. |
| 2009/0088204 A1 | 4/2009 | Culbert et al. |
| 2009/0091714 A1 | 4/2009 | Aufranc et al. |
| 2009/0096994 A1 | 4/2009 | Smits |
| 2009/0106671 A1 | 4/2009 | Olson et al. |
| 2009/0117846 A1 | 5/2009 | Mavrakakis |
| 2009/0124382 A1 | 5/2009 | Lachance et al. |
| 2009/0136212 A1 | 5/2009 | Klein |
| 2009/0149246 A1 | 6/2009 | Opaluch |
| 2009/0150947 A1 | 6/2009 | Soderstrom |
| 2009/0164575 A1 | 6/2009 | Barbeau et al. |
| 2009/0181645 A1 | 7/2009 | Chan et al. |
| 2009/0186700 A1 | 7/2009 | Konkle |
| 2009/0217320 A1 | 8/2009 | Aldrey |
| 2009/0228937 A1 | 9/2009 | Williams |
| 2009/0295712 A1 | 12/2009 | Ritzau |
| 2009/0295835 A1 | 12/2009 | Husoy |
| 2009/0310099 A1 | 12/2009 | Jung et al. |
| 2009/0310101 A1 | 12/2009 | Jung et al. |
| 2009/0310102 A1 | 12/2009 | Jung et al. |
| 2009/0311965 A1 | 12/2009 | Jung et al. |
| 2009/0316671 A1 | 12/2009 | Rolf et al. |
| 2010/0082743 A1 | 4/2010 | Zeng et al. |
| 2010/0132034 A1 | 5/2010 | Pearce et al. |
| 2010/0153999 A1 | 6/2010 | Yates |
| 2010/0257569 A1 | 10/2010 | O'Hanlon |
| 2011/0037953 A1 | 2/2011 | Nizani et al. |
| 2011/0093340 A1 | 4/2011 | Kramer et al. |
| 2011/0179440 A1 | 7/2011 | Anderson, Jr. et al. |
| 2011/0195790 A1 | 8/2011 | Konkle |
| 2011/0255059 A1 | 10/2011 | Furui |
| 2011/0294569 A1 | 12/2011 | Tone et al. |
| 2012/0151562 A1 | 6/2012 | Ortiz et al. |
| 2012/0156983 A1 | 6/2012 | Ortiz et al. |
| 2012/0323676 A1 | 12/2012 | Dublin, III et al. |
| 2013/0067519 A1 | 3/2013 | Yates |
| 2013/0117818 A1 | 5/2013 | Diem |
| 2013/0182117 A1 | 7/2013 | Arseneau et al. |
| 2013/0219076 A1 | 8/2013 | Islam et al. |

FOREIGN PATENT DOCUMENTS

| | | | |
|---|---|---|---|
| WO | WO 2006/040725 A1 | 4/2006 | |
| WO | WO 2007/111382 A1 | 10/2007 | |

OTHER PUBLICATIONS

U.S. Appl. No. 12/459,580, Jung et al.
U.S. Appl. No. 12/454,184, Jung et al.
U.S. Appl. No. 12/380,582, Jung et al.
U.S. Appl. No. 12/380,571, Jung et al.
U.S. Appl. No. 12/322,876, Jung et al.
U.S. Appl. No. 12/322,875, Jung et al.
U.S. Appl. No. 12/322,063, Jung et al.
U.S. Appl. No. 12/291,025, Jung et al.
U.S. Appl. No. 12/291,024, Jung et al.
U.S. Appl. No. 12/291,023, Jung et al.
U.S. Appl. No. 12/291,019, Jung et al.
U.S. Appl. No. 12/290,241, Jung et al.
U.S. Appl. No. 12/290,240, Jung et al.
U.S. Appl. No. 12/286,750, Jung et al.
U.S. Appl. No. 12/286,731, Jung et al.
U.S. Appl. No. 12/229,536, Jung et al.
U.S. Appl. No. 12/229,534, Jung et al.
U.S. Appl. No. 12/229,519, Jung et al.
U.S. Appl. No. 12/229,518, Jung et al.
U.S. Appl. No. 12/229,508, Jung et al.
U.S. Appl. No. 12/229,505, Jung et al.
U.S. Appl. No. 12/220,906, Jung et al.
U.S. Appl. No. 12/218,269, Jung et al.
U.S. Appl. No. 12/218,268, Jung et al.
U.S. Appl. No. 12/218,267, Jung et al.
U.S. Appl. No. 12/218,266, Jung et al.
U.S. Appl. No. 12/217,135, Jung et al.
U.S. Appl. No. 12/217,123, Jung et al.
U.S. Appl. No. 12/217,118, Jung et al.
U.S. Appl. No. 12/217,117, Jung et al.
U.S. Appl. No. 12/217,116, Jung et al.
U.S. Appl. No. 12/217,115, Jung et al.

(56) References Cited

OTHER PUBLICATIONS

U.S. Appl. No. 12/214,422, Jung et al.
"2010 Toyota Prius Touch Tracer Display"; KickingTires; printed on Mar. 4, 2009; pp. 1-5; located at http://blogs.cars.com/kickingtires/2009/03/2010-toyota-prius-touch-tracer-display.html.
Foo, Juniper; "MIT's 6$^{th}$ Sense device could trump Apple's multitouch"; Crave; bearing a date of Feb. 9, 2009; printed on Feb. 19, 2009; pp. 1-4; located at http://news.cnet.com/8301-17938_105-10159601-1.html.
Frucci, Adam; "MiLi Pro Turns Your iPhone Into a Projector"; Gizmodo; bearing a date of Jun. 26, 2009; printed on Jul. 8, 2009; pp. 1-3; located at http://gizmodo.com/5302942/mili-pro-turns-your-iphone-into-a-projector/gallery/.
Hereld, Mark et al.; "Introduction to Building Projection-based Tiled Display Systems"; pp. 1-9; Computer Science Department, University of Chicago.
Melanson, Donald; "Apple patent filing suggests a safer in-car touchscreen"; Engadget; bearing a date of Mar. 30, 2009; printed on Apr. 10, 2009; pp. 1-8; located at http://www.engadget.com/2009/03/30/apple-patent-filing-suggests-a-safer-in-car-touchscreen/.
Melanson, Donald; "Light Blue Optics promises tough-interface pico projectors"; Engadget; bearing a date of Jun. 3, 2009; printed on Jun. 8, 2009; pp. 1-4; located at http://www.engadget.com/2009/06/03/light-blue-optics-promises-touch-interface-pico-projectors/.
Nosowitz, Dan; "Official Specs and Prices for New Nikon Coolpix Line, Including Mutant Projector-Camera"; Gizmodo; bearing a date of Aug. 4, 2009; printed on Aug. 4, 2009; pp. 1-4; located at http://gizmodo.com/5329376/official-specs-and-prices-for-new-nikon-coolpix-line-including-mutant-projector+camera.
Oliver, Sam; "Apple may add micro projectors to iPhones, iPod touches"; AppleInsider; bearing a date of Jul. 6, 2009; printed on Jul. 8, 2009; pp. 1-8; located at http://www.appleinsider.com/articles/09/07/06/apple_may_add_micro_projectors_to_iphones_ipod_touches.html/.
"Rear Projection Products and Technology"; Christie Digital; printed on Feb. 13, 2009; pp. 1-2; located at http://controlrooms.christiedigital.com/Products/RearScreenTilingProjectors/.
"Science On a Sphere"; printed on Mar. 4, 2009; pp. 1-2; located at http://sos.noaa.gov/about/.
Wilson, Mark; "New Pico Projectors Offer DVD-Quality Resolution"; Gizmodo; bearing a date of Feb. 17, 2009; printed on Feb. 19, 2009; pp. 1; located at http://i.gizmodo.com/5155132/new-pico-projectors-offer-dvd+quality-resolution.
Diaz, Jesus; "Rear-Projection Urinal Lets You Pee Over Football Games or Bill O'Reilly"; Gizmodo; bearing a date of Aug. 10, 2009; pp. 1; located at http://gizmodo.com/5333854/; printed on Aug. 10, 2009.
Blass, Evan; "Hands-On With Texas Instruments' Cellphone Projector"; Engadget; Bearing a date of Sep. 20, 2007; pp. 1-7; Weblogs, Inc.; located at: http://www.engadget.com/2007/09/20/hands-on-with-texas-instruments-cellphone-projector/; printed on Apr. 10, 2008.
Browne et al.; "Using Motion Control to Guide Augmented Reality Manufacturing Systems"; Motion Control Technology; Bearing a date of 2006; pp. 1-4; ABP International, Inc.; located at: http://www.nasatech.com/motion/features/feat_1007.html; printed on May 8, 2008.
"Cell Phone With Built-in Projector"; Physorg; Bearing a date of Mar. 24, 2005; p. 1; located at: http://www.physorg.com/news3505.html; printed on Apr. 10, 2008.
"Concepts: Cellphone Projector Concept Allows Impromptu Sales Meetings"; Gizmodo; pp. 1-3; located at: http://gizmodo.com/gadgets/concepts/cellphone-projector-concept-allows-impromptu-sales-meetings-311590.php; printed on Apr. 10, 2008.
Harding, Margaret; "Futuristic Windshield Helps Drivers See the Road"; Siliconvalley.com; Bearing a date of Jul. 18, 2008; pp. 1-2; located at: http://www.siliconvalley.com/ci_9919977?IADID=Search-www.siliconvalley.com-www.siliconvalley.com; printed on Aug. 18, 2008.

"Hybrid Technology"; InterSense; p. 1; InterSense, Inc.; located at: http://www.isense.com/products.aspx?id=43; printed on May 8, 2008.
"6-DOF Tracking (IS-900, IS-1200 Product Families)"; InterSense; p. 1; InterSense, Inc.; located at: http://www.isense.com/products.aspx?id=45&; printed on May 8, 2008.
"Precision Motion Tracking Solutions"; InterSense; p. 1; InterSense, Inc.; located at: http://www.isense.com/; printed on May 8, 2008.
"Is That a Projector in Your Pocket or a . . . Cell Phone?"; Gadget Review; Bearing a date of Mar. 27, 2007; pp. 1-6; located at: http://www.gadgetreview.com/2007/03/is-that-a-projector-in-your-pocket-or-acell-phone.html; printed on Apr. 10, 2008.
June, Laura; "Toshiba Announces TDP-F10U Pico Projector"; Engadget; Bearing a date of Jan. 7, 2009; pp. 1-2; Weblogs, Inc.; located at: http://www.engadget.com/2009/01/07/toshiba-announces-tdp-f10u-pico-projector/; printed on Jan. 15, 2009.
Kanellos, Michael; "TI Demos Its Movie Projector in a Phone"; CNET News; Bearing a date of Mar. 26, 2007; pp. 1-2; CNET Networks, Inc.; located at: http://earthlink.com.com/TI+demos+its+movie+projector+in+a+phone/2100-1041_3-6170619.html; printed on Apr. 10, 2008.
Lagorio, Christine; "Weird Science! NYU Student Invents Virtual Girlfriend"; New York Magazine; Bearing a date of May 14, 2008; pp. 1-2; New York Media LLC; located at: http://nymag.com/daily/intel/2008/05/weird_science_nyu_student_inve.html; printed on May 15, 2008.
Lam, Brian; "Bug Labs Open Source Gadgets Getting Pico Projector, 3G Modules and More"; Gizmodo; Bearing a date of Jan. 7, 2009; pp. 1-2; located at: http://i.gizmodo.com/5125563/bug-labs-open-source-gadgets-getting-pico-projector-3g-modules-and-more; printed on Jan. 15, 2009.
"LCD Projector Cell Phone Next April"; Gadget Review; Bearing a date of Apr. 13, 2006; pp. 1-6; located at: http://www.gadgetreview.com/2006/04/1cd-project-cell-phone-next-april.html; printed on Apr. 10, 2008.
Menon, Anuradha; "Flexible Computers Conform to Any Shape"; The Future of Things; Bearing a date of Jul. 3, 2008; pp. 1-3; located at: http://thefutureofthings.com/news/1222/flexible-computers-able-to-conform-any-shape.html; printed on Jul. 9, 2008.
"Micro Piezo Gyro"; Heli-Max Performance Parts; Bearing a date of 1998; pp. 1-2; located at: http://manuals.hobbico.com/hmx/hmxml010-manual.pdf
Miller, Ross; "WowWee Cinemin Swivel, Stick, and Station Pico PJs Hands-On"; Engadget; Bearing a date of Jan. 7, 2009; pp. 1-3; Weblogs, Inc.; located at: http://www.engadget.com/2009/01/07/wowwee-cinemin-swivel-stick-and-station-pico-pjs-hands-on/; printed on Jan. 15, 2009.
"Mint V10: World's Smallest Pocket Projector"; Gizmodo; Bearing a date of Aug. 18, 2008; pp. 1-3; located at: http://gizmodo.com/5031873/mint-v10-worlds-smallest-pocket-projector; printed on Aug. 18, 2008.
Mooney, Allison; "Mobile Phone Projectors"; PSFK; Bearing a date of Oct. 22, 2007; pp. 1-6; located at: http://www.psfk.com/2007/10/mobile-phone-projectors.html; printed on Apr. 10, 2008.
Murph, Darren; "3M Reveals MPro110 Pocket Projector: Ships This Month"; Engadget; Bearing a date of Sep. 13, 2008; pp. 1-5; Weblogs, Inc.; located at: http://www.engadget.com/2008/09/13/3m-reveals-mpro110-pocket-projector-ships-this-month/; printed on Sep. 22, 2008.
Murph, Darren; "TI's DLP Pico Technology Unveiled in New Round of Pico Projectors"; Engadget; Bearing a date of Jan. 7, 2009; pp. 1-2; Weblogs, Inc.; located at: http://www.engadget.com/2009/01/07/tis-dlp-pico-technology-unveiled-in-new-round-of-pico-projector/; printed on Jan. 15, 2009.
"Nano Projector Now in Cellphones"; Ubergizmo; Bearing a date of Jul. 2, 2007; pp. 1-4; located at: http://www.ubergizmo.com/15/archives/2007/07/nano_projector_now_in_cellphones.html; printed on Apr. 10, 2008.
"PicoP: Mobile Phone Projector From Microvision"; Planet Cell Phone Blog; Bearing a date of Sep. 23, 2006; pp. 1-9; located at: http://blog.planet-cell-phone.com/2006/09/23/picop-mobile-phone-projector-from-microvision/; printed on Apr. 10, 2008.

(56) References Cited

OTHER PUBLICATIONS

"Pico: Optoma to Launch 'World's First' Pico Projector in 2008"; Gizmodo; Bearing a date of Jun. 18, 2008; pp. 1-3; located at: http://gizmodo.com/5017516/optoma-to-launch-worlds-first-pico-projector-in-2008; printed on Jun. 23, 2008.

"Projectors: LG Projector Phone is Like a Media-Throwing Web Shooter"; Gizmodo; Bearing a date pf Jul. 9, 2008; pp. 1-3; located at: http://gizmodo.com/5022626/lg-projected-phone-is-like-a-media+throwing-web-shooter; printed on Jul. 9, 2008.

"Projectors: 18 Super Small Projectors"; Gizmodo; Bearing a date of Aug. 18, 2008; pp. 1-3; located at: http://gizmodo.com/5031238/18-super-small-projectors; printed on Aug. 18, 2008.

Ricker, Thomas; "Video: Camera-Based Concept Turns Any Surface into a DJ Deck"; Engadget; Bearing a date of Jul. 31, 2008; pp. 1-5; Weblogs, Inc.; located at: http://www.engadget.com/2008/07/31/video-camera-based-concept-turns-any-surface-into-a-dj-deck/; printed on Aug. 18, 2008.

Sakata et al.; "Digital Annotation System for Printed Paper Documents Using Camera-Projector Systems"; ACTA Press; Bearing a date of 2007; p. 1; located at: http://www.actapress.com/Abstract.aspx?paperId=27986; printed on May 2, 2008 (Abstract Only).

"Silicon Gyroscopes"; Boeing; pp. 1-3; located at: http://www.boeing.com/defense-space/space/bss/factsheets/gyro/gyro.html; printed on Apr. 25, 2008.

Svensson, Peter; "Projectors to Magnify Cell-Phone Cinema"; Physorg; Bearing a date of Apr. 3, 2008; pp. 1-2; The Associated Press; located at: http://www.physorg.com/news126457642.html; printed on Apr. 10, 2008.

"Technology: Micro Projectors:: Nice and Steady: Vibration-Compensated Mini Projectors"; Symbian-freak; Bearing a date of Jun. 14, 2007; pp. 1-3; Symbian Freak; located at: http://www.symbian-freak.com/news/007/06/tiny_projector_nice_and_steady.htm; printed on Apr. 28, 2008.

Topolsky, Joshua; "SenseSurface Sticks Knobs Onto Screens, Turns Virtual Controls Physical"; Engadget; Bearing a date of Jul. 16, 2008; pp. 1-7; Weblogs, Inc.; located at: http://www.engadget.com/2008/07/16/sensesurface-sticks-knobs-onto-screens-turns-virtual-controls-p/; printed on Aug. 18, 2008.

Wilson, Mark; "Logic Bolt: The US's First Projecting Cellphone"; Gizmodo; Bearing a date of Jan. 8, 2009; pp. 1-3; located at: http://i.gizmodo.com/5126754/logic-bolt-the-uss-first-projecting-cell-phone; printed on Jan. 15, 2009.

Wilson, Andrew D.; Benko, Hrvoje; "Combining Multiple Depth Cameras and Projectors for Interactions On, Above, and Between Surfaces"; UIST'10; 10 total pages; bearing a date of Oct. 3-6, 2010; ACM.

Diaz, Jesus; "Is There an iPad Cinema in Your Future?"; Bearing a date of Mar. 16, 2010, printed on Mar. 19, 2010; pp. 1-2; Gizmodo.com; located at http://gizmodo.com/5494787/is-there-an-ipad-cinema-in-your-future.

Hannaford, Kat; "Pico Projector From Light Blue Optics Throws Up a 10-inch Touchscreen Laser Projection"; Bearing a date of Jan. 5, 2010, printed on Jan. 19, 2010; pp. 1-2; Gizmodo.com; located at http://gizmodo.com/5440651/pico-projector-from-light-blue-optics-throws up-a-10+inch-touchscreen-laser-projection.

Loftus, Jack; "Dell Froot Concept Design Does Away with Keyboard, Monitor"; Bearing a date of Jan. 17, 2010, printed on Jan. 19, 2010; pp. 1-2; Gizmodo.com; located at http://gizmodo.com/5450176/dell-froot-concept-design-does-away-with-keyboard-monitor.

Allen, Danny; "Before Nikon's S1000pj: The Cine-Twin Was the First Camera/Projector Hybrid"; printed on Nov. 25, 2009; pp. 1-2; gizmodo.com; located at http://gizmodo.com/5347564/before-nikons-s1000pj-the-cine+twin-was-the-first-cameraprojector-hybrid.

Allen, Danny; "Ericsson's Spider PC Concept Projects the Keyboard and Screen"; printed on Nov. 25, 2009; pp. 1-3; gizmodo.com; located at http://gizmodo.com/5392667/ericssons-spider-pc-concept-projects-the-keyboard-and-screen.

Herrman, John; "Nikon S1000pj Projector Camera Review: Screw You All, I Love This Thing"; printed on Nov. 25, 2009; pp. 1-5; gizmodo.com; located at http://gizmodo.com/5402528/nikon-s1000pj-projector-camera-review-screw-vou-all-i-love-this-thing.

Miller, Paul; "Optoma's screen-in-a-bag actually makes a lot of sense"; bearing a date of Nov. 12, 2009; printed on Nov. 25, 2009; pp. 1-5; engadget.com; located at http://www.engadget.com/2009/11/12/optomas-screen-in-a-bag-actually-makes-a-lot-of-sense.

Lee et al.; "Automatic Projector Calibration with Embedded Light Sensors"; UIST '04; dates of Oct. 24-27, 2004; pp. 1-4; ACM.

Panasonic; "Electronic Print Board (Interactive Panaboard) Operating Instructions with Installation Manual"; bearing a date of 2001; pp. 1-86; Kyushu Matsushita Electric Co., Ltd.

U.S. Appl. No. 60/990,851, Klein, Scott V.

\* cited by examiner

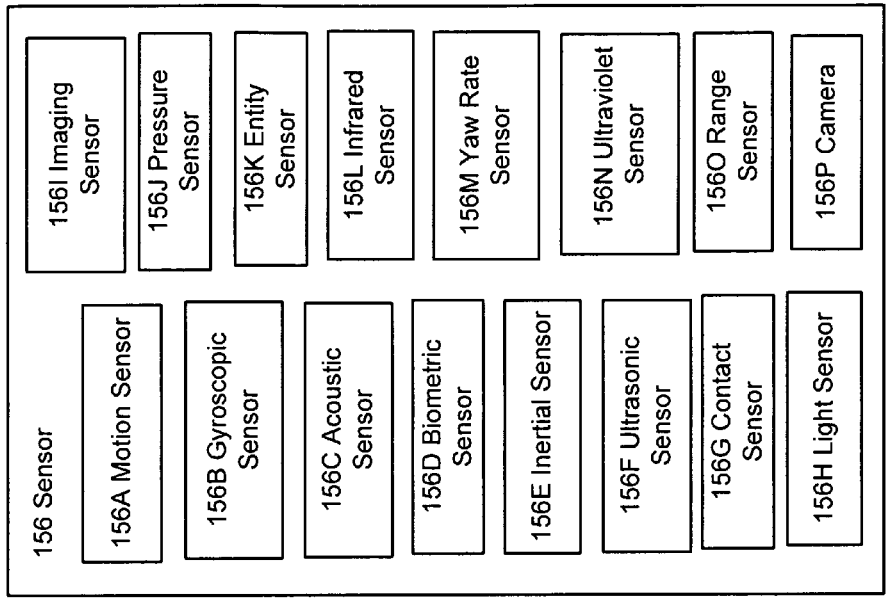
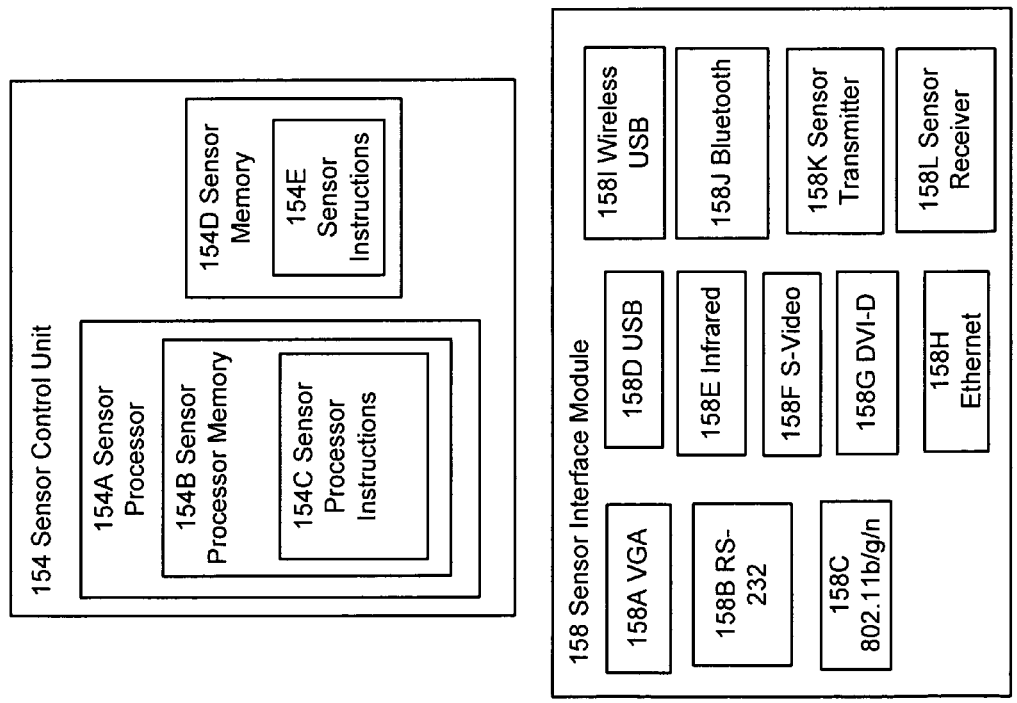
FIG. 1B

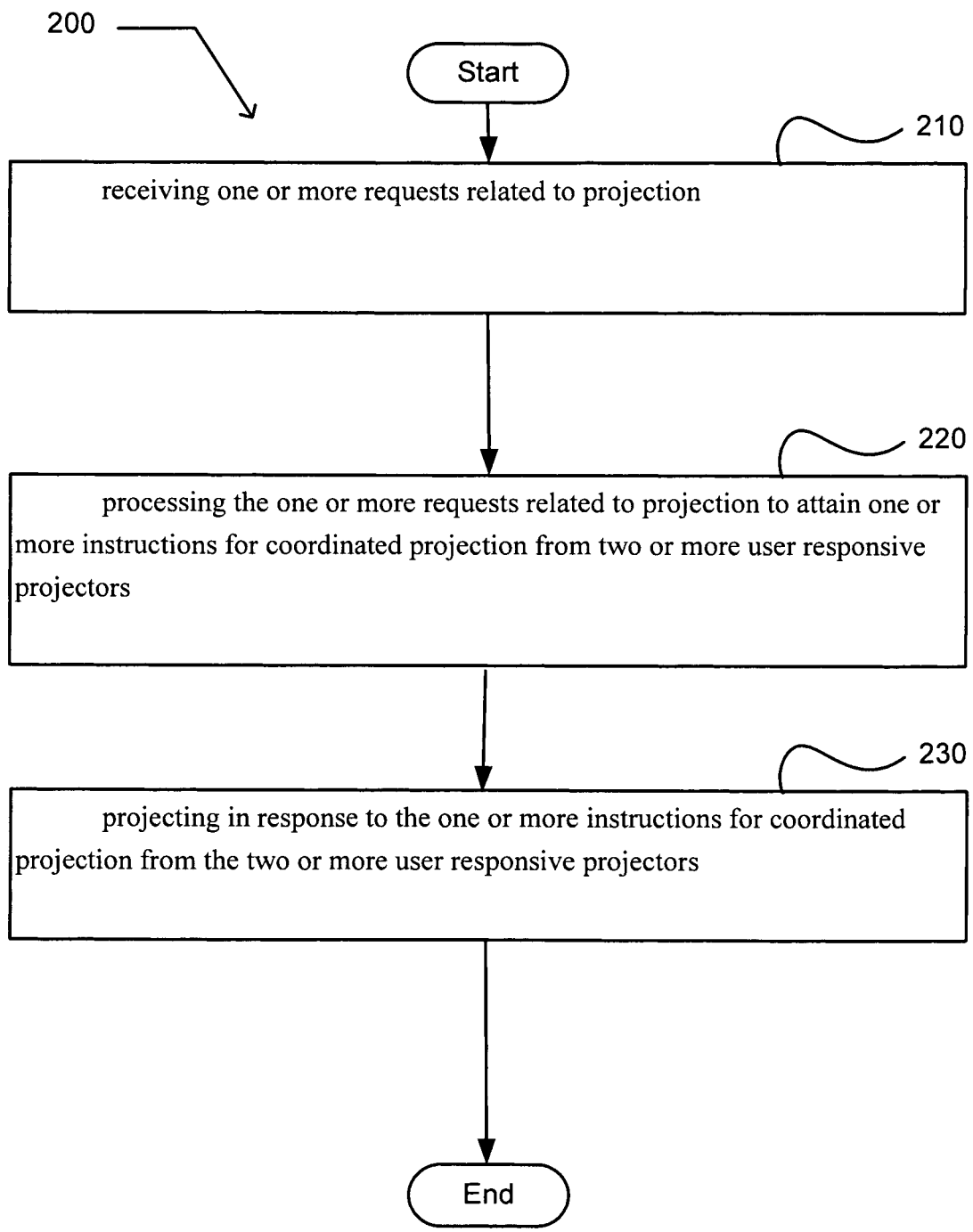

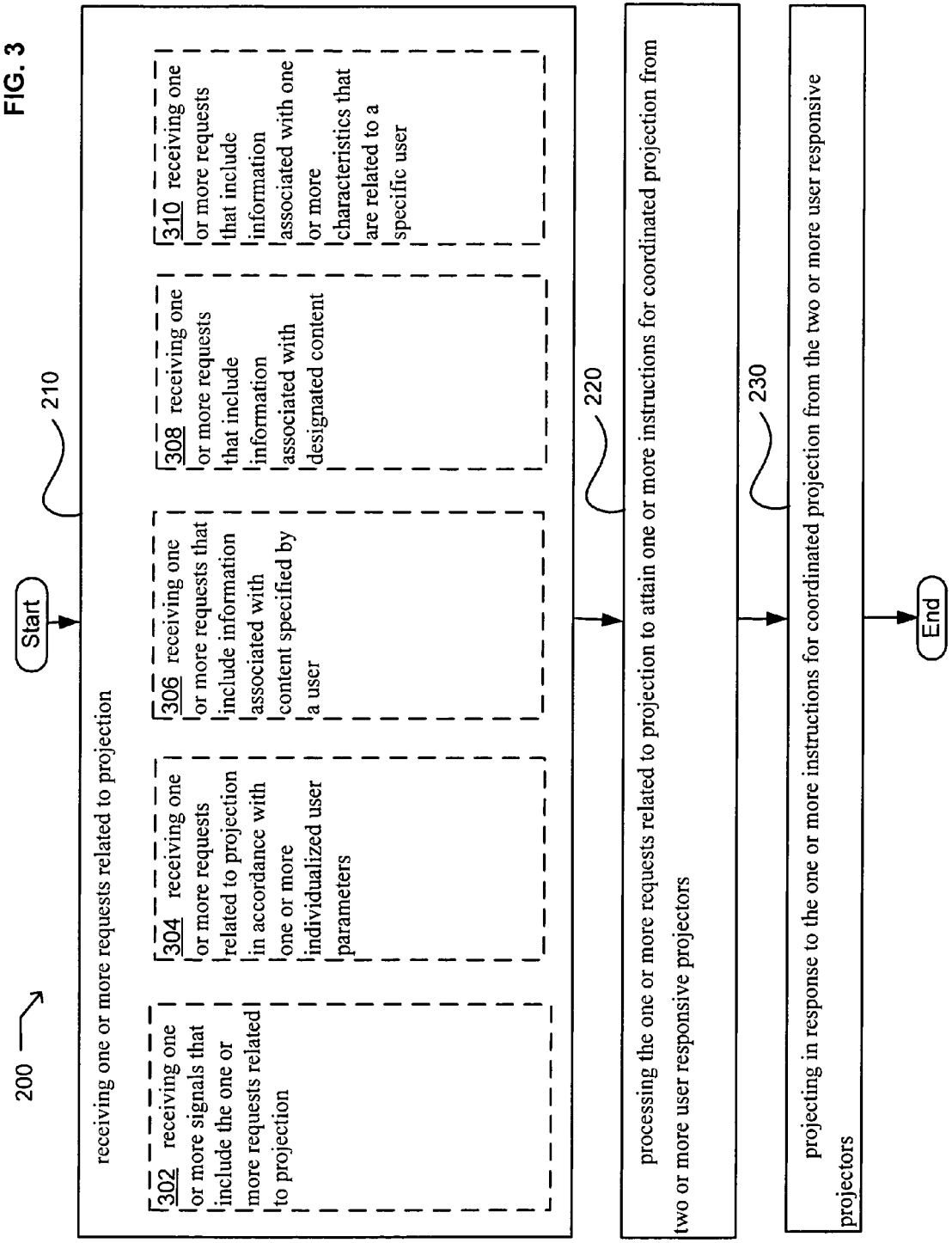

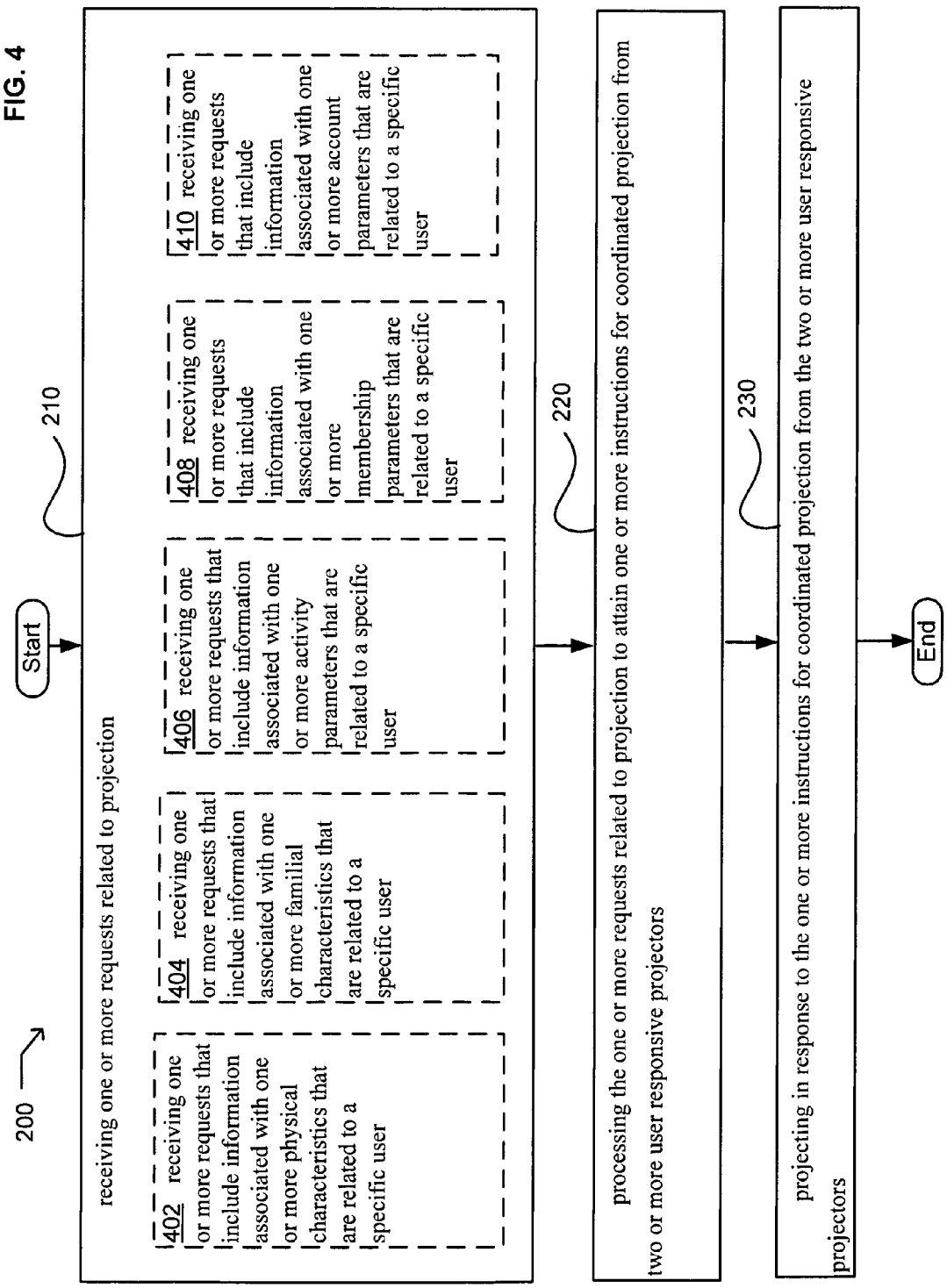

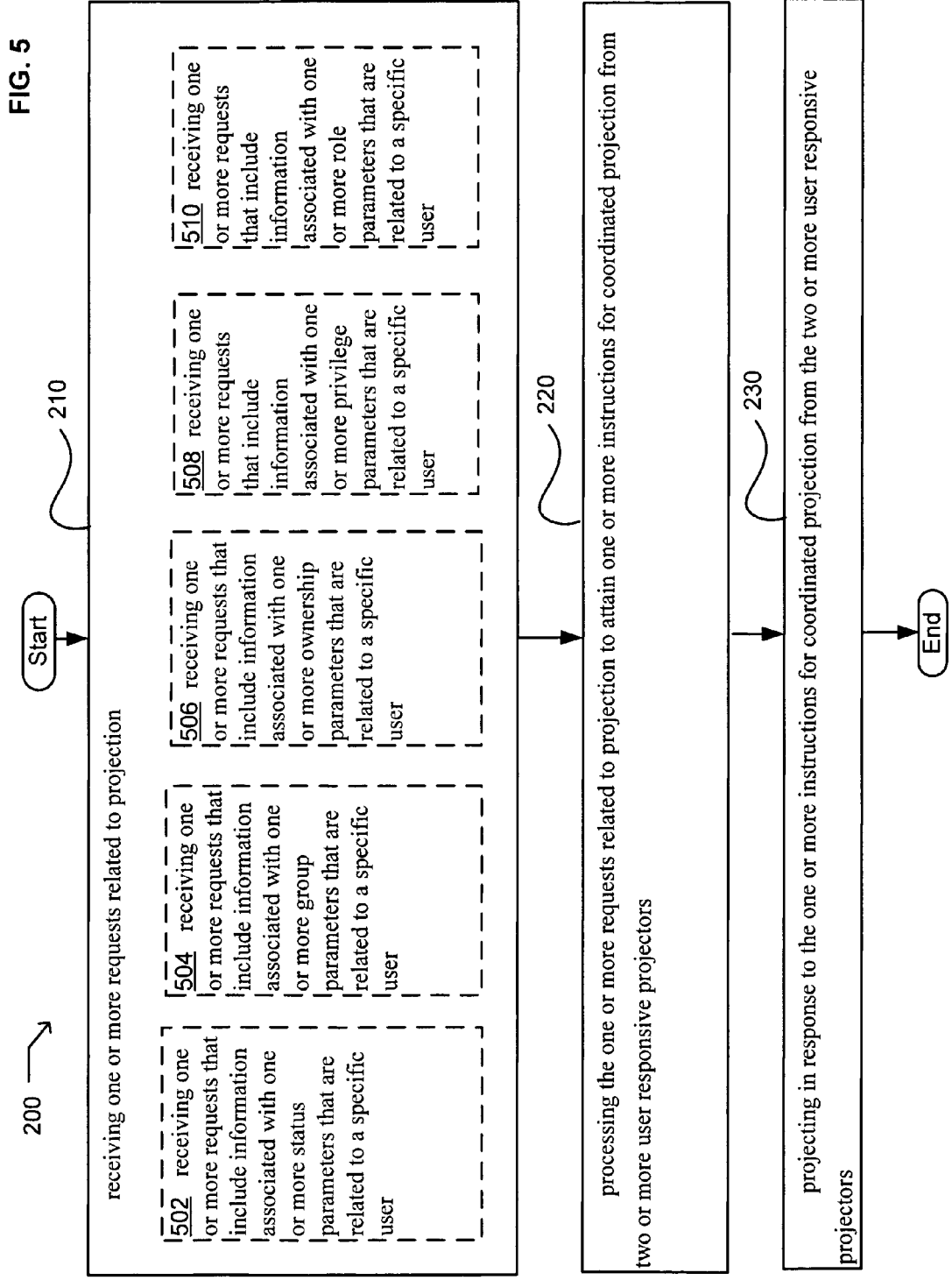

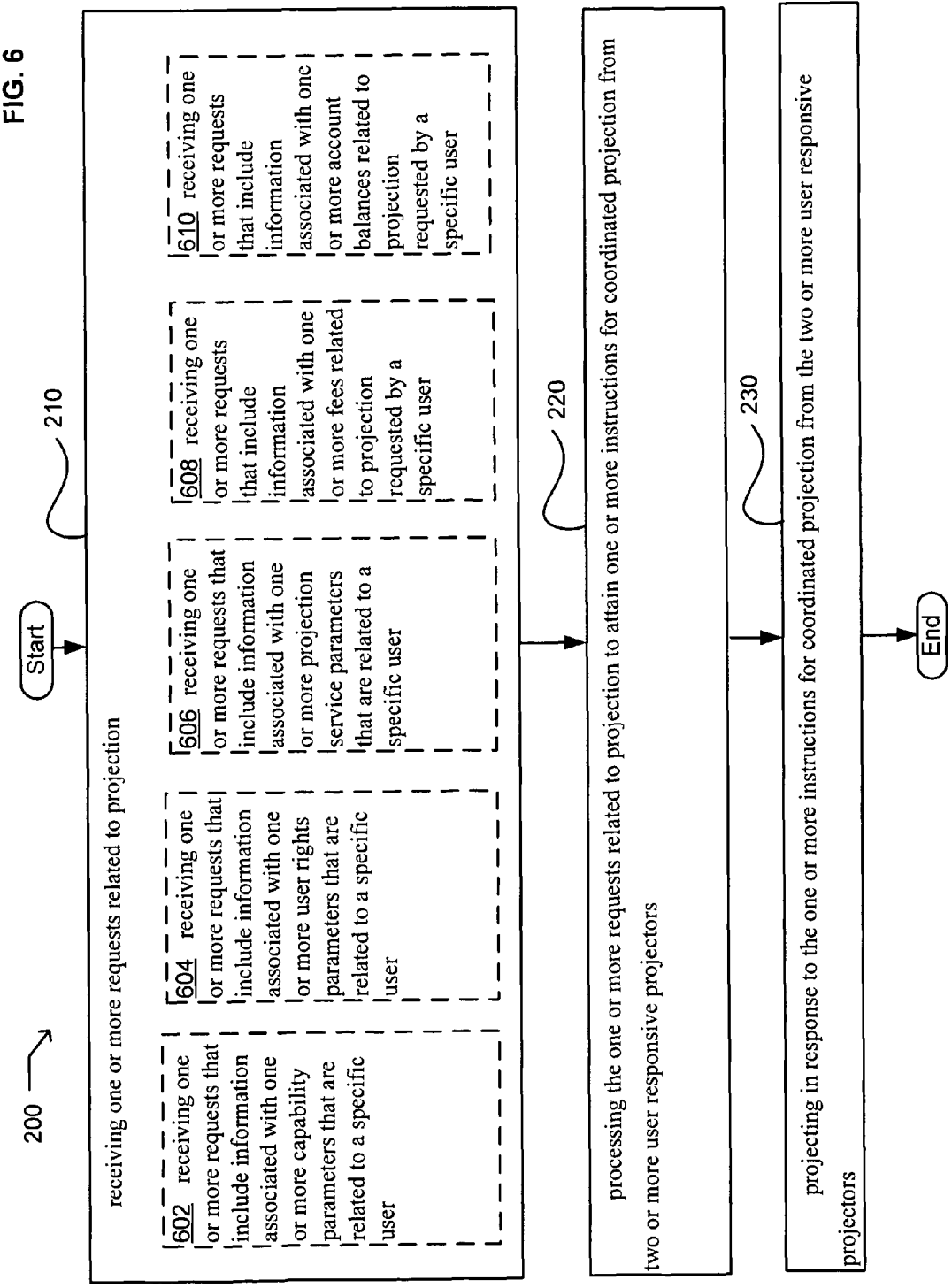

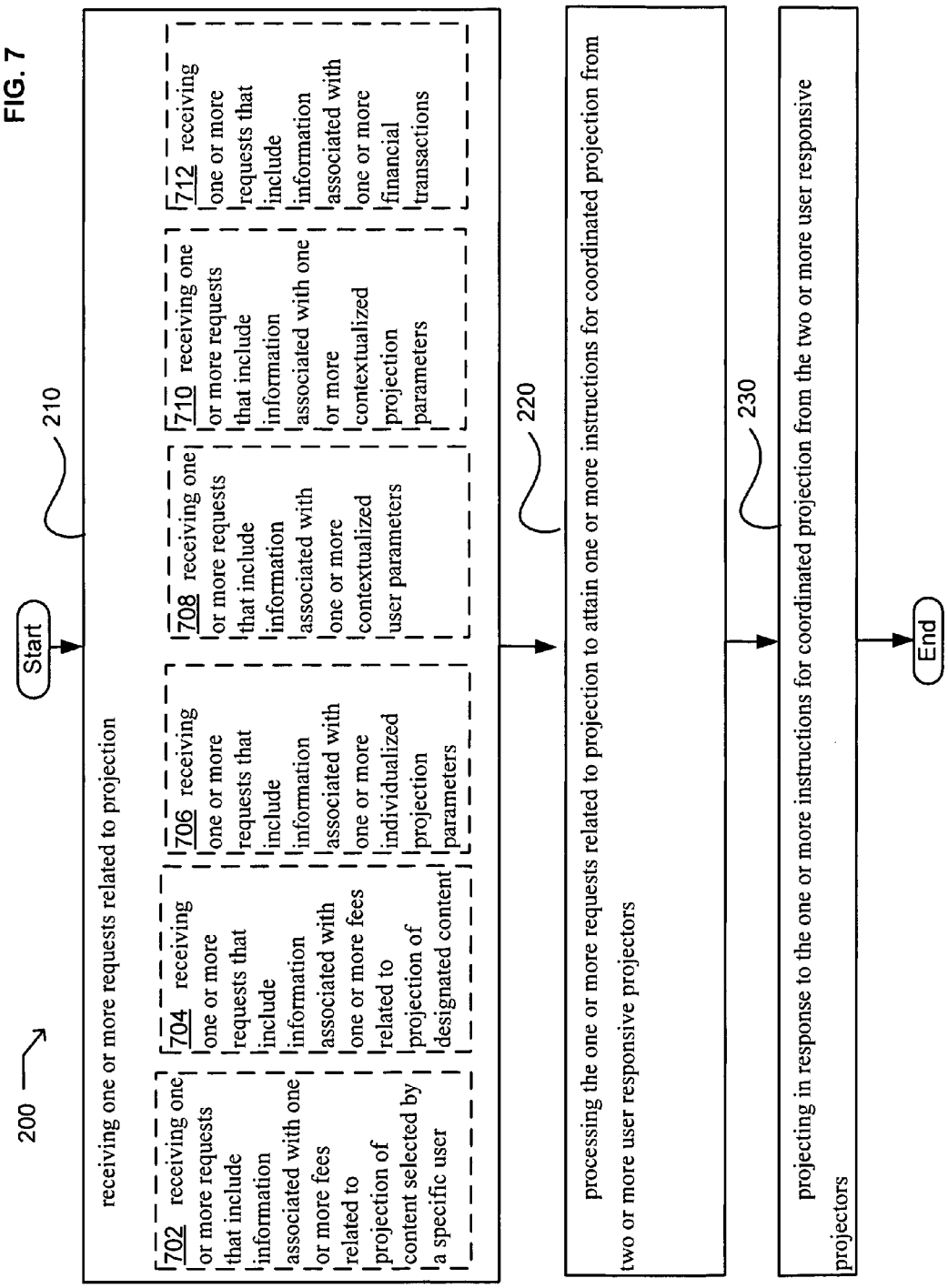

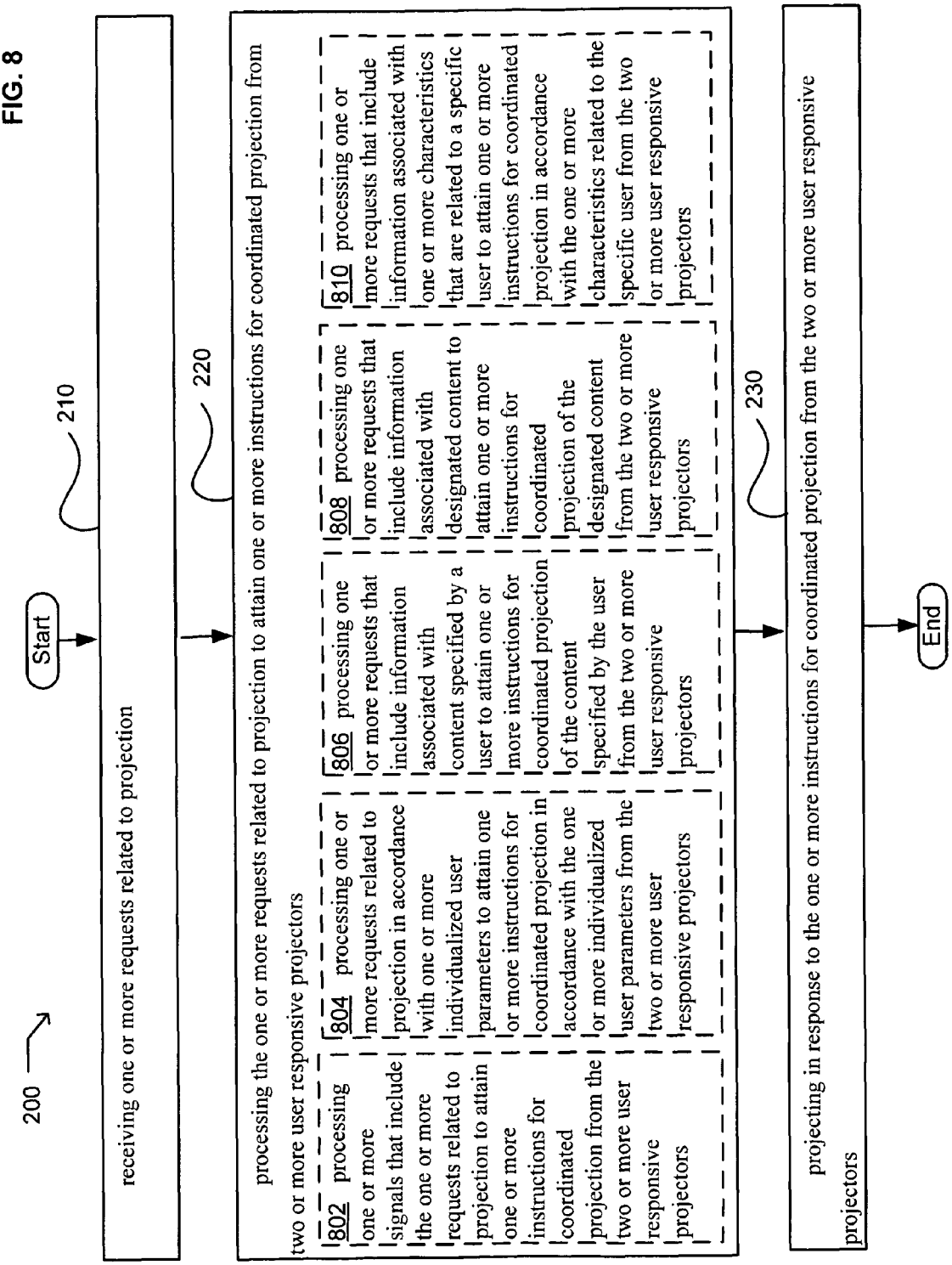

METHODS AND SYSTEMS FOR COORDINATED USE OF TWO OR MORE USER RESPONSIVE PROJECTORS

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation-in-part of U.S. patent application Ser. No. 12/214,422, entitled SYSTEMS AND DEVICES, naming Edward K. Y. Jung, Eric C. Leuthardt, Royce A. Levien, Robert W. Lord, Mark A. Malamud, John D. Rinaldo, Jr., and Lowell L. Wood, Jr. as inventors, filed 17 Jun. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/217,118, entitled MOTION RESPONSIVE DEVICES AND SYSTEMS, naming Edward K. Y. Jung, Eric C. Leuthardt, Royce A. Levien, Robert W. Lord, Mark A. Malamud, John D. Rinaldo, Jr., and Lowell L. Wood, Jr. as inventors, filed 30 Jun. 2008 now U.S. Pat. No. 8,403,501, which is an application of which a currently co-pending application is entitled to the benefit of the filing date.

For purposes of the USPTO extra-statutory requirements, the present application constitutes a continuation-in-part of U.S. patent application Ser. No. 12/217,116, entitled SYSTEMS AND METHODS FOR PROJECTING, naming Edward K. Y. Jung, Eric C. Leuthardt, Royce A. Levien, Robert W. Lord, Mark A. Malamud, John D. Rinaldo, Jr., and Lowell L. Wood, Jr. as inventors, filed 30 Jun. 2008 now U.S. Pat. No. 8,403,515, which is an application of which a currently co-pending application is entitled to the benefit of the filing date.

For purposes of the USPTO extra-statutory requirements, the present application constitutes a continuation-in-part of U.S. patent application Ser. No. 12/217,115, entitled SYSTEMS AND METHODS FOR TRANSMITTING INFORMATION ASSOCIATED WITH PROJECTING, naming Edward K. Y. Jung, Eric C. Leuthardt, Royce A. Levien, Robert W. Lord, Mark A. Malamud, John D. Rinaldo, Jr., and Lowell L. Wood, Jr. as inventors, filed 30 Jun. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/217,123, entitled SYSTEMS AND METHODS FOR RECEIVING INFORMATION ASSOCIATED WITH PROJECTING, naming Edward K. Y. Jung, Eric C. Leuthardt, Royce A. Levien, Robert W. Lord, Mark A. Malamud, John D. Rinaldo, Jr., and Lowell L. Wood, Jr. as inventors, filed 30 Jun. 2008 now U.S. Pat. No. 8,540,381, which is an application of which a currently co-pending application is entitled to the benefit of the filing date.

For purposes of the USPTO extra-statutory requirements, the present application constitutes a continuation-in-part of U.S. patent application Ser. No. 12/217,135, entitled SYSTEMS AND METHODS FOR PROJECTING IN RESPONSE TO POSITION, naming Edward K. Y. Jung, Eric C. Leuthardt, Royce A. Levien, Robert W. Lord, Mark A. Malamud, John D. Rinaldo, Jr., and Lowell L. Wood, Jr. as inventors, filed 30 Jun. 2008 now U.S. Pat. No. 8,376,558, which is an application of which a currently co-pending application is entitled to the benefit of the filing date.

For purposes of the USPTO extra-statutory requirements, the present application constitutes a continuation-in-part of U.S. patent application Ser. No. 12/217,117, entitled SYSTEMS AND METHODS FOR PROJECTING IN RESPONSE TO CONFORMATION, naming Edward K. Y. Jung, Eric C. Leuthardt, Royce A. Levien, Robert W. Lord, Mark A. Malamud, John D. Rinaldo, Jr., and Lowell L. Wood, Jr. as inventors, filed 30 Jun. 2008 now U.S. Pat. No. 8,608,321, which is an application of which a currently co-pending application is entitled to the benefit of the filing date.

For purposes of the USPTO extra-statutory requirements, the present application constitutes a continuation-in-part of U.S. patent application Ser. No. 12/218,269, entitled SYSTEMS AND METHODS FOR TRANSMITTING IN RESPONSE TO POSITION, naming Edward K. Y. Jung, Eric C. Leuthardt, Royce A. Levien, Richard T. Lord, Robert W. Lord, Mark A. Malamud, John D. Rinaldo, Jr., and Lowell L. Wood, Jr. as inventors, filed 11 Jul. 2008 now U.S. Pat. No. 8,384,005, which is an application of which a currently co-pending application is entitled to the benefit of the filing date.

For purposes of the USPTO extra-statutory requirements, the present application constitutes a continuation-in-part of U.S. patent application Ser. No. 12/218,266, entitled SYSTEMS AND METHODS FOR PROJECTING IN RESPONSE TO POSITION, naming Edward K. Y. Jung, Eric C. Leuthardt, Royce A. Levien, Richard T. Lord, Robert W. Lord, Mark A. Malamud, John D. Rinaldo, Jr., and Lowell L. Wood, Jr. as inventors, filed 11 Jul. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/218,267, entitled SYSTEMS AND METHODS ASSOCIATED WITH PROJECTING IN RESPONSE TO CONFORMATION, naming Edward K. Y. Jung, Eric C. Leuthardt, Royce A. Levien, Richard T. Lord, Robert W. Lord, Mark A. Malamud, John D. Rinaldo, Jr., and Lowell L. Wood, Jr. as inventors, filed 11 Jul. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/218,268, entitled SYSTEMS AND METHODS ASSOCIATED WITH PROJECTING IN RESPONSE TO CONFORMATION, naming Edward K. Y. Jung, Eric C. Leuthardt, Royce A. Levien, Richard T. Lord, Robert W. Lord, Mark A. Malamud, John D. Rinaldo, Jr., and Lowell L. Wood, Jr. as inventors, filed 11 Jul. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/220,906, entitled METHODS AND SYSTEMS FOR RECEIVING AND TRANSMITTING SIGNALS ASSOCIATED WITH PROJECTION, naming Edward K. Y. Jung, Eric C. Leuthardt, Royce A. Levien, Richard T. Lord, Robert W. Lord, Mark A. Malamud, John D. Rinaldo, Jr., and Lowell L. Wood, Jr. as inventors, filed 28 Jul. 2008 now U.S. Pat. No. 8,641,203, which is an application of which a currently co-pending application is entitled to the benefit of the filing date.

For purposes of the USPTO extra-statutory requirements, the present application constitutes a continuation-in-part of U.S. patent application Ser. No. 12/229,534, entitled PROJECTION IN RESPONSE TO POSITION, naming Edward K. Y. Jung, Eric C. Leuthardt, Royce A. Levien, Richard T. Lord, Robert W. Lord, Mark A. Malamud, John D. Rinaldo, Jr., and Lowell L. Wood, Jr. as inventors, filed 22 Aug. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/229,518, entitled PROJECTION IN RESPONSE TO CONFORMATION, naming Edward K. Y. Jung, Eric C. Leuthardt, Royce A. Levien, Richard T. Lord, Robert W. Lord, Mark A. Malamud, John D. Rinaldo, Jr., and Lowell L. Wood, Jr. as inventors, filed 22 Aug. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/229,505, entitled METHODS AND SYSTEMS FOR PROJECTING IN RESPONSE TO POSITION, naming Edward K. Y. Jung, Eric C. Leuthardt, Royce A. Levien, Richard T. Lord, Robert W. Lord, Mark A. Malamud, John D. Rinaldo, Jr., and Lowell L. Wood, Jr. as inventors, filed 22 Aug. 2008 now U.S. Pat. No. 8,602,564, which is an application of which a currently co-pending application is entitled to the benefit of the filing date.

For purposes of the USPTO extra-statutory requirements, the present application constitutes a continuation-in-part of U.S. patent application Ser. No. 12/229,519, entitled METHODS AND SYSTEMS FOR PROJECTING IN RESPONSE TO POSITION, naming Edward K. Y. Jung, Eric C. Leuthardt, Royce A. Levien, Richard T. Lord, Robert W. Lord, Mark A. Malamud, John D. Rinaldo, Jr., and Lowell L. Wood, Jr. as inventors, filed 22 Aug. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/229,536, entitled METHODS AND SYSTEMS FOR PROJECTING IN RESPONSE TO CONFORMATION, naming Edward K. Y. Jung, Eric C. Leuthardt, Royce A. Levien, Richard T. Lord, Robert W. Lord, Mark A. Malamud, John D. Rinaldo, Jr., and Lowell L. Wood, Jr. as inventors, filed 22 Aug. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/229,508, entitled METHODS AND SYSTEMS FOR PROJECTING IN RESPONSE TO CONFORMATION, naming Edward K. Y. Jung, Eric C. Leuthardt, Royce A. Levien, Richard T. Lord, Robert W. Lord, Mark A. Malamud, John D. Rinaldo, Jr., and Lowell L. Wood, Jr. as inventors, filed 22 Aug. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/286,731, entitled PROJECTION ASSOCIATED METHODS AND SYSTEMS, naming Edward K. Y. Jung, Eric C. Leuthardt, Royce A. Levien, Richard T. Lord, Robert W. Lord, Mark A. Malamud, John D. Rinaldo, Jr., and Lowell L. Wood, Jr. as inventors, filed 30 Sep. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/286,750, entitled PROJECTION ASSOCIATED METHODS AND SYSTEMS, naming Edward K. Y. Jung, Eric C. Leuthardt, Royce A. Levien, Richard T. Lord, Robert W. Lord, Mark A. Malamud, John D. Rinaldo, Jr., and Lowell L. Wood, Jr. as inventors, filed 30 Sep. 2008 now abandoned, which is an application of which a currently co-pending application is entitled to the benefit of the filing date.

For purposes of the USPTO extra-statutory requirements, the present application constitutes a continuation-in-part of U.S. patent application Ser. No. 12/290,240, entitled METHODS ASSOCIATED WITH RECEIVING AND TRANSMITTING INFORMATION RELATED TO PROJECTION, naming Edward K. Y. Jung, Eric C. Leuthardt, Royce A. Levien, Richard T. Lord, Robert W. Lord, Mark A. Malamud, John D. Rinaldo, Jr., and Lowell L. Wood, Jr. as inventors, filed 27 Oct. 2008 now U.S. Pat. No. 8,267,526, which is an application of which a currently co-pending application is entitled to the benefit of the filing date.

For purposes of the USPTO extra-statutory requirements, the present application constitutes a continuation-in-part of U.S. patent application Ser. No. 12/290,241, entitled SYSTEMS ASSOCIATED WITH RECEIVING AND TRANSMITTING INFORMATION RELATED TO PROJECTION, naming Edward K. Y. Jung, Eric C. Leuthardt, Royce A. Levien, Richard T. Lord, Robert W. Lord, Mark A. Malamud, John D. Rinaldo, Jr., and Lowell L. Wood, Jr. as inventors, filed 27 Oct. 2008 now U.S. Pat. No. 8,308,304, which is an application of which a currently co-pending application is entitled to the benefit of the filing date.

For purposes of the USPTO extra-statutory requirements, the present application constitutes a continuation-in-part of U.S. patent application Ser. No. 12/291,019, entitled METHODS ASSOCIATED WITH PROJECTION BILLING, naming Edward K. Y. Jung, Eric C. Leuthardt, Royce A. Levien, Richard T. Lord, Robert W. Lord, Mark A. Malamud, John D. Rinaldo, Jr., and Lowell L. Wood, Jr. as inventors, filed 30 Oct. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/291,024, entitled SYSTEMS ASSOCIATED WITH PROJECTION BILLING, naming Edward K. Y. Jung, Eric C. Leuthardt, Royce A. Levien, Richard T. Lord, Robert W. Lord, Mark A. Malamud, John D. Rinaldo, Jr., and Lowell L. Wood, Jr. as inventors, filed 30 Oct. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/291,023, entitled METH- ODS ASSOCIATED WITH PROJECTION SYSTEM BILLING, naming Edward K. Y. Jung, Eric C. Leuthardt, Royce A. Levien, Richard T. Lord, Robert W. Lord, Mark A. Malamud, John D. Rinaldo, Jr., and Lowell L. Wood, Jr. as inventors, filed 30 Oct. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/291,025, entitled SYSTEMS ASSOCIATED WITH PROJECTION SYSTEM BILLING, naming Edward K. Y. Jung, Eric C. Leuthardt, Royce A. Levien, Richard T. Lord, Robert W. Lord, Mark A. Malamud, John D. Rinaldo, Jr., and Lowell L. Wood, Jr. as inventors, filed 30 Oct. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/322,063, entitled METHODS AND SYSTEMS FOR USER PARAMETER RESPONSIVE PROJECTION, naming Edward K. Y. Jung, Eric C. Leuthardt, Royce A. Levien, Richard T. Lord, Robert W. Lord, Mark A. Malamud, John D. Rinaldo, Jr., and Lowell L. Wood, Jr. as inventors, filed 27 Jan. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/322,875, entitled METHODS AND SYSTEMS FOR TRANSMITTING INSTRUCTIONS ASSOCIATED WITH USER PARAMETER RESPONSIVE PROJECTION, naming Edward K. Y. Jung, Eric C. Leuthardt, Royce A. Levien, Richard T. Lord, Robert W. Lord, Mark A. Malamud, John D. Rinaldo, Jr., and Lowell L. Wood, Jr. as inventors, filed 5 Feb. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/322,876, entitled METHODS AND SYSTEMS FOR RECEIVING INSTRUCTIONS ASSOCIATED WITH USER PARAMETER RESPONSIVE PROJECTION, naming Edward K. Y. Jung, Eric C. Leuthardt, Royce A. Levien, Richard T. Lord, Robert W. Lord, Mark A. Malamud, John D. Rinaldo, Jr., and Lowell L. Wood, Jr. as inventors, filed 5 Feb. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/380,571, entitled METHODS AND SYSTEMS FOR TRANSMITTING INFORMATION ASSOCIATED WITH THE COORDINATED USE OF TWO OR MORE USER RESPONSIVE PROJECTORS, naming Edward K. Y. Jung, Eric C. Leuthardt, Royce A. Levien, Richard T. Lord, Robert W. Lord, Mark A. Malamud, John D. Rinaldo, Jr., and Lowell L. Wood, Jr. as inventors, filed 27 Feb. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/380,582, entitled METHODS AND SYSTEMS FOR RECEIVING INFORMATION ASSOCIATED WITH THE COORDINATED USE OF TWO OR MORE USER RESPONSIVE PROJECTORS, naming Edward K. Y. Jung, Eric C. Leuthardt, Royce A. Levien, Richard T. Lord, Robert W. Lord, Mark A. Malamud, John D. Rinaldo, Jr., and Lowell L. Wood, Jr. as inventors, filed 27 Feb. 2009, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

TECHNICAL FIELD

The present disclosure relates to systems and methods that are related to coordinated projection from two or more projectors.

SUMMARY

In one aspect, a method includes but is not limited to receiving one or more requests related to projection, processing the one or more requests related to projection to attain one or more instructions for coordinated projection from two or more user responsive projectors, and projecting in response to the one or more instructions for coordinated projection from the two or more user responsive projectors. In addition to the foregoing, other aspects are described in the claims, drawings, and text forming a part of the present disclosure.

In one aspect, a system includes but is not limited to circuitry for receiving one or more requests related to projection, circuitry for processing the one or more requests related to projection to attain one or more instructions for coordinated projection from two or more user responsive projectors, and circuitry for projecting in response to the one or more instructions for coordinated projection from the two or more user responsive projectors. In addition to the foregoing, other aspects are described in the claims, drawings, and text forming a part of the present disclosure.

In one aspect, a system includes but is not limited to means for receiving one or more requests related to projection, means for processing the one or more requests related to projection to attain one or more instructions for coordinated projection from two or more user responsive projectors, and means for projecting in response to the one or more instructions for coordinated projection from the two or more user responsive projectors. In addition to the foregoing, other aspects are described in the claims, drawings, and text forming a part of the present disclosure.

In one aspect, a system includes but is not limited to a signal-bearing medium bearing one or more directions for receiving one or more requests related to projection, one or more directions for processing the one or more requests related to projection to attain one or more instructions for coordinated projection from two or more user responsive projectors, and one or more directions for projecting in response to the one or more instructions for coordinated projection from the two or more user responsive projectors. In addition to the foregoing, other system aspects are described in the claims, drawings, and text forming a part of the present disclosure.

In one or more various aspects, means include but are not limited to circuitry and/or programming for effecting the herein referenced functional aspects; the circuitry and/or programming can be virtually any combination of hardware, software, and/or firmware configured to effect the herein referenced functional aspects depending upon the design choices of the system designer. In addition to the foregoing, other system aspects means are described in the claims, drawings, and/or text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein referenced method aspects depending upon the design choices of the system designer. In addition to the foregoing, other system aspects are described in the claims, drawings, and/or text forming a part of the present application.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

FIG. 1B illustrates embodiments of components shown in FIG. 1.

FIG. 2 illustrates an operational flow 200 representing example operations related to receiving one or more requests related to projection, processing the one or more requests related to projection to attain one or more instructions for coordinated projection from two or more user responsive projectors, and projecting in response to the one or more instructions for coordinated projection from the two or more user responsive projectors.

FIGS. 3-18 illustrate alternative embodiments of the example operation flow of FIG. 2.

DETAILED DESCRIPTION

Figure 1:
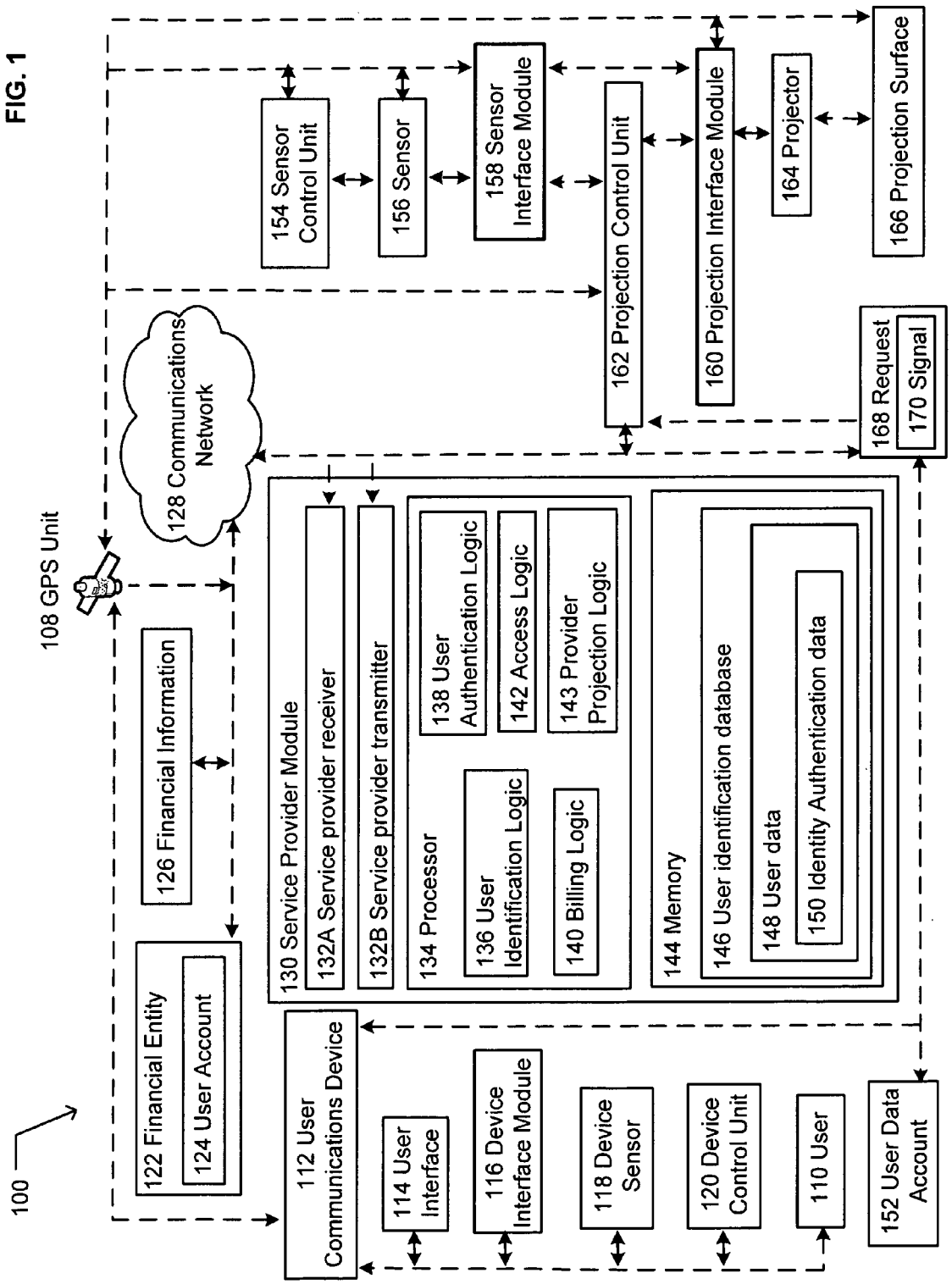
FIG. 1 illustrates an example system 100 in which embodiments may be implemented.
Figure 1A:
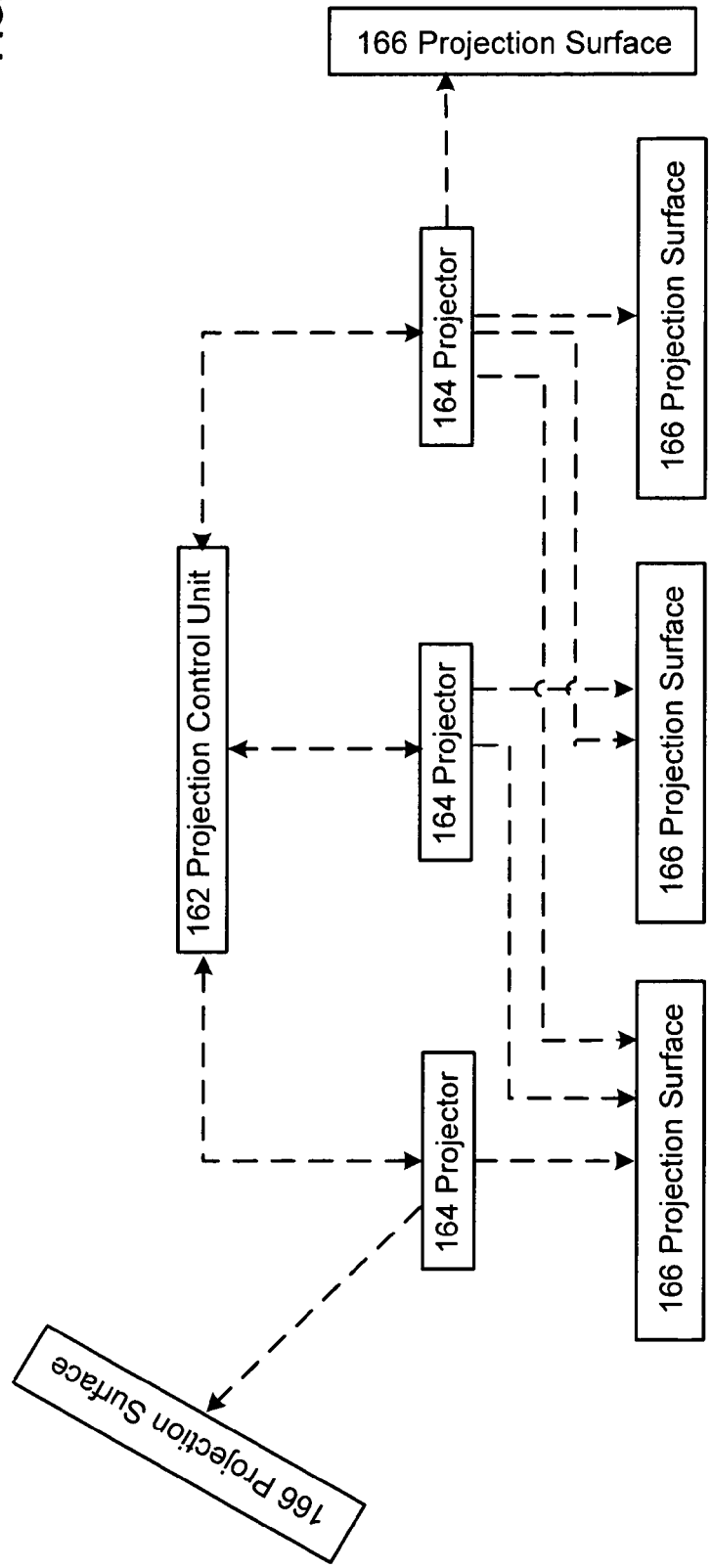
FIG. 1A illustrates embodiments of components shown in FIG. 1.
Figure 1C:
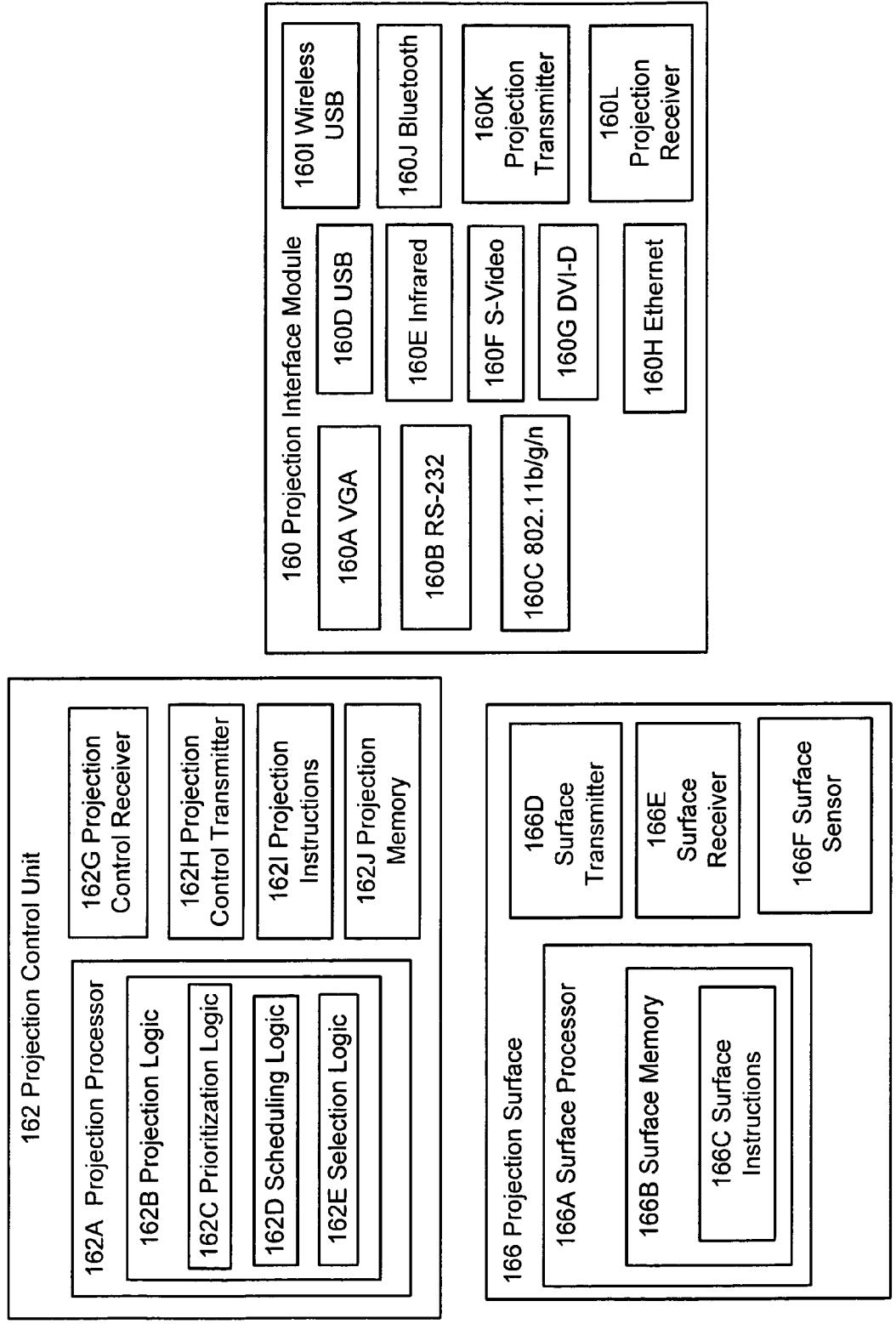
FIG. 1C illustrates embodiments of components shown in FIG. 1.
Figure 1D:
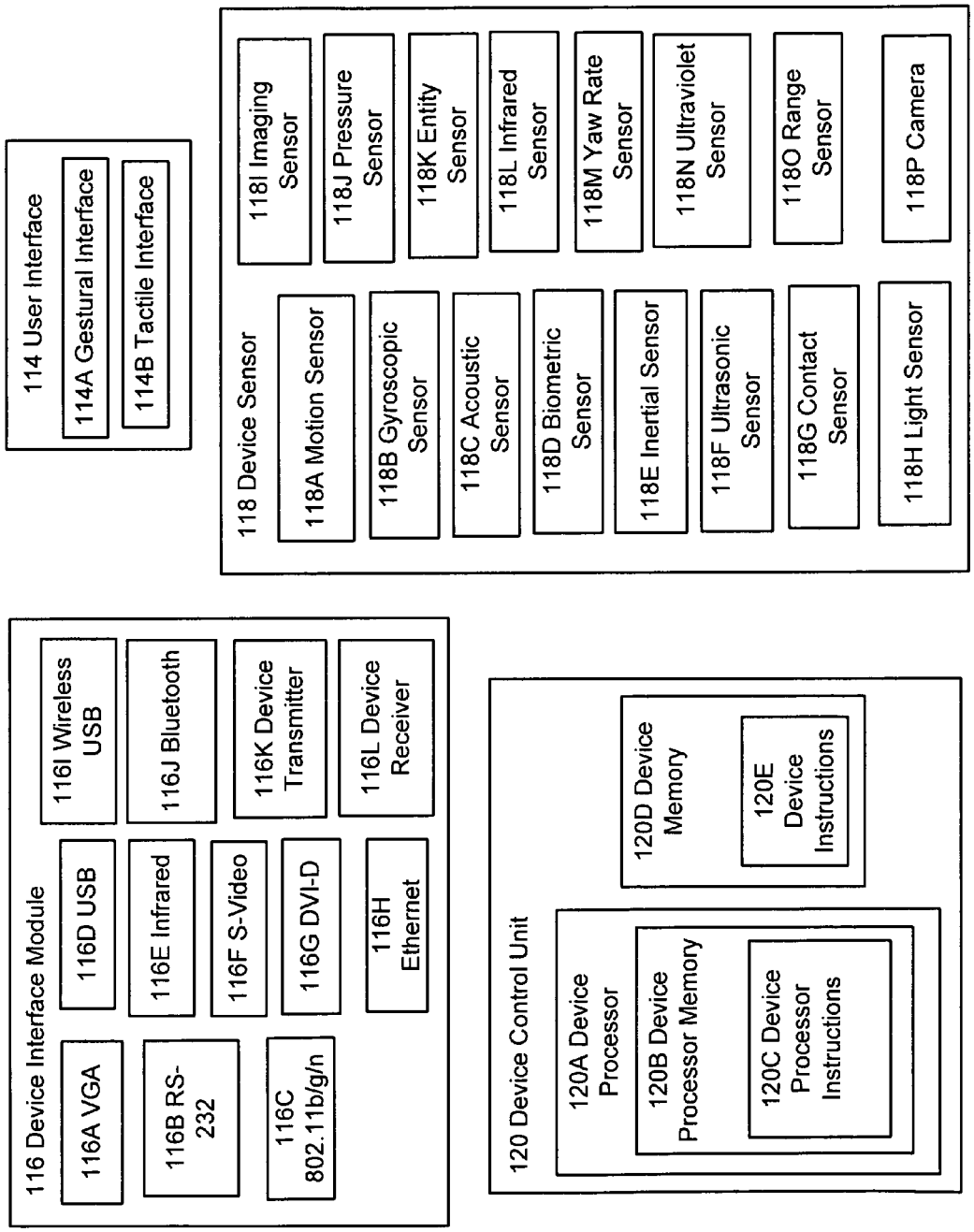
FIG. 1D illustrates embodiments of components shown in FIG. 1.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

FIG. 1 illustrates an example system 100 in which embodiments may be implemented. In some embodiments, system 100 may include one or more user communications devices 112. In some embodiments, system 100 may include one or more user interfaces 114. In some embodiments, system 100 may include one or more device interface modules 116. In some embodiments, system 100 may include one or more device sensors 118. In some embodiments, system 100 may include one or more device control units 120. In some embodiments, system 100 may include one or more sensor control units 154. In some embodiments, system 100 may include one or more sensors 156. In some embodiments, system 100 may include one or more sensor interface modules 158. In some embodiments, system 100 may include one or more projection control units 162. In some embodiments, system 100 may include one or more projectors 164. In some embodiments, system 100 may include one or more projectors 164 that are configured to project in coordination with one or more other projectors 164. In some embodiments, system 100 may include one or more projection interface modules 160. In some embodiments, system 100 may include one or more projection surfaces 166. In some embodiments, system 100 may be configured to communicate with one or more communications networks 128. In some embodiments, system 100 may be configured to communicate with one or more service provider modules 130. In some embodiments, a service provider module 130 may include one or more service provider receivers 132A. In some embodiments, a service provider module 130 may include one or more service provider transmitters 132B. In some embodiments, a service provider module 130 may include one or more processors 134. In some embodiments, a service provider module 130 may include user identification logic 136. In some embodiments, a service provider module 130 may include billing logic 140. In some embodiments, a service provider module 130 may include user authentication logic 138. In some embodiments, a service provider module 130 may include access logic 142. In some embodiments, a service provider module 130 may include memory 144. In some embodiments, a service provider module 130 may include one or more user identification databases 146. In some embodiments, a service provider module 130 may include user data 148. In some embodiments, a service provider module 130 may include identity authentication data 150. In some embodiments, system 100 may be configured to communicate with one or more financial entities 122. In some embodiments, a financial entity 122 may include one or more user accounts 124. In some embodiments, system 100 may include financial information 126. In some embodiments, system 100 may include one or more user data accounts 152.

User Communications Device

In some embodiments, system 100 may include one or more user communications devices 112. A user communications device 112 may be configured in numerous ways. For example, in some embodiments, a user communications device 112 may be configured as a personal digital assistant (PDA). In some embodiments, a user communications device 112 may be configured as a cellular telephone. In some embodiments, a user communications device 112 may be configured as a computer (e.g., a laptop computer).

In some embodiments, a user communications device 112 may be operably associated with one or more user interfaces 114. User interfaces 114 may be configured in numerous ways. Examples of such configurations include, but are not limited to, touchscreens, keyboards, and the like. In some embodiments, a user interface 114 may be configured as a gestural user interface 114A. For example, in some embodiments, a user interface 114 may be configured to respond to one or more physical actions. Examples of such physical actions include, but are not limited to, acceleration, negative acceleration, shock, squeeze, movement (e.g., substantially defined motions), and the like. In some embodiments, one or more user interfaces 114 may be configured to be programmable to respond to one or more gestures. For example, in some embodiments, one or more user interfaces 114 may be configured to respond to pressure produced by squeezing the user interface 114. In some embodiments, one or more user interfaces 114 may be configured to respond to one or more motions. Accordingly, one or more user interfaces 114 may be configured to respond to numerous types of gestures. In some embodiments, one or more user interfaces 114 may be configured to include one or more tactile interfaces 114B. In some embodiments, one or more user interfaces 114 may be configured to utilize vibration to interact with a user 110. For example, in some embodiments, a user interface 114 may be configured to vibrate if a user communications device 112 enters into proximity with one or more available projection control units 162. Accordingly, a user interface 114 may be configured to utilize numerous tactile interfaces 114B.

In some embodiments, a user communications device 112 may be operably associated with one or more device interface modules 116. In some embodiments, one or more device interface modules 116 may be configured to operably communicate with one or more projectors 164. In some embodiments, one or more projection interface modules 160 may be configured to operably communicate with one or more projection control units 162. In some embodiments, one or more projection interface modules 160 may be configured to operably communicate with one or more projection interface modules 160. In some embodiments, one or more device interface modules 116 may be configured to operably communicate with one or more service provider receivers 132A. In some embodiments, one or more device interface modules 116 may be configured to operably communicate with one or more service provider transmitters 132B. In some embodiments, one or more device interface modules 116 may be configured to operably communicate with one or more service provider modules 130. In some embodiments, one or more device interface modules 116 may be configured to operably communicate with one or more sensors 156. In some embodiments, one or more device interface modules 116 may be configured to operably communicate with one or more sensor interface modules 158. In some embodiments, one or more device interface modules 116 may be configured to operably communicate with one or more sensor control units 154. In some embodiments, one or more device interface modules 116 may be configured to operably communicate with one or more financial entities 122. In some embodiments, one or more device interface modules 116 may be configured to operably communicate with one or more communications networks 128. A device interface module 116 may communicate with other components of system 100 through use of numerous communication formats and combinations of communications formats. Examples of such formats include, but are not limited to, 116A VGA, 116D USB, 116I wireless USB, 116B RS-232, 116E infrared, 116J Bluetooth, 116C 802.11b/g/n, 116F S-video, 116H Ethernet, 116G DVI-D, and the like. In some embodiments, one or more device interface modules 116 may be configured to receive information from one or more global positioning units 108.

In some embodiments, a user communications device 112 may be operably associated with one or more device sensors 118. A user communications device 112 may be operably associated with many types of device sensors 118 alone or in combination. Examples of device sensors 118 include, but are not limited to, 118P cameras, 118H light sensors, 118O range sensors, 118G contact sensors, 118K entity sensors, 118L infrared sensors, 118M yaw rate sensors, 118N ultraviolet sensors, 118E inertial sensors, 118F ultrasonic sensors, 118I imaging sensors, 118J pressure sensors, 118A motion sensors, 118B gyroscopic sensors, 118C acoustic sensors, 118D biometric sensors, and the like. In some embodiments, one or more device sensors 118 may be configured to detect motion. In some embodiments, one or more device sensors 118 may be configured to detect motion that is imparted to one or more user communications devices 112. In some embodiments, one or more device sensors 118 may be configured to detect one or more projectors 164. In some embodiments, one or more device sensors 118 may be configured to detect one or more projection interface modules 160. In some embodiments, one or more device sensors 118 may be configured to detect one or more projection control units 162. In some embodiments, one or more device sensors 118 may be configured to detect one or more users 110. In some embodiments, one or more device sensors 118 may be configured to detect one or more individuals. In some embodiments, one or more device sensors 118 may be configured to detect one or more additional user communications devices 112.

In some embodiments, a user communications device 112 may be operably associated with one or more device control units 120. In some embodiments, a device control unit 120 may be operably associated with one or more device processors 120A. In some embodiments, a device control unit 120 may be configured to process one or more instructions. For example, in some embodiments, one or more device control units 120 may process information associated with prioritization of projection. In some embodiments, one or more device control units 120 may process information associated with scheduling projection. Accordingly, in some embodiments, one or more device control units 120 may act to control the transmission of information associated with projection. In some embodiments, a device control unit 120 may be operably associated with device processor memory 120B. Accordingly, in some embodiments, device processor memory 120B may include information associated with the operation of the device processor 120A. For example, in some embodiments, device processor memory 120B may include device processor instructions 120C. Device processor instructions 120C may include numerous types of instructions. For example, in some embodiments, device processor instructions 120C may instruct one or more device processors 120A to correlate one or more motions that are imparted to a device with one or more commands. In some embodiments, a device control unit 120 may be operably associated with device memory 120D. Device memory 120D may include numerous types of information. Examples of such information include, but are not limited to, pictures, text, internet addresses, maps, instructions, and the like. In some embodiments, device memory 120D may include device instructions 120E. For example, in some embodiments, device instructions 120E may instruct a device to pair a certain communications protocol with another device (e.g., use of Bluetooth to communicate with a laptop computer).

Financial Entity

In some embodiments, system 100 may be configured to communicate with one or more financial entities 122. System 100 may be configured to communicate with numerous types of financial entities 122. Examples of such financial entities 122 include, but are not limited to, banks, credit unions, retail stores, credit card companies, issuers of prepaid service cards (e.g., prepaid telephone cards, prepaid internet cards, etc.). In some embodiments, a financial entity 122 may include a user account 124. Examples of such user accounts 124 include, but are not limited to, checking accounts, savings accounts, prepaid service accounts, credit card accounts, and the like.

Financial Information

In some embodiments, system 100 may include financial information 126. For example, in some embodiments, system 100 may include memory in which financial information 126 may be saved. In some embodiments, system 100 may include access to financial information 126. For example, in some embodiments, system 100 may include access codes that may be used to access financial information 126. In some embodiments, financial information 126 may include information about an individual (e.g., credit history, prepaid accounts, checking accounts, saving accounts, credit card accounts, and the like). In some embodiments, financial information 126 may include information about an institution (e.g., information about an institution that issues credit cards, prepaid service cards, automatic teller machine cards, and the like). Accordingly, in some embodiments, system 100 may be configured to allow a user 110 to access financial information 126 to pay for the use of system 100 or a component thereof. In some embodiments, financial information 126 may include financial transactions (e.g. funds transfers), financial reports (e.g. account statements), financial requests (e.g. credit checks), and the like. Numerous types of financial entities 122 may receive the transmitted financial information 126. The financial entity 122 may include banking systems, credit systems, online payment systems (e.g. PayPal®), bill processing systems, and the like. The financial entity 122 including a user account 124 may be maintained as a component of the service provider module 130 or as an independent service.

Service Provider Module

In some embodiments, system 100 may be configured to communicate with one or more service provider modules 130. The service provider module 130 may be an integrated or distributed server system associated with one or more communications networks 128. Numerous types of communications networks 128 may be used. Examples of communications networks 128 may include, but are not limited to, a voice over internet protocol (VoIP) network (e.g. networks maintained by Vonage®, Verizon®, Sprint®), a cellular network (e.g. networks maintained by Verizon®, Sprint®, AT&T®, T-Mobile®), a text messaging network (e.g. an SMS system in GSM), an e-mail system (e.g. an IMAP, POP3, SMTP, and/or HTTP e-mail server), and the like.

The service provider module 130 may include one or more service provider receivers 132A. The service provider module 130 may include one or more service provider transmitters 132B. Numerous types of service provider receivers 132A and transmitters 132B may be used. Examples of service provider receivers 132A and transmitters 132B may include, but are not limited to, a cellular transceiver, a satellite transceiver, a network portal (e.g. a modem linked to an internet service provider), and the like.

The service provider module 130 may include a processor 134. Numerous types of processors 134 may be used (e.g. general purpose processors 134 such as those marketed by Intel® and AMD, application specific integrated circuits, and the like). For example, the processor 134 may include, but is not limited to, one or more logic blocks capable of performing one or more computational functions, such as user identification logic 136, user-authentication logic 138, billing logic 140, access logic 142, and the like.

The service provider module 130 may include a memory 144. Numerous types of memory 144 may be used (e.g. RAM, ROM, flash memory, and the like). The memory 144 may include, but is not limited to, a user identification database 146 including user data 148 for one or more users 110. A user identification database 146 item for a user 110 may include one or more fields including identity authentication data 150.

The user data 148 may include data representing various identification characteristics of one or more users 110. The identification characteristics of the one or more users 110 may include, but are not limited to, user names, identification numbers, telephone numbers (e.g., area codes, international codes), images, voice prints, locations, ages, gender, physical trait, and the like.

Sensor Control Unit

System 100 may include one or more sensor control units 154. In some embodiments, one or more sensor control units 154 may be operably associated with one or more sensors 156. In some embodiments, one or more sensor control units 154 may be operably associated with one or more sensor interface modules 158. In some embodiments, one or more sensor control units 154 may be operably associated with one or more sensor processors 154A. In some embodiments, one or more sensor control units 154 may be operably associated with sensor processor memory 154B. In some embodiments, one or more sensor control units 154 may be operably associated with one or more sensor processor instructions 154C. In some embodiments, one or more sensor control units 154 may be operably associated with sensor memory 154D. In some embodiments, one or more sensor control units 154 may be operably associated with one or more sensor instructions 154E. In some embodiments, one or more sensor control units 154 may facilitate the transmission of one or more signals 170 that include information associated with one or more changes in sensor 156 response. For example, in some embodiments, one or more signals 170 that include information associated with a change in one or more features associated with one or more projection surfaces 166 may be transmitted. The one or more signals 170 may be received by one or more projection control units 162 and used to facilitate projection by one or more projectors 164 in response to the one or more signals 170. In some embodiments, one or more sensor control units 154 may use prior sensor response, user input, or other stimulus, to activate or deactivate one or more sensors 156 or other subordinate features contained within one or more sensor control units 154.

Sensor

System 100 may include one or more sensors 156. In some embodiments, one or more sensors 156 may be operably associated with one or more sensor control units 154. In some embodiments, one or more sensors 156 may be operably associated with one or more sensor interface modules 158. System 100 may include many types of sensors 156 alone or in combination. Examples of sensors 156 include, but are not limited to, 156P cameras, 156H light sensors, 156O range sensors, 156G contact sensors, 156K entity sensors, 156L infrared sensors, 156M yaw rate sensors, 156N ultraviolet sensors, 156E inertial sensors, 156F ultrasonic sensors, 156I imaging sensors, 156J pressure sensors, 156A motion sensors, 156B gyroscopic sensors, 156C acoustic sensors, 156D biometric sensors, and the like. In some embodiments, one or more sensors 156 may be configured to detect motion. In some embodiments, one or more sensors 156 may be configured to detect motion that is imparted to one or more projection surfaces 166. In some embodiments, one or more sensors 156 may be configured to detect the availability of one or more projection surfaces 166.

Sensor Interface Module

System 100 may include one or more sensor interface modules 158. In some embodiments, one or more sensor interface modules 158 may be operably associated with one or more sensor control units 154. In some embodiments, one or more sensor interface modules 158 may be operably associated with one or more sensors 156. In some embodiments, one or more sensor interface modules 158 may be configured to communicate with one or more user interfaces 114. A sensor interface module 158 may communicate with other components of system 100 through use of numerous communication formats and combinations of communications formats. Examples of such formats include, but are not limited to, 158A VGA, 158D USB, 158I wireless USB, 158B RS-232, 158E infrared, 158J Bluetooth, 158C 802.11b/g/n, 158F S-video, 158H Ethernet, 158G DVI-D, and the like. In some embodiments, a sensor interface module 158 may include one or more sensor transmitters 158K. In some embodiments, a sensor interface module 158 may include one or more sensor receivers 158L.

Projection Control Unit

System 100 may include one or more projection control units 162. In some embodiments, one or more projection control units 162 may be operably associated with one or more projectors 164. In some embodiments, one or more projection control units 162 may be operably associated with one or more projection interface modules 160. In some embodiments, one or more projection control units 162 may be operably associated with one or more projectors 164 and one or more projection interface modules 160. In some embodiments, a projection control unit 162 may be operably associated with one or more projection processors 162A. In some embodiments, a projection control unit 162 may be operably associated with projection memory 162J. In some embodiments, a projection control unit 162 may be operably associated with one or more projection instructions 162I. In some embodiments, a projection control unit 162 may be operably associated with one or more projection control transmitters 162H. In some embodiments, a projection control unit 162 may be operably associated with one or more projection control receivers 162G. In some embodiments, a projection control unit 162 may be operably associated with one or more projection processors 162A that include projection logic 162B. Examples of such projection logic 162B include, but are not limited to, prioritization logic 162C (e.g., logic for prioritizing projection in response to one or more requests from one or more specific individuals), scheduling logic 162D (e.g., logic for scheduling projection in response to the availability of one or more projectors 164, one or more projection surfaces 166, or the combination of one or more projectors 164 and one or more projection surfaces 166), selection logic 162E (e.g., logic for selecting content in response to one or more requests from one or more specific individuals), projection logic 162B (e.g., logic for selecting projection parameters in response to one or more features associated with one or more projection surfaces 166), and the like. In some embodiments, a projection control unit 162 may be configured to modulate output projected by one or more projectors 164. In some embodiments, one or more projection control units 162 may be configured to select one or more wavelengths of light that will be projected by one or more projectors 164. For example, in some embodiments, one or more projection control units 162 may select one or more wavelengths of ultraviolet light that will be projected by one or more projectors 164. In some embodiments, one or more projection control units 162 may select one or more wavelengths of visible light that will be projected by one or more projectors 164. In some embodiments, one or more projection control units 162 may select one or more wavelengths of infrared light that will be projected by one or more projectors 164. Accordingly, in some embodiments, one or more projection control units 162 may select numerous wavelengths of light that will be projected by one or more projectors 164.

In some embodiments, one or more projection control units 162 may select content that is to be projected by one or more projectors 164. In some embodiments, one or more projection control units 162 may select content that is to be projected in response to one or more requests from one or more users 110. For example, in some embodiments, one or more projection control units 162 may select content that is appropriate for children in response to a request 168 from a child. In some embodiments, one or more projection control units 162 may modulate output that is projected by one or more projectors 164. In some embodiments, one or more projection control units 162 may modulate the intensity of light that is projected by one or more projectors 164. In some embodiments, one or more projection control units 162 may modulate the brightness of light that is projected by one or more projectors 164. In some embodiments, one or more projection control units 162 may modulate the contrast of light that is projected by one or more projectors 164. In some embodiments, one or more projection control units 162 may modulate the sharpness of light that is projected by one or more projectors 164.

In some embodiments, one or more projection control units 162 may modulate the direction of output that is projected by one or more projectors 164. In some embodiments, one or more projection control units 162 may direct output from one or more projectors 164 onto one or more moving projection surfaces 166. In some embodiments, one or more projection control units 162 may direct output from one or more projectors 164 onto one or more stationary projection surfaces 166. In some embodiments, one or more projection control units 162 may direct output from one or more projectors 164 onto one or more moving projection surfaces 166 and onto one or more stationary projection surfaces 166. In some embodiments, one or more projection control units 162 may direct output from one or more projectors 164 onto multiple projection surfaces 166. For example, in some embodiments, one or more projection control units 162 may direct output from one or more projectors 164 onto a first projection surface 166 and direct output from one or more projectors 164 onto a second projection surface 166.

In some embodiments, one or more projection control units 162 may direct output from two or more projectors 164 in a coordinated manner. For example, in some embodiments, one or more projection control units 162 may coordinate output from two or more projectors 164 onto the same projection surface 166. In some embodiments, one or more projection control units 162 may coordinate output from two or more projectors 164 onto one or more projection surfaces 166. In some embodiments, one or more projection control units 162 may coordinate output of content from two or more projectors 164. For example, in some embodiments, one or more projection control units 162 may coordinate projection of a first set of content from a first projector 164 and projection of a second set of content from a second projector 164. Accordingly, in some embodiments, one or more projection control units 162 may coordinate projection of content in accordance with the type of content that is projected. For example, in some embodiments, a high resolution projector may be used to project high resolution content and a low resolution projector may be used to project low resolution content in a coordinated manner. In some embodiments, one or more projection control units 162 may coordinate the projection of three-dimensional images (e.g., isometric projection, oblique projection, cavalier projection, one-point perspective projection). Accordingly, numerous methods may be used to coordinate projection from two or more projectors 164. For example, tiling may be used to coordinate projection from two or more projectors 164 (e.g., Christie Digital Systems USA, Inc., Cypress, Calif.).

In some embodiments, one or more projection control units 162 may dynamically modulate output from one or more projectors 164. For example, in some embodiments, one or more projectors 164 may be carried from room to room such that one or more projection control units 162 modulate output from the one or more projectors 164 in response to the available projection surface 166. In some embodiments, one or more projection control units 162 may dynamically modulate output from two or more projectors 164.

In some embodiments, one or more projection control units 162 may be configured to respond to one or more substantially defined motions. In some embodiments, a user 110 may program one or more projection control units 162 to correlate one or more substantially defined motions with one or more projection commands. For example, in some embodiments, a user 110 may program one or more projection control units 162 to correlate clockwise motion of a user communications device 112 with a command to advance a projected slide presentation by one slide. Accordingly, in some embodiments, a projection control unit 162 may be configured to project in response to substantially defined motions that are programmed according to the preferences of an individual user 110.

Projector

System 100 may include one or more projectors 164. In some embodiments, a projector may be a user responsive projector 164 that is configured to project for an individual user 110 in an individualized manner. In some embodiments, a user responsive projector 164 may be configured to be controllable by an individual user 110 and/or group of users 110. For example, in some embodiments, a user responsive projector 164 may be directed to project onto one or more projection surfaces 166 that are selected by a user 110. Accordingly, in some embodiments, numerous functions of a user responsive projector 164 may be controlled by a user 110 in an individualized manner.

In some embodiments, a projector 164 may be operably associated with one or more projection control units 162. In some embodiments, a projector 164 may be operably associated with one or more projection interface modules 160. In some embodiments, a projector 164 may be operably associated with one or more projection processors 162A. In some embodiments, a projector 164 may be operably associated with projection memory 162J. In some embodiments, a projector 164 may be operably associated with one or more projection instructions 162I. In some embodiments, a projector 164 may be operably associated with projection logic 162B. In some embodiments, a projector 164 may be operably associated with one or more projection instructions 162I. In some embodiments, a projector 164 may be an image stabilized projector 164. In some embodiments, two or more projectors 164 may be configured for coordinated projection. For example, in some embodiments, two or more projectors 164 may be positioned to project onto the same projection surface 166. In some embodiments, two or more projectors 164 may be configured for tiled projection of content.

System 100 may include numerous types of projectors 164. In some embodiments, a projector 164 may include inertia and yaw rate sensors that detect motion and provide for adjustment of projected content to compensate for the detected motion. In some embodiments, a projector 164 may include an optoelectronic inclination sensor and an optical position displacement sensor to provide for stabilized projection (e.g., U.S. Published Patent Application No. 2003/0038927). In some embodiments, a projector 164 may include an optoelectronic inclination sensor, an optical position sensitive detector, and a piezoelectric accelerometer that provide for stabilized projection (e.g., U.S. Published Patent Application No. 2003/0038928). Image stabilized projectors 164 have been described (e.g., U.S. Pat. No. 7,284,866; U.S. Published Patent Application Nos. 20050280628; 20060103811, and 2006/0187421). In some embodiments, one or more projectors 164 may be modified to become image stabilized projectors 164. Examples of such projectors 164 have been described (e.g., U.S. Pat. Nos. 6,002,505; 6,764,185; 6,811,264; 7,036,936; 6,626,543; 7,134,078; 7,355,584; U.S. Published Patent Application No. 2007/0109509).

Projectors 164 may be configured to project numerous wavelengths of light. In some embodiments, a projector 164 may be configured to project ultraviolet light. In some embodiments, a projector 164 may be configured to project visible light. In some embodiments, a projector 164 may be configured to project infrared light. In some embodiments, a projector 164 may be configured to project numerous combinations of light. For example, in some embodiments, a projector 164 may project one or more infrared calibration images and one or more visible images.

Numerous types of projectors 164 may be used within system 100. In some embodiments, analog projectors 164 may be used within system 100. In some embodiments, digital projectors 164 may be used within system 100. In some embodiments, combinations of projector 164 types may be used within system 100. In some embodiments, pico-projectors 164 may be used within system 100 (e.g., Texas Instruments, Dallas, Tex.; Microvision, Redmond, Wash.; Toshiba, New York, N.Y.; WowWee Group Limited, Carlsbad, Calif.). Numerous configurations of projectors 164 may be used within system 100. In some embodiments, projectors 164 may be mounted within a venue. For example, in some embodiments, one or more projectors 164 may be mounted within a venue on walls, ceilings, floors, dividers, furniture, etc. Accordingly, in some embodiments, a user 110 may enter into a venue and utilize one or more projectors 164 that are present at a venue. In some embodiments, system 100 may include projectors 164 that are portable. In some embodiments, a venue may include portable projectors 164 that are operable within system 100. For example, in some embodiments, a user 110 may enter a venue and obtain a projector 164 (e.g., rent a projector 164, borrow a projector 164) that may be operably connected for use within system 100. Accordingly, in some embodiments, a user 110 may take one or more projectors 164 to substantially any accessible location within a venue and utilize the one or more projectors 164 to project material onto substantially any projection surface 166 that is available for projection. Accordingly, system 100 may be configured to utilize numerous types of projectors 164.

Projection Interface Module

System 100 may include one or more projection interface modules 160. In some embodiments, one or more projection interface modules 160 may be operably associated with one or more projection control units 162. In some embodiments, one or more projection interface modules 160 may be operably associated with one or more projectors 164. A projection interface module 160 may communicate with other components of system 100 through use of numerous communication formats and combinations of communications formats. Examples of such formats include, but are not limited to, 160A VGA, 160D USB, 160I wireless USB, 160B RS-232, 160E infrared, 160J Bluetooth, 160C 802.11b/g/n, 160F S-video, 160H Ethernet, 160G DVI-D, and the like. In some embodiments, a projection interface module 160 may include one or more projection transmitters 160K. In some embodiments, a projection interface module 160 may include one or more projection receivers 160L.

Projection Surface

System 100 may include one or more projection surfaces 166. In some embodiments, nearly any surface may be utilized as a projection surface 166. In some embodiments, a projection surface 166 may be mounted (e.g., mounted on a wall, ceiling, floor, etc). In some embodiments, a projection surface 166 may be portable. In some embodiments, a projection surface 166 may be carried by an individual person. For example, in some embodiments, a projection surface 166 may be configured as a sheet of material, a tablet, two or more sheets of material that may be separated from each other, and the like. Accordingly, in some embodiments, a projection surface 166 may be configured as a sheet of material that a user 110 may unfold and place on a surface, such as a desk, wall, floor, ceiling, etc. In some embodiments, a projection surface 166 may be a wall, a floor, a ceiling, a portion of a wall, a portion of a floor, a portion of a ceiling, and combinations thereof.

In some embodiments, a projection surface 166 may include one or more surface sensors 166F that are associated with the projection surface 166. In some embodiments, a projection surface 166 may include one or more magnetic surface sensors 166F. For example, in some embodiments, a projection surface 166 may include magnetic surface sensors 166F that are configured to detect magnetic ink that is applied to the projection surface 166. In some embodiments, a projection surface 166 may include one or more pressure surface sensors 166F. For example, in some embodiments, a projection surface 166 may include pressure surface sensors 166F that are configured to detect pressure that is applied to the projection surface 166 (e.g., contact of a stylus with the projection surface 166, contact of a pen with the projection surface 166, contact of a pencil with the projection surface 166, etc.). In some embodiments, a projection surface 166 may include one or more motion surface sensors 166F. For example, in some embodiments, a projection surface 166 may include motion surface sensors 166F that are configured to detect movement associated with the projection surface 166. In some embodiments, a projection surface 166 may include one or more strain surface sensors 166F. For example, in some embodiments, a projection surface 166 may include strain surface sensors 166F that are configured to detect changes in conformation associated with the projection surface 166. In some embodiments, a projection surface 166 may include one or more positional surface sensors 166F (e.g., global positioning surface sensors 166F). For example, in some embodiments, a projection surface 166 may include positional surface sensors 166F that are configured to detect changes in position associated with the projection surface 166.

A projection surface 166 may be constructed from numerous types of materials and combinations of materials. Examples of such materials include, but are not limited to, cloth, plastic, metal, ceramics, paper, wood, leather, glass, and the like. In some embodiments, one or more projection surfaces 166 may exhibit electrochromic properties. In some embodiments, one or more projection surfaces 166 may be coated. For example, in some embodiments, a projection surface 166 may be coated with paint. In some embodiments, a projection surface 166 may include one or more materials that alter light. For example, in some embodiments, a projection surface 166 may convert light (e.g., up-convert light, down-convert light).

In some embodiments, a projection surface 166 may be associated with one or more fiducials. For example, in some embodiments, one or more fluorescent marks may be placed on a projection surface 166. In some embodiments, one or more phosphorescent marks may be placed on a projection surface 166. In some embodiments, one or more magnetic materials may be placed on a projection surface 166. In some embodiments, fiducials may be placed on a projection surface 166 in numerous configurations. For example, in some embodiments, fiducials may be positioned in association with a projection surface 166 such that they form a pattern. In some embodiments, a projection surface 166 may include one or more calibration images.

In some embodiments, a projection surface 166 may include one or more surface transmitters 166D. Accordingly, in some embodiments, a projection surface 166 may be configured to transmit one or more signals 170. Such signals 170 may include numerous types of information. Examples of such information may include, but are not limited to, information associated with: one or more positions of one or more projection surfaces 166, one or more conformations of one or more projection surfaces 166, one or more changes in the position of one or more projection surfaces 166, one or more changes in the conformation of one or more projection surfaces 166, one or more motions associated with one or more projection surfaces 166, one or more changes in the motion of one or more projection surfaces 166, and the like.

In some embodiments, a projection surface 166 may include one or more surface receivers 166E. Accordingly, in some embodiments, a projection surface 166 may be configured to receive one or more signals 170. For example, in some embodiments, one or more surface receivers 166E may receive one or more signals 170 that are transmitted by one or more projection transmitters 160K. In some embodiments, one or more surface receivers 166E may receive one or more signals 170 that are transmitted by one or more sensor transmitters 158K.

In some embodiments, a projection surface 166 may include one or more surface processors 166A. Accordingly, in some embodiments, a surface processor 166A may be configured to process information received from one or more surface sensors 166F. In some embodiments, a projection surface 166 may include surface memory 166B. In some embodiments, surface memory 166B may include one or more lookup tables that include correlation information associated with the position of one or more fiducials associated with a projection surface 166 and one or more conformations of the projection surface 166. In some embodiments, surface memory 166B may include surface instructions 166C. In some embodiments, surface instructions 166C may include instructions for a projection surface 166 to transmit one or more signals 170 that indicate that a projection surface 166 has undergone a change in conformation. In some embodiments, surface instructions 166C may include instructions for a projection surface 166 to transmit one or more signals 170 that indicate that a projection surface 166 has undergone a change in position. In some embodiments, surface instructions 166C may include instructions for a projection surface 166 to transmit one or more signals 170 that indicate that a projection surface 166 has undergone a change in motion.

In some embodiments, a projection surface 166 may be configured to include one or more recording attributes. For example, in some embodiments, a projection surface 166 may be configured to communicate with other devices. In some embodiments, a projection surface 166 may be configured to communicate with one or more printers. Accordingly, in some embodiments, a projection surface 166 may be configured to facilitate printing of content that is projected onto the projection surface 166. In some embodiments, a projection surface 166 may be configured to communicate with memory. Accordingly, in some embodiments, a projection surface 166 may be configured to facilitate capture and storage of content that is projected onto the projection surface 166 into memory. In some embodiments, a projection surface 166 may be configured to communicate with one or more communications networks 128. Accordingly, in some embodiments, a projection surface 166 may be configured to facilitate transmission of content that is projected onto the projection surface 166 over one or more communications networks 128. In some embodiments, a projection surface 166 may be configured to communicate with the internet. Accordingly, in some embodiments, a projection surface 166 may be configured to facilitate transmission of content that is projected onto the projection surface 166 over the internet.

Request

Numerous types of requests 168 may be used in association with system 100. In some embodiments, a request 168 may include unprocessed input. In some embodiments, a request 168 may include unprocessed output. In some embodiments, a request 168 may include processed input. In some embodiments, a request 168 may include processed output. For example, in some embodiments, a user communications device 112 may receive unprocessed input from one or more users 110 and then process the input to produce a request 168 that includes the processed output. In some embodiments, a user communications device 112 may receive unprocessed input from one or more users 110 and then produce a request 168 that includes the unprocessed input that was received from the one or more users 110. In some embodiments, a user communications device 112 may receive processed input (e.g., from a user interface 114, a device interface module 116, a device sensor 118, a device control unit 120, and substantially any combination thereof) and then produce a request 168 that includes processed output. In some embodiments, a request 168 may include instructions. For example, in some embodiments, a request 168 may include projection instructions 162I. In some embodiments, a request 168 may include instructions to access one or more financial entities 122. In some embodiments, a request 168 may include instructions to communicate with one or more service provider modules 130. Accordingly, a request 168 may be configured in numerous ways and include numerous types of information.

Signal

Numerous types of signals 170 may be used in association with system 100. Examples of such signals 170 include, but are not limited to, analog signals 170, digital signals 170, acoustic signals 170, optical signals 170, radio signals 170, wireless signals 170, hardwired signals 170, infrared signals 170, ultrasonic signals 170, Bluetooth signals 170, 802.11 signals 170, and the like. In some embodiments, one or more signals 170 may not be encrypted. In some embodiments, one or more signals 170 may be encrypted. In some embodiments, one or more signals 170 may be authenticated. In some embodiments, one or more signals 170 may be sent through use of a secure mode of transmission. In some embodiments, one or more signals 170 may be coded for receipt by a specific recipient. In some embodiments, such code may include anonymous code that is specific for the recipient. Accordingly, information included within one or more signals 170 may be protected against being accessed by others who are not the intended recipient. In some embodiments, one or more signals 170 may include information as one or more content packets.

In some embodiments, one or more signals 170 may include processed information. In some embodiments, one or more signals 170 may include information that has been processed by one or more sensor processors 154A. For example, in some embodiments, a sensor processor 154A may receive input from one or more sensors 156 that is processed. In some embodiments, this processed information may then be included within a signal 170 that is transmitted. In some embodiments, one or more signals 170 may include processed information that contains information that has been retrieved from sensor processor memory 154B. In some embodiments, one or more signals 170 may include processed information that contains information that has been processed through use of sensor processor instructions 154C. Accordingly, in some embodiments, one or more signals 170 may include numerous types of information that is processed. Examples of such processing may include, but are not limited to, sub-setting, generating projection commands, selecting content, selecting content for projection, selecting content that is not for projection, summarizing sensor data, transforming sensor data, supplementing sensor data, supplementing sensor data with data from external sources, and the like.

In some embodiments, one or more signals 170 may include information that has not been processed. In some embodiments, a sensor transmitter 158K may act as a conduit to transmit one or more signals 170 that include raw data. For example, in some embodiments, one or more sensor transmitters 158K may receive information from one or more sensors 156 and transmit one or more signals 170 that include the unprocessed information. Accordingly, in some embodiments, one or more signals 170 may include unprocessed information.

User

System 100 may be operated by one or more users 110. In some embodiments, a user 110 may be human. In some embodiments, a user 110 may be a non-human user 110. For example, in some embodiments, a user 110 may be a computer, a robot, and the like. In some embodiments, a user 110 may be proximate to system 100. In some embodiments, a user 110 may be remote from system 100. In some embodiments, a user 110 may be an individual.

In FIG. 2 and in following figures that include various examples of operations used during performance of a method, discussion and explanation may be provided with respect to any one or combination of the above-described examples of FIG. 1, and/or with respect to other examples and contexts. However, it should be understood that the operations may be executed in a number of other environments and contexts, and/or modified versions of FIG. 1. Also, although the various operations are presented in the sequence(s) illustrated, it should be understood that the various operations may be performed in other orders than those which are illustrated, or may be performed concurrently.

After a start operation, the operational flow 200 includes a receiving operation 210 involving receiving one or more requests related to projection. In some embodiments, one or more projection control units 162 may receive one or more requests 168 related to projection. In some embodiments, one or more projection interface modules 160 may receive one or more requests 168 related to projection. In some embodiments, one or more projection control units 162 may receive one or more requests 168 related to projection from one or more users 110. In some embodiments, one or more projection control units 162 may receive one or more requests 168 related to projection from one or more user communications devices 112. In some embodiments, one or more projection control units 162 may receive one or more requests 168 related to projection from one or more service provider modules 130. In some embodiments, one or more projection interface modules 160 may receive one or more requests 168 related to projection from one or more users 110. In some embodiments, one or more projection interface modules 160 may receive one or more requests 168 related to projection from one or more user communications devices 112. In some embodiments, one or more projection interface modules 160 may receive one or more requests 168 related to projection from one or more service provider modules 130. In some embodiments, one or more requests 168 related to projection may include one or more signals 170. In some embodiments, one or more requests 168 may include information associated with one or more individualized user parameters. In some embodiments, one or more requests 168 may include information associated with content specified by a user 110. In some embodiments, one or more requests 168 may include information associated with designated content. In some embodiments, one or more requests 168 may include information associated with one or more characteristics that are related to a specific user 110. In some embodiments, numerous types of characteristics may be related to a specific user 110. Examples of such characteristics include, but are not limited to, physical characteristics, familial characteristics, occupational characteristics, and the like. In some embodiments, individual user parameter may include numerous types of parameters. Examples of such parameters include, but are not limited to, activity parameters, membership parameters, account parameters, status parameters, group parameters, ownership parameters, privilege parameters, role parameters, capability parameters, user rights parameters, projection service parameters, fees related to projection, account balances, contextualized user parameters, contextualized projection parameters, and the like. Accordingly, in some embodiments, one or more requests 168 may be received that provide for projection that is specifically tailored to a user 110. For example, in some embodiments, projection may occur in accordance with the height of the user 110. In some embodiments, content that is projected may be selected according to the interests of a specific user 110. In some embodiments, content that is projected may be selected according to the interests of one or more specific users 110. For example, in some embodiments, a first user 110 may be interested in downhill skiing, auto racing, scuba diving, and mountain climbing while a second user 110 may be interested in knitting, cooking, mountain climbing, and renaissance art. Accordingly, in some embodiments, content that is related to mountain climbing may be selected for projection based on the overlapping interests of the first user 110 and the second user 110.

After a start operation, the operational flow 200 includes a processing operation 220 involving processing the one or more requests related to projection to attain one or more instructions for coordinated projection from two or more user responsive projectors. In some embodiments, one or more projection control units 162 may process one or more requests related to projection to attain one or more instructions for coordinated projection from two or more user responsive projectors 164. In some embodiments, one or more service provider modules 130 may process one or more requests related to projection to attain one or more instructions for coordinated projection from two or more user responsive projectors 164. In some embodiments, one or more requests 168 may be processed that include information associated with one or more individualized user parameters. In some embodiments, one or more requests 168 may be processed that include information associated with content specified by a user 110. In some embodiments, one or more requests 168 may be processed that include information associated with designated content. In some embodiments, one or more requests 168 may be processed that include information associated with one or more characteristics that are related to a specific user 110. In some embodiments, numerous types of characteristics may be processed that are related to a specific user 110. Examples of such characteristics include, but are not limited to, physical characteristics, familial characteristics, occupational characteristics, and the like. In some embodiments, individual user parameter may be processed that include numerous types of parameters. Examples of such parameters include, but are not limited to, activity parameters, membership parameters, account parameters, status parameters, group parameters, ownership parameters, privilege parameters, role parameters, capability parameters, user rights parameters, projection service parameters, fees related to projection, account balances, contextualized user parameters, contextualized projection parameters, and the like. Accordingly, in some embodiments, one or more requests 168 may be processed to provide for projection that is specifically tailored to a user 110. For example, in some embodiments, projection may occur in accordance with the height of the user 110. In some embodiments, content that is projected may be selected according to the interests of a specific user 110. In some embodiments, content that is projected may be selected according to the interests of one or more specific users 110. For example, in some embodiments, a first user 110 may be interested in downhill skiing, auto racing, scuba diving, and mountain climbing while a second user 110 may be interested in knitting, cooking, mountain climbing, and renaissance art. Accordingly, in some embodiments, one or more requests may be processed to select content that is related to mountain climbing for projection based on the overlapping interests of the first user 110 and the second user 110.

After a start operation, the operational flow 200 includes a projecting operation 230 involving projecting in response to the one or more instructions for coordinated projection from the two or more user responsive projectors. In some embodiments, one or more projectors 164 may project in response to one or more instructions for coordinated projection from two or more user responsive projectors 164. In some embodiments, two or more projectors 164 may project in response to one or more instructions for coordinated projection from two or more user responsive projectors 164. In some embodiments, one or more projectors 164 may project content that is specified by a user 110. In some embodiments, one or more projectors 164 may project designated content. In some embodiments, one or more projectors 164 may project content that is selected in response to one or more characteristics that are related to a specific user 110. In some embodiments, one or more projectors 164 may project in response to one or more physical characteristics that are related to a specific user 110. In some embodiments, one or more projectors 164 may project in response to one or more familial characteristics that are related to a specific user 110. In some embodiments, one or more projectors 164 may project in response to one or more activity parameters that are related to a specific user 110. In some embodiments, one or more projectors 164 may project in response to one or more membership parameters that are related to a specific user 110. In some embodiments, one or more projectors 164 may project in response to one or more account parameters that are related to a specific user 110. In some embodiments, one or more projectors 164 may project in response to one or more status parameters that are related to a specific user 110. In some embodiments, one or more projectors 164 may project in response to one or more requests 168 that include information associated with one or more group parameters related to a specific user 110. In some embodiments, one or more projectors 164 may project in response to one or more ownership parameters that are related to a specific user 110. In some embodiments, one or more projectors 164 may project in response to one or more privilege parameters that are related to a specific user 110. In some embodiments, one or more projectors 164 may project in response to one or more role parameters that are related to a specific user 110. In some embodiments, one or more projectors 164 may project in response to one or more capability parameters that are related to a specific user 110. In some embodiments, one or more projectors 164 may project in response to one or more user rights parameters that are related to a specific user 110. In some embodiments, one or more projectors 164 may project in response to one or more projection service parameters that are related to a specific user 110. In some embodiments, one or more projectors 164 may project in response to one or more fees that are related to projection requested by a specific user 110. In some embodiments, one or more projectors 164 may project in response to one or more account balances related to projection requested by a specific user 110. In some embodiments, one or more projectors 164 may project in response to one or more fees that are related to projection of content selected by a specific user 110. In some embodiments, one or more projectors 164 may project in response to one or more fees related to projection of designated content. In some embodiments, one or more projectors 164 may project in response to one or more individualized projection parameters. In some embodiments, one or more projectors 164 may project in response to one or more contextualized user parameters. In some embodiments, one or more projectors 164 may project in response to one or more contextualized projection parameters.

In some embodiments, one or more projectors 164 may include one or more pico-projectors 164. For example, in some embodiments, a venue (e.g., store, coffee shop, restaurant, nightclub, etc.) may include projectors 164 that are positioned at numerous positions within the venue. Accordingly, in some embodiments, a user 110 may request projection from the projectors 164 that are included within the venue.

FIG. 3 illustrates alternative embodiments of the example operational flow 200 of FIG. 2. FIG. 3 illustrates example embodiments where the receiving operation 210 may include at least one additional operation. Additional operations may include an operation 302, operation 304, operation 306, operation 308, and/or operation 310.

At operation 302, the receiving operation 210 may include receiving one or more signals that include the one or more requests related to projection. In some embodiments, one or more projection control units 162 may receive one or more signals 170 that include one or more requests 168 related to projection. In some embodiments, one or more service provider modules 130 may receive one or more signals 170 that include one or more requests 168 related to projection. Numerous types of signals 170 may be received that include one or more requests 168 related to projection. Examples of such signals 170 include, but are not limited to, wireless signals 170, Bluetooth signals 170, encrypted signals 170, non-encrypted signals 170, hardwired signals 170, and the like. In some embodiments, one or more signals 170 may be transmitted by one or more user communications devices 112. In some embodiments, one or more signals 170 may be transmitted by one or more service provider modules 130. In some embodiments, one or more signals 170 may be transmitted through one or more communications networks 128. In some embodiments, one or more signals 170 may be transmitted by one or more sensor control units 154. In some embodiments, one or more signals 170 may be transmitted by one or more sensors 156. In some embodiments, one or more signals 170 may be transmitted by one or more sensor interface modules 158. In some embodiments, one or more signals 170 may be transmitted by one or more projection interface modules 160. In some embodiments, one or more signals 170 may be transmitted by one or more projection control units 162.

At operation 304, the receiving operation 210 may include receiving one or more requests related to projection in accordance with one or more individualized user parameters. In some embodiments, one or more projection control units 162 may receive one or more requests related to projection in accordance with one or more individualized user parameters. In some embodiments, one or more service provider modules 130 may receive one or more requests related to projection in accordance with one or more individualized user parameters. Numerous types of individualized user parameters may be included within one or more requests related to projection. For example, in some embodiments, one or more requests for projection may include one or more physical characteristics that are related to an individual. In some embodiments, one or more requests for projection may include one or more mental characteristics that are related to an individual. In some embodiments, one or more requests for projection may include one or more educational characteristics that are related to an individual. In some embodiments, one or more requests for projection may include one or more societal characteristics that are related to an individual.

At operation 306, the receiving operation 210 may include receiving one or more requests that include information associated with content specified by a user. In some embodiments, one or more projection control units 162 may receive one or more requests 168 that include information associated with content specified by a user 110. In some embodiments, one or more service provider modules 130 may receive one or more requests 168 that include information associated with content specified by a user 110. In some embodiments, a user 110 may request projection of content that is provided by the user 110. For example, in some embodiments, a user 110 may enter a venue, provide a projection system with access to content that is included on a portable memory device, and request projection of the content. In some embodiments, a user 110 may request the projection of content that is specifically identified on a website. For example, in some embodiments, a user 110 may request projection of one or more music videos that are available on a website. Accordingly, in some embodiments, a user 110 may provide an address to a website where content for projection may be accessed.

At operation 308, the receiving operation 210 may include receiving one or more requests that include information associated with designated content. In some embodiments, one or more projection control units 162 may receive one or more requests 168 that include information associated with designated content. In some embodiments, one or more service provider modules 130 may receive one or more requests 168 that include information associated with designated content. In some embodiments, a user 110 may request projection of designated content that is related to a topic area. For example, in some embodiments, a user 110 may request projection of designated content that is related to scuba diving. In some embodiments, a user 110 may request projection of designated content that is related to share prices on the stock market. In some embodiments, a user 110 may request projection of designated content that is related to weather conditions at a user 110 selected location. Accordingly, numerous types of content may be designated.

At operation 310, the receiving operation 210 may include receiving one or more requests that include information associated with one or more characteristics that are related to a specific user. In some embodiments, one or more projection control units 162 may receive one or more requests 168 that include information associated with one or more characteristics that are related to a specific user 110. In some embodiments, one or more service provider modules 130 may receive one or more requests 168 that include information associated with one or more characteristics that are related to a specific user 110. Numerous characteristics may be related to a specific user 110. Examples of such characteristics include, but are not limited to, physical characteristics (e.g., height, vision, hearing, speech ability, language), cultural characteristics (e.g., country of origin, religion), activities (e.g., swimming, skiing, knitting), hobbies (e.g., coin collecting, stamp collecting), and the like. Accordingly, in some embodiments, one or more users 110 may request projection that is responsive to one or more characteristics that are related to the one or more specific users 110. For example, in some embodiments, a user 110 may request projection of content that is related to one or more hobbies that are associated with the user 110. In some embodiments, a request 168 may include instructions to project in accordance with one or more characteristics that are related to a specific user 110. In some embodiments, a request 168 may be processed to facilitate projection in accordance with one or more characteristics that are related to a specific user 110. For example, in some embodiments, a request 168 may include instructions to project in accordance with the height of a specific user 110. In some embodiments, a request 168 may include instructions to project and adjust the volume of sound associated with the projection in accordance with the hearing ability of a specific user 110.

FIG. 4 illustrates alternative embodiments of the example operational flow 200 of FIG. 2. FIG. 4 illustrates example embodiments where the receiving operation 210 may include at least one additional operation. Additional operations may include an operation 402, operation 404, operation 406, operation 408, and/or operation 410.

At operation 402, the receiving operation 210 may include receiving one or more requests that include information associated with one or more physical characteristics that are related to a specific user. In some embodiments, one or more projection control units 162 may receive one or more requests 168 that include information associated with one or more physical characteristics that are related to a specific user 110. In some embodiments, one or more service provider modules 130 may receive one or more requests 168 that include information associated with one or more physical characteristics that are related to a specific user 110. Examples of such physical characteristics include, but are not limited to, height, weight, visual ability (e.g., myopia, color blindness, etc.), hearing ability, reading ability (e.g., reading speed), and the like. Accordingly, in some embodiments, one or more requests 168 may include instructions that may be used to project in accordance with one or more physical characteristics that are related to a specific user 110. In some embodiments, a request 168 may be processed to facilitate projection in accordance with information associated with one or more physical characteristics that are related to a specific user 110. For example, in some embodiments, content may be projected in accordance with the height of a specific user 110. In some embodiments, the tone of sound that accompanies a projection may be adjusted in accordance with the auditory characteristics of a specific user 110. In some embodiments, projection characteristics (e.g., tone, contrast, sharpness) may be adjusted in accordance with the visual characteristics of a specific user 110. Accordingly, projection may be adjusted in accordance with numerous physical characteristics that are related to a specific user 110.

At operation 404, the receiving operation 210 may include receiving one or more requests that include information associated with one or more familial characteristics that are related to a specific user. In some embodiments, one or more projection control units 162 may receive one or more requests 168 that include information associated with one or more familial characteristics that are related to a specific user 110. In some embodiments, one or more service provider modules 130 may receive one or more requests 168 that include information associated with one or more familial characteristics that are related to a specific user 110. Examples of information associated with familial characteristics include, but are not limited to, information associated with parents, information associated with siblings, information associated with grandparents, information associated with children, information associated with grandchildren, information associated with relatives, and the like. In some embodiments, information associated with familial characteristics may include information associated with the health history of members of a family. For example, in some embodiments, such information may include information related to the incidence of disease (e.g., cancer, diabetes, glaucoma, etc.) within members of a family. Accordingly, in some embodiments, such information may be used within a medical context for patient related matters. In some embodiments, familiar characteristics may include pictures of family members who are related to a specific user 110. Accordingly, in some embodiments, a request 168 may include information associated with pictures of family members that are related to a specific user 110. One or more requests 168 may include numerous types of information associated with one or more familial characteristics that are related to a specific user 110. Accordingly, in some embodiments, one or more requests 168 may include instructions that may be used to project in accordance with one or more familial characteristics that are related to a specific user 110. In some embodiments, a request 168 may be processed to facilitate projection in accordance with information associated with one or more familial characteristics that are related to a specific user 110.

At operation 406, the receiving operation 210 may include receiving one or more requests that include information associated with one or more activity parameters that are related to a specific user. In some embodiments, one or more projection control units 162 may receive one or more requests 168 that include information associated with one or more activity parameters that are related to a specific user 110. In some embodiments, one or more service provider modules 130 may receive one or more requests 168 that include information associated with one or more activity parameters that are related to a specific user 110. Numerous types of information may be associated with activity parameters that are related to a specific user 110. Examples of such information include information related to types of activities (e.g., skydiving, scuba diving, mountain climbing, skiing, etc.), scheduling of activities (e.g., calendared times where activities may occur, availability of accommodations at a location where an activity may occur, etc.), other users 110 who have an interest in a common activity (e.g., other users 110 who are scuba divers), and the like. Accordingly, in some embodiments, one or more requests 168 may include instructions that may be used to project in accordance with one or more activity parameters that are related to a specific user 110. In some embodiments, a request 168 may be processed to facilitate projection in accordance with information associated with one or more activity parameters that are related to a specific user 110. For example, in some embodiments, a request 168 from one or more specific users 110 may be processed to determine activities that are common to the one or more specific users 110 to select content for projection that is of interest to all and/or a majority of the specific users 110. In some embodiments, one or more requests 168 may be received that include content that is related to one or more activity parameters that are related to a specific user 110. For example, in some embodiments, a user 110 may load content that is related to one or more activity parameters into a projection system.

At operation 408, the receiving operation 210 may include receiving one or more requests that include information associated with one or more membership parameters that are related to a specific user. In some embodiments, one or more projection control units 162 may receive one or more requests 168 that include information associated with one or more membership parameters that are related to a specific user 110. In some embodiments, one or more service provider modules 130 may receive one or more requests 168 that include information associated with one or more membership parameters that are related to a specific user 110. Numerous types of information may be associated with membership parameters that are related to a specific user 110. Examples of such information may include information related to types of memberships (e.g., health club memberships, social club memberships, credit card memberships, airline memberships), membership levels (e.g., gold card level, platinum card level, frequent flier level), membership privileges (e.g., access to frequent flier lounges, access to airline booking services), and the like. Accordingly, in some embodiments, one or more requests 168 may include instructions that may be used to project in accordance with one or more membership parameters that are related to a specific user 110. In some embodiments, a request 168 may be processed to facilitate projection in accordance with information associated with one or more membership parameters that are related to a specific user 110. In some embodiments, a request 168 from one or more specific users 110 may be processed to determine content that is available to the specific user 110. For example, in some embodiments, a request 168 may be to project airline booking information that is only available to elite frequent flier members. Accordingly, in some embodiments, one or more requests 168 may be processed to determine if a specific user 110 is an elite frequent flier member and to determine content that may be projected for the specific user 110 in accordance with their membership level. Accordingly, information that is related to one or more membership parameters may be used in numerous ways.

At operation 410, the receiving operation 210 may include receiving one or more requests that include information associated with one or more account parameters that are related to a specific user. In some embodiments, one or more projection control units 162 may receive one or more requests 168 that include information associated with one or more account parameters that are related to a specific user 110. In some embodiments, one or more service provider modules 130 may receive one or more requests 168 that include information associated with one or more account parameters that are related to a specific user 110. Numerous types of information may be associated with account parameters that are related to a specific user 110. Examples of such information may include information related to types of accounts (e.g., credit card accounts, bank accounts, prepaid accounts, gift cards), account levels (e.g., gold card level, platinum card level), account privileges (e.g., access to rewards programs), and the like. Accordingly, in some embodiments, one or more requests 168 may include instructions that may be used to project in accordance with one or more account parameters that are related to a specific user 110. In some embodiments, a request 168 may be processed to facilitate projection in accordance with information associated with one or more account parameters that are related to a specific user 110. In some embodiments, a request 168 from one or more specific users 110 may be processed to determine content that is available to the specific user 110 in accordance with one or more account parameters. For example, in some embodiments, a request 168 may be to project information that is related to a rewards program that is only available to holders of a platinum credit card account. Accordingly, in some embodiments, one or more requests 168 may be processed to determine if a specific user 110 is a holder of a platinum credit card account and to determine content that may be projected for the specific user 110 in accordance with their account information. Accordingly, information that is related to one or more account parameters may be used in numerous ways.

FIG. 5 illustrates alternative embodiments of the example operational flow 200 of FIG. 2. FIG. 5 illustrates example embodiments where the receiving operation 210 may include at least one additional operation. Additional operations may include an operation 502, operation 504, operation 506, operation 508, and/or operation 510.

At operation 502, the receiving operation 210 may include receiving one or more requests that include information associated with one or more status parameters that are related to a specific user. In some embodiments, one or more projection control units 162 may receive one or more requests 168 that include information associated with one or more status parameters that are related to a specific user 110. In some embodiments, one or more service provider modules 130 may receive one or more requests 168 that include information associated with one or more status parameters that are related to a specific user 110. Numerous types of information may be associated with status parameters that are related to a specific user 110. Examples of such information may include, but are not limited to, net worth, club memberships, ownership interests, and the like. In some embodiments, information associated with one or more status parameters may include information that is related to whether a membership is current or expired. Accordingly, in some embodiments, one or more requests 168 may include instructions that may be used to project in accordance with one or more status parameters that are related to a specific user 110. In some embodiments, a request 168 may be processed to facilitate projection in accordance with information associated with one or more status parameters that are related to a specific user 110. In some embodiments, a request 168 from one or more specific users 110 may be processed to determine content that is available to the specific user 110 in accordance with one or more status parameters. For example, in some embodiments, a request 168 may be to project information that is only available to owners of a certain type of automobile. Accordingly, in some embodiments, one or more requests 168 may be processed to determine if a specific user 110 is the owner of the type of automobile required and to determine content that may be projected for the specific user 110 in accordance with their status information. Accordingly, information that is related to one or more status parameters may be used in numerous ways.

At operation 504, the receiving operation 210 may include receiving one or more requests that include information associated with one or more group parameters that are related to a specific user. In some embodiments, one or more projection control units 162 may receive one or more requests 168 that include information associated with one or more group parameters that are related to a specific user 110. In some embodiments, one or more service provider modules 130 may receive one or more requests 168 that include information associated with one or more group parameters that are related to a specific user 110. Numerous types of information may be associated with group parameters that are related to a specific user 110. Examples of information related to group parameters may include, but are not limited to, information associated with membership in a working group, membership in a chat group, membership in a book club, participation in a computer user group, and the like. In some embodiments, information associated with one or more group parameters may include information that is related to whether a specific user 110 is a current member in a group. For example, in some embodiments, a specific user 110 may be required to participate on a regular basis to remain a member of a group and may forfeit membership in the group if the specific user 110 is inactive. In some embodiments, the level of participation in a group by a specific user 110 may be related to projection resources that are available to the specific user 110. For example, in some embodiments, greater participation with the group by a specific user 110 may result in a greater amount of projection resources being available to the specific user 110. Accordingly, in some embodiments, one or more requests 168 may include instructions that may be used to project in accordance with one or more group parameters that are related to a specific user 110. In some embodiments, a request 168 may be processed to facilitate projection in accordance with information associated with one or more group parameters that are related to a specific user 110. In some embodiments, a request 168 from one or more specific users 110 may be processed to determine content that is available to the specific user 110 in accordance with one or more group parameters. For example, in some embodiments, a request 168 may be to project information that is only available to group members who have recently been active participants with the group. Accordingly, in some embodiments, one or more requests 168 may be processed to determine if a specific user 110 has been an active participant with a group to determine content that may be projected for the specific user 110. Accordingly, information that is related to one or more group parameters may be used in numerous ways.

At operation 506, the receiving operation 210 may include receiving one or more requests that include information associated with one or more ownership parameters that are related to a specific user. In some embodiments, one or more projection control units 162 may receive one or more requests 168 that include information associated with one or more ownership parameters that are related to a specific user 110. In some embodiments, one or more service provider modules 130 may receive one or more requests 168 that include information associated with one or more ownership parameters that are related to a specific user 110. Numerous types of information may be associated with ownership parameters that are related to a specific user 110. Examples of information related to ownership parameters may include, but are not limited to, information associated with ownership of a vehicle (e.g., automobile, motorcycle, boat, airplane, helicopter), information associated with ownership of a collectable (e.g., coin, stamp, pottery, painting), information associated with ownership of a financial instrument (e.g., stock, bond, municipal bond, mutual fund), information associated with ownership of a commodity (e.g., silver, gold, platinum), and the like. Accordingly, in some embodiments, one or more requests 168 may include instructions that may be used to project in accordance with one or more ownership parameters that are related to a specific user 110. In some embodiments, a request 168 may be processed to facilitate projection in accordance with information associated with one or more ownership parameters that are related to a specific user 110. In some embodiments, a request 168 from one or more specific users 110 may be processed to determine content that is to be projected in accordance with one or more ownership parameters. For example, in some embodiments, a request 168 may be to project information for a specific user 110 who is known to own a specific type of motorcycle. Accordingly, in some embodiments, the request 168 may be processed to obtain content for projection that is related to an item owned by a specific user 110. In some embodiments, requests 168 from more than one specific user 110 may be processed to determine content that is to be projected in accordance with ownership parameters that are associated with the specific users 110. For example, in some embodiments, ownership parameters associated with two specific users 110 may be processed to determine that both specific users 110 own large boats and material related to boating may be selected for projection in accordance with the ownership parameters. Accordingly, information that is related to one or more ownership parameters may be used in numerous ways.

At operation 508, the receiving operation 210 may include receiving one or more requests that include information associated with one or more privilege parameters that are related to a specific user. In some embodiments, one or more projection control units 162 may receive one or more requests 168 that include information associated with one or more privilege parameters that are related to a specific user 110. In some embodiments, one or more service provider modules 130 may receive one or more requests 168 that include information associated with one or more privilege parameters that are related to a specific user 110. Numerous types of information may be associated with privilege parameters that are related to a specific user 110. Examples of information related to privilege parameters may include, but are not limited to, information associated with security clearances, information associated with viewing designated files, information associated with obtaining passwords, information associated with access codes, and the like. Accordingly, in some embodiments, one or more requests 168 may include instructions that may be used to project in accordance with one or more privilege parameters that are related to a specific user 110. In some embodiments, a request 168 may be processed to facilitate projection in accordance with information associated with one or more privilege parameters that are related to a specific user 110. In some embodiments, a request 168 from one or more specific users 110 may be processed to determine content that is to be projected in accordance with one or more privilege parameters. For example, in some embodiments, a specific user 110 may request projection of protected information. Accordingly, in some embodiments, the request 168 may be processed to confirm that the specific user 110 holds a security clearance that is appropriate to view the protected information. Accordingly, information that is related to one or more privilege parameters may be used in numerous ways.

At operation 510, the receiving operation 210 may include receiving one or more requests that include information associated with one or more role parameters that are related to a specific user. In some embodiments, one or more projection control units 162 may receive one or more requests 168 that include information associated with one or more role parameters that are related to a specific user 110. In some embodiments, one or more service provider modules 130 may receive one or more requests 168 that include information associated with one or more role parameters that are related to a specific user 110. Numerous types of information may be associated with role parameters that are related to a specific user 110. Examples of information related to role parameters may include, but are not limited to, information associated with the occupation of a specific user, information associated with the hierarchical position of a specific user 110 (e.g., supervisor, subordinate, teacher, student), information associated with an activity of a specific user 110 (e.g., presenter, audience member, reviewer, critic), and the like. Accordingly, in some embodiments, one or more requests 168 may include instructions that may be used to project in accordance with one or more role parameters that are related to a specific user 110. In some embodiments, a request 168 may be processed to facilitate projection in accordance with information associated with one or more role parameters that are related to a specific user 110. In some embodiments, a request 168 from one or more specific users 110 may be processed to determine content that is to be projected in accordance with one or more role parameters. For example, in some embodiments, a request 168 from a specific user 110 who is a teacher to project exam answers may be processed and authorized based on the role parameter of the specific user 110 being a teacher. In contrast, in some embodiments, a request 168 from a specific user 110 who is a student to project exam answers may be processed and denied based on the role parameter of the specific user 110 being a student. In some embodiments, one or more role parameters may be used to direct projection. For example, in some embodiments, a specific user 110 may be associated with a role parameter as a presenter (e.g., speaker at a conference) and have projection of lecture notes directed onto a podium for viewing by the specific user 110. In some embodiments, one or more role parameters may be used to authorize access to content for projection. For example, in some embodiments, a specific user 110 who is associated with a human resources role parameter may be authorized to access resume information for projection that is unavailable to other users 110 who are not associated with a human resources role parameter. Accordingly, information that is related to one or more role parameters may be used in numerous ways.

FIG. 6 illustrates alternative embodiments of the example operational flow 200 of FIG. 2. FIG. 6 illustrates example embodiments where the receiving operation 210 may include at least one additional operation. Additional operations may include an operation 602, operation 604, operation 606, operation 608, and/or operation 610.

At operation 602, the receiving operation 210 may include receiving one or more requests that include information associated with one or more capability parameters that are related to a specific user. In some embodiments, one or more projection control units 162 may receive one or more requests 168 that include information associated with one or more capability parameters that are related to a specific user 110. In some embodiments, one or more service provider modules 130 may receive one or more requests 168 that include information associated with one or more capability parameters that are related to a specific user 110. Numerous types of information may be associated with capability parameters that are related to a specific user 110. Examples of information related to capability parameters may include, but are not limited to, information associated with physical capabilities (e.g., ability to climb stairs, ability to walk, ability to hear, ability to see, use of a wheelchair, use of a walker), information associated with mental capabilities (e.g., ability level associated with problem solving, ability to speak, languages that are spoken by a specific user 110, phobias), social capabilities (e.g., extroverted behavior, introverted behavior, social phobias), gaming capabilities (e.g., level of play achieved on video games), and the like. Accordingly, in some embodiments, one or more requests 168 may include instructions that may be used to project in accordance with one or more capability parameters that are related to a specific user 110. In some embodiments, a request 168 may be processed to facilitate projection in accordance with information associated with one or more capability parameters that are related to a specific user 110. In some embodiments, content is to be projected in accordance with one or more capability parameters that are associated with a specific user 110. In some embodiments, a request 168 from a specific user 110 having limited mobility may be assigned for projection by one or more projectors 164 that are located in an area that is accessible to the specific user 110. For example, in some embodiments, a specific user 110 who has limited mobility may enter a multi-level venue and request projection services. Accordingly, the one or more requests 168 may be processed to identify one or more projectors 164 that are accessible to the specific user 110 based on one or more of the specific user's capability parameters. In some embodiments, projection may be directed in accordance with one or more capability parameters that are associated with a specific user 110. For example, in some embodiments, a request 168 for projection by a specific user 110 who is seated in a wheelchair may be assigned to one or more projectors 164 that are configured to project at an eye level that is appropriate for a user 110 who is seated in a wheelchair. In some embodiments, a request 168 for projection by a specific user 110 who is seated in a wheelchair may be used to configure one or more projectors 164 to project at an eye level that is appropriate for a user 110 who is seated in a wheelchair. In some embodiments, content that is to be projected may be selected in accordance with one or more capability parameters that are associated with a specific user 110. For example, in some embodiments, a request 168 from a specific user 110 to project a video game may be processed to select the level of play of the video game based on one or more gaming capability parameters that are associated with the specific user 110. Accordingly, information that is related to one or more capability parameters may be used in numerous ways.

At operation 604, the receiving operation 210 may include receiving one or more requests that include information associated with one or more user rights parameters that are related to a specific user. In some embodiments, one or more projection control units 162 may receive one or more requests 168 that include information associated with one or more user rights parameters that are related to a specific user 110. In some embodiments, one or more service provider modules 130 may receive one or more requests 168 that include information associated with one or more user rights parameters that are related to a specific user 110. Numerous types of information may be associated with user rights parameters that are related to a specific user 110. Examples of information related to user rights parameters may include, but are not limited to, information associated with rights to access content, information associated with rights to copy content, information associated with rights to view content, information associated with rights to share content, information associated with rights to distribute content, information associated with rights to project content, and the like. Accordingly, in some embodiments, one or more requests 168 may include instructions that may be used to project in accordance with one or more user rights parameters that are related to a specific user 110. In some embodiments, a request 168 may be processed to facilitate projection in accordance with information associated with one or more user rights parameters that are related to a specific user 110. In some embodiments, content for projection may be selected in accordance with one or more user rights parameters that are associated with a specific user 110. For example, a specific user 110 may be associated with one or more user rights parameters that allow access to a first set of content but do not allow access to a second set of content. Accordingly, in some embodiments, only the first set of content may be accessed for projection. Accordingly, information that is related to one or more user rights parameters may be used in numerous ways.

At operation 606, the receiving operation 210 may include receiving one or more requests that include information associated with one or more projection service parameters that are related to a specific user. In some embodiments, one or more projection control units 162 may receive one or more requests 168 that include information associated with one or more projection service parameters that are related to a specific user 110. In some embodiments, one or more service provider modules 130 may receive one or more requests 168 that include information associated with one or more projection service parameters that are related to a specific user 110. Numerous types of information may be associated with projection service parameters that are related to a specific user 110. Examples of information related to projection service parameters may include, but are not limited to, information associated with projection preferences that are associated with a specific user 110 (e.g., tone, color, brightness), information associated with the projection service level purchased by a specific user 110 (e.g., types of projection services that a specific user 110 has purchased), information associated with projection from one or more specifically requested projectors 164 (e.g., projection from one or more high resolution projectors 164, projection from one or more low resolution projectors 164, projection from a single projector 164, projection from more than one projector 164, projection from more than one projectors 164 that are coordinated with each other), and the like. Accordingly, in some embodiments, a specific user 110 may be associated with one or more projection service parameters that may be used to select one or more projectors 164 that are to be used to project content for the specific user 110.

At operation 608, the receiving operation 210 may include receiving one or more requests that include information associated with one or more fees related to projection requested by a specific user. In some embodiments, one or more projection control units 162 may receive one or more requests 168 that include information associated with one or more fees related to projection requested by a specific user 110. In some embodiments, one or more service provider modules 130 may receive one or more requests 168 that include information associated with one or more fees related to projection requested by a specific user 110. Numerous types of fees may be associated with projection. Examples of such fees include, but are not limited to, fees associated with the use of one or more projectors 164 (e.g., use of one or more specific projectors 164, use of one or more non-specified projectors 164, use of more than one projector 164 in combination with another projector 164), fees associated with the use of one or more projection surfaces 166 (e.g., use of one or more non-specified projection surfaces 166, use of one or more specific projection surfaces 166), fees associated with capture of projected content (e.g., printing of projected content, saving projected content), transmission of projected content (e.g., transmitting one or more projected images through use of a wireless connection), and the like. Accordingly, numerous types of fees that are related to projection may be associated with a specific user 110.

At operation 610, the receiving operation 210 may include receiving one or more requests that include information associated with one or more account balances related to projection requested by a specific user. In some embodiments, one or more projection control units 162 may receive one or more requests 168 that include information associated with one or more account balances related to projection requested by a specific user 110. In some embodiments, one or more service provider modules 130 may receive one or more requests 168 that include information associated with one or more account balances related to projection requested by a specific user 110. Numerous types of information may be associated with one or more account balances that are related to projection requested by a specific user 110. Examples of such information include, but are not limited to, credit card limits, bank account balance (e.g., checking account, savings account), projection account balance (e.g., prepaid account to purchase projection services), gift card balance, and the like. Accordingly, in some embodiments, information associated with one or more account balances that are associated with a specific user 110 may be received and used to determine projection services that are available to the specific user 110. For example, in some embodiments, a specific user 110 may request use of a projection system within a venue. Accordingly, information associated with one or more account balances that are associated with the specific user 110 may be used to determine if there are adequate funds available to pay for the request 168 for projection. In some embodiments, the availability of funds within one or more accounts may be used to determine what projection services are available to a specific user 110 who is associated with the one or more accounts. For example, in some embodiments, a specific user 110 may lack adequate funds within an account to project with a high resolution projector 164 but may have adequate funds to project with a low resolution projector 164. Accordingly, in some embodiments, information associated with one or more account balances may be used to determine the extent of projection services that are available to a specific user 110.

FIG. 7 illustrates alternative embodiments of the example operational flow 200 of FIG. 2. FIG. 7 illustrates example embodiments where the receiving operation 210 may include at least one additional operation. Additional operations may include an operation 702, operation 704, operation 706, operation 708, operation 710, and/or operation 712.

At operation 702, the receiving operation 210 may include receiving one or more requests that include information associated with one or more fees related to projection of content selected by a specific user. In some embodiments, one or more projection control units 162 may receive one or more requests 168 that include information associated with one or more fees related to projection of content selected by a specific user 110. In some embodiments, one or more service provider modules 130 may receive one or more requests 168 that include information associated with one or more fees related to projection of content selected by a specific user 110. Numerous types of fees may be related to projection of content selected by a specific user 110. Examples of such fees include, but are not limited to, licensing fees associated with content, access fees associated with content, subscription fees associated with content, rental fees associated with content, and the like. Accordingly, in some embodiments, information associated with such fees may be compared to one or more account balances that are associated with a specific user 110 to determine if content selected by the specific user 110 may be projected. Information that is associated with one or more fees related to projection of content selected by a specific user 110 may be used in many ways.

At operation 704, the receiving operation 210 may include receiving one or more requests that include information associated with one or more fees related to projection of designated content. In some embodiments, one or more projection control units 162 may receive one or more requests 168 that include information associated with one or more fees related to projection of designated content. In some embodiments, one or more service provider modules 130 may receive one or more requests 168 that include information associated with one or more fees related to projection of designated content. Numerous types of information may be associated with one or more fees related to projection of designated content. Examples of such information include, but are not limited to, information associated with fees that are related to the use of one or more projectors 164 (e.g., use of a high resolution projector 164, use of a low resolution projector 164, acquiring priority of projection relative to another user 110, use of multiple coordinated projectors 164), information associated with fees that are related to the use of one or more projection surfaces 166 (e.g., preferred projection surface 166, capture capability of the projection surface 166), information associated with fees that are related to projection of the designated content (e.g., licensing fees, access fees), and the like.

At operation 706, the receiving operation 210 may include receiving one or more requests that include information associated with one or more individualized projection parameters. In some embodiments, one or more projection control units 162 may receive one or more requests 168 that include information associated with one or more individualized projection parameters. In some embodiments, one or more service provider modules 130 may receive one or more requests 168 that include information associated with one or more individualized projection parameters. Numerous types of information may be associated with one or more individualized projection parameters. Examples of such information include, but are not limited to, information associated with content that is preferred by an individual, information associated with projection preferences of an individual (e.g., color, tone, brightness), information associated with fees associated with projection (e.g., cost limit associated with an individual), and the like. Accordingly, numerous types of information may be associated with one or more individualized projection parameters.

At operation 708, the receiving operation 210 may include receiving one or more requests that include information associated with one or more contextualized user parameters. In some embodiments, one or more projection control units 162 may receive one or more requests 168 that include information associated with one or more contextualized user parameters. In some embodiments, one or more service provider modules 130 may receive one or more requests 168 that include information associated with one or more contextualized user parameters. Numerous types of information may be associated with one or more contextualized user parameters. Examples of such information include, but are not limited to, information associated with the location of a user 110, information associated with the environment in which a user 110 is present, information associated with the context in which a user 110 is present, information associated with one or more reasons that a user 110 is at a venue, and the like. For example, in some embodiments, contextualized user parameters may be related to a venue in which a user 110 is present. Examples of such venues may include, but are not limited to, a restaurant, a coffee shop, a nightclub, a department store, a medical office, a dental office, a conference room, an auditorium, a classroom, an athletic event, and the like. Accordingly, in some embodiments, one or more requests 168 may include information associated with one or more venues in which a user 110 may request projection. In some embodiments, such contextualized user parameters may be used to control projection (e.g., select projection equipment that is used for projection, select content for projection). In some embodiments, one or more requests 168 may include information associated with the context with which a user 110 is present at a venue. For example, in some embodiments, a user 110 may be a presenter at a conference. Accordingly, in some embodiments, the content that is projected at the venue may be limited to one or more topics that are discussed by the user 110 in the capacity as a presenter. In some embodiments, one or more requests 168 may include information associated with the reason that a user 110 is at a location. For example, in some embodiments, a user 110 may attend an automobile show to learn about a new type of automobile. Accordingly, in some embodiments, projection of material may be limited to content that is related to automobiles. In some embodiments, one or more requests 168 may include information associated with the environment in which a user 110 is present. For example, in some embodiments, a user 110 may be present at a daycare facility. Accordingly, in some embodiments, projection of material may be limited to content that is appropriate for children.

At operation 710, the receiving operation 210 may include receiving one or more requests that include information associated with one or more contextualized projection parameters. In some embodiments, one or more projection control units 162 may receive one or more requests 168 that include information associated with one or more contextualized projection parameters. In some embodiments, one or more service provider modules 130 may receive one or more requests 168 that include information associated with one or more contextualized projection parameters. Numerous types of information may be associated with one or more contextualized projection parameters. Examples of such information include, but are not limited to, information associated with requests 168 for projection within a venue, information associated with requests 168 for projection onto one or more projection surfaces 166, information associated with requests 168 for projection through use of one or more projectors 164, information associated with requests 168 for projection through use of two or more coordinated projectors 164, and the like. For example, in some embodiments, a request 168 may include information associated with projection within a venue. Accordingly, in some embodiments, one or more projection parameters may be selected that are based upon the context of the venue where projection is requested. For example, in some embodiments, projection may be requested within a childcare center. Accordingly, in some embodiments, information may include parameters related to content that may be projected within a venue based on the type of venue in which projection is requested. In some embodiments, information may include parameters related to one or more projection surfaces 166 onto which projection is to occur. For example, in some embodiments, one or more requests 168 may include information associated with one or more specific projection surfaces 166 onto which projection is requested to occur. Accordingly, in some embodiments, such information may be used to select one or more projectors 164 that are configured and/or configurable to project onto the one or more selected projection surfaces 166. Accordingly, information associated with one or more contextualized projection parameters may be used in many ways.

At operation 712, the receiving operation 210 may include receiving one or more requests that include information associated with one or more financial transactions. In some embodiments, one or more projection control units 162 may receive one or more requests that include information associated with one or more financial transactions. In some embodiments, one or more service provider modules 130 may receive one or more requests that include information associated with one or more financial transactions. Numerous types of information may be associated with one or more financial transactions. Examples of such information include, but are not limited to, information associated with the identity of one or more parties to the financial transaction, information associated with accounts (e.g., account numbers, account balances, types of accounts), information associated with accounts receivable, information associated with balance transfers, information associated with escrow accounts, and the like. Information associated with one or more financial transactions may be used in numerous ways. In some embodiments, such information may be used to select content (e.g., bank records, account balances, fund transfer information) that may be projected for a specific user 110 (e.g., a party to the financial transaction).

FIG. 8 illustrates alternative embodiments of the example operational flow 200 of FIG. 2. FIG. 8 illustrates example embodiments where the processing operation 220 may include at least one additional operation. Additional operations may include an operation 802, operation 804, operation 806, operation 808, and/or operation 810.

At operation 802, the processing operation 220 may include processing one or more signals that include the one or more requests related to projection to attain one or more instructions for coordinated projection from the two or more user responsive projectors. In some embodiments, one or more projection control units 162 may process one or more signals that include one or more requests related to projection to attain one or more instructions for coordinated projection from two or more user responsive projectors 164. In some embodiments, one or more service provider modules 130 may process one or more signals that include one or more requests related to projection to attain one or more instructions for coordinated projection from two or more user responsive projectors 164. Numerous types of signals 170 may be processed. Examples of such signals 170 include, but are not limited to, analog signals 170, digital signals 170, acoustic signals 170, optical signals 170, radio signals 170, wireless signals 170, hardwired signals 170, infrared signals 170, ultrasonic signals 170, Bluetooth signals 170, 802.11 signals 170, and the like.

At operation 804, the processing operation 220 may include processing one or more requests related to projection in accordance with one or more individualized user parameters to attain one or more instructions for coordinated projection in accordance with the one or more individualized user parameters from the two or more user responsive projectors. In some embodiments, one or more projection control units 162 may process one or more requests 168 related to projection in accordance with one or more individualized user parameters to attain one or more instructions for coordinated projection in accordance with the one or more individualized user parameters from two or more user responsive projectors 164. In some embodiments, one or more service provider modules 130 may process one or more requests 168 related to projection in accordance with one or more individualized user parameters to attain one or more instructions for coordinated projection in accordance with the one or more individualized user parameters from two or more user responsive projectors 164. Numerous types of signals 170 may be processed that include one or more requests 168 related to projection in accordance with one or more individualized user parameters. Examples of such signals 170 include, but are not limited to, wireless signals 170, Bluetooth signals 170, encrypted signals 170, non-encrypted signals 170, hardwired signals 170, and the like.

At operation 806, the processing operation 220 may include processing one or more requests that include information associated with content specified by a user to attain one or more instructions for coordinated projection of the content specified by the user from the two or more user responsive projectors. In some embodiments, one or more projection control units 162 may process one or more requests 168 that include information associated with content specified by a user to attain one or more instructions for coordinated projection of the content specified by the user from one or more user responsive projectors 164. In some embodiments, one or more service provider modules 130 may process one or more requests 168 that include information associated with content specified by a user to attain one or more instructions for coordinated projection of the content specified by the user from two or more user responsive projectors 164. In some embodiments, a request to project content that is provided by the user 110 may be processed to format the content for projection. For example, in some embodiments, a user 110 may enter a venue, provide a projection system with access to content that is included on a portable memory device, and request projection of the content. Accordingly, the content may be processed to format the content for projection on the available projectors 164 at the venue. In some embodiments, a request to project content that is specifically identified on a website may be processed to facilitate procurement of the content. For example, in some embodiments, a user 110 may request projection of one or more music videos that are available on the internet and the request may be processed to locate the website where the music videos are located.

At operation 808, the processing operation 220 may include processing one or more requests that include information associated with designated content to attain one or more instructions for coordinated projection of the designated content from the two or more user responsive projectors. In some embodiments, one or more projection control units 162 may process one or more requests that include information associated with designated content to attain one or more instructions for coordinated projection of the designated content from two or more user responsive projectors 164. In some embodiments, one or more service provider modules 130 may process one or more requests 168 that include information associated with designated content to attain one or more instructions for coordinated projection of the designated content from two or more user responsive projectors 164. In some embodiments, a request for projection of designated content that is related to a topic area may be processed. For example, in some embodiments, a user 110 may request projection of designated content that is related to scuba diving. Accordingly, in some embodiments, the request may be processed to transform the request into one or more instructions to project content related to scuba diving. In some embodiments, a request to project designated content that is related to share prices on the stock market may be processed. In some embodiments, a request to project designated content that is related to weather conditions at a selected location may be processed. Accordingly, numerous types of designated content may be processed to instruct one or more projectors 164.

At operation 810, the processing operation 220 may include processing one or more requests that include information associated with one or more characteristics that are related to a specific user to attain one or more instructions for coordinated projection in accordance with the one or more characteristics related to the specific user from the two or more user responsive projectors. In some embodiments, one or more projection control units 162 may process one or more requests 168 that include information associated with one or more characteristics that are related to a specific user to attain one or more instructions for coordinated projection in accordance with the one or more characteristics related to the specific user from two or more user responsive projectors 164. In some embodiments, one or more service provider modules 130 may process one or more requests 168 that include information associated with one or more characteristics that are related to a specific user to attain one or more instructions for coordinated projection in accordance with the one or more characteristics related to the specific user from two or more user responsive projectors 164. Numerous characteristics may be related to a specific user 110. Examples of such characteristics include, but are not limited to, physical characteristics (e.g., height, vision, hearing, speech ability, language), cultural characteristics (e.g., country of origin, religion), activities (e.g., swimming, skiing, knitting), hobbies (e.g., coin collecting, stamp collecting), and the like. Accordingly, in some embodiments, one or more requests 168 for projection that is responsive to one or more characteristics that are related to one or more specific users 110 may be processed to instruct one or more projectors 164. For example, in some embodiments, a request for projection of content that is related to one or more hobbies that are associated with a user 110 may be processed to instruct one or more projectors 164 to project content that is related to the one or more hobbies. In some embodiments, a request 168 may be processed to generate instructions to project in accordance with the height of a specific user 110. In some embodiments, a request 168 may be processed to generate instructions to project and adjust the volume of sound associated with the projection in accordance with the hearing ability of a specific user 110.

Figure 9:
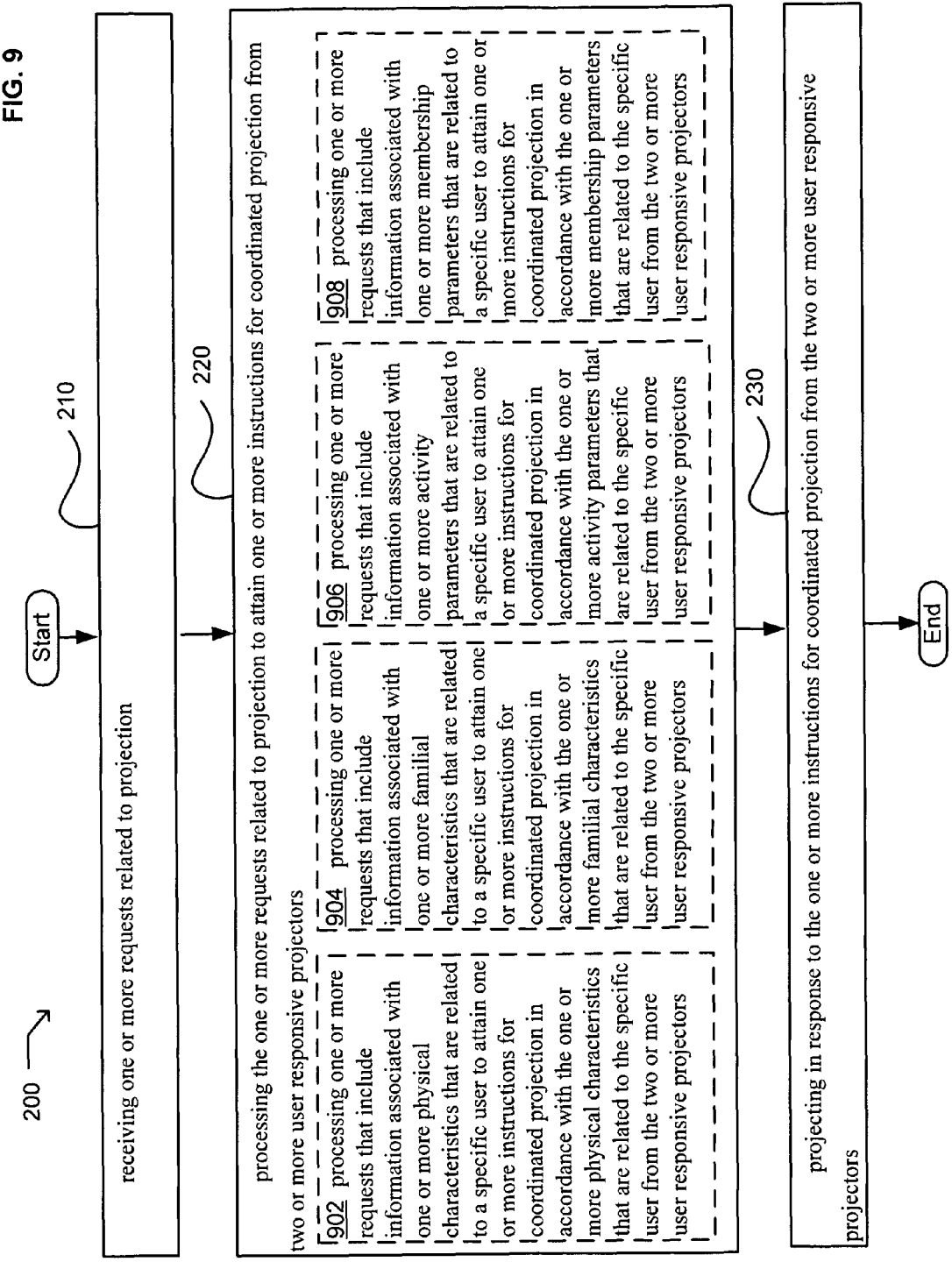

FIG. 9 illustrates alternative embodiments of the example operational flow 200 of FIG. 2. FIG. 9 illustrates example embodiments where the processing operation 220 may include at least one additional operation. Additional operations may include an operation 902, operation 904, operation 906, and/or operation 908.

At operation 902, the processing operation 220 may include processing one or more requests that include information associated with one or more physical characteristics that are related to a specific user to attain one or more instructions for coordinated projection in accordance with the one or more physical characteristics that are related to the specific user from the two or more user responsive projectors. In some embodiments, one or more projection control units 162 may process one or more requests 168 that include information associated with one or more physical characteristics that are related to a specific user to attain one or more instructions for coordinated projection in accordance with the one or more physical characteristics that are related to a specific user from two or more user responsive projectors 164. In some embodiments, one or more service provider modules 130 may process one or more requests 168 that include information associated with one or more physical characteristics that are related to a specific user to attain one or more instructions for coordinated projection in accordance with the one or more physical characteristics that are related to a specific user from two or more user responsive projectors 164. Examples of such physical characteristics include, but are not limited to, height, weight, visual ability (e.g., myopia, color blindness, etc.), hearing ability, reading ability (e.g., reading speed), and the like. Accordingly, in some embodiments, one or more requests 168 may be processed to generate instructions for one or more projectors 164 to project in accordance with one or more physical characteristics that are related to a specific user 110. In some embodiments, a request 168 may be processed to facilitate projection in accordance with information associated with one or more physical characteristics that are related to a specific user 110. For example, in some embodiments, content may be projected in accordance with the height of a specific user 110. In some embodiments, the tone of sound that accompanies a projection may be adjusted in accordance with the auditory characteristics of a specific user 110. In some embodiments, projection characteristics (e.g., tone, contrast, sharpness) may be adjusted in accordance with the visual characteristics of a specific user 110. Accordingly, projection may be adjusted in accordance with numerous physical characteristics that are related to a specific user 110.

At operation 904, the processing operation 220 may include processing one or more requests that include information associated with one or more familial characteristics that are related to a specific user to attain one or more instructions for coordinated projection in accordance with the one or more familial characteristics that are related to the specific user from the two or more user responsive projectors. In some embodiments, one or more projection control units 162 may process one or more requests 168 that include information associated with one or more familial characteristics that are related to a specific user to attain one or more instructions for coordinated projection in accordance with the one or more familial characteristics that are related to the specific user from two or more user responsive projectors 164. In some embodiments, one or more service provider modules 130 may process one or more requests 168 that include information associated with one or more familial characteristics that are related to a specific user to attain one or more instructions for coordinated projection in accordance with the one or more familial characteristics that are related to the specific user from two or more user responsive projectors 164. Examples of information associated with familial characteristics include, but are not limited to, information associated with parents, information associated with siblings, information associated with grandparents, information associated with children, information associated with grandchildren, information associated with relatives, and the like. In some embodiments, information associated with familial characteristics may include information associated with the health history of members of a family. For example, in some embodiments, such information may include information related to the incidence of disease (e.g., cancer, diabetes, glaucoma, etc.) within members of a family. Accordingly, in some embodiments, such information may be used within a medical context for patient related matters. In some embodiments, familiar characteristics may include pictures of family members who are related to a specific user 110. Accordingly, in some embodiments, a request 168 may include information associated with pictures of family members that are related to a specific user 110. One or more requests 168 may include numerous types of information associated with one or more familial characteristics that are related to a specific user 110. Accordingly, in some embodiments, one or more requests 168 may be processed to generate one or more instructions for projection in accordance with one or more familial characteristics that are related to a specific user 110.

At operation 906, the processing operation 220 may include processing one or more requests that include information associated with one or more activity parameters that are related to a specific user to attain one or more instructions for coordinated projection in accordance with the one or more activity parameters that are related to the specific user from the two or more user responsive projectors. In some embodiments, one or more projection control units 162 may process one or more requests 168 that include information associated with one or more activity parameters that are related to a specific user to attain one or more instructions for coordinated projection in accordance with the one or more activity parameters that are related to the specific user from two or more user responsive projectors 164. In some embodiments, one or more service provider modules 130 may process one or more requests 168 that include information associated with one or more activity parameters that are related to a specific user to attain one or more instructions for coordinated projection in accordance with the one or more activity parameters that are related to the specific user from two or more user responsive projectors 164. Numerous types of information may be processed that are associated with activity parameters that are related to a specific user 110. Examples of such information include information related to types of activities (e.g., skydiving, scuba diving, mountain climbing, skiing, etc.), scheduling of activities (e.g., calendared times where activities may occur, availability of accommodations at a location where an activity may occur, etc.), other users 110 who have an interest in a common activity (e.g., other users 110 who are scuba divers), and the like. Accordingly, in some embodiments, one or more requests 168 may be processed to generate one or more instructions for projection in accordance with one or more activity parameters that are related to a specific user 110. For example, in some embodiments, a request 168 from one or more specific users 110 may be processed to determine activities that are common to the one or more specific users 110 to select content for projection that is of interest to all and/or a majority of the specific users 110.

At operation 908, the processing operation 220 may include processing one or more requests that include information associated with one or more membership parameters that are related to a specific user to attain one or more instructions for coordinated projection in accordance with the one or more membership parameters that are related to the specific user from the two or more user responsive projectors. In some embodiments, one or more projection control units 162 may process one or more requests 168 that include information associated with one or more membership parameters that are related to a specific user to attain one or more instructions for coordinated projection in accordance with the one or more membership parameters that are related to the specific user from two or more user responsive projectors 164. In some embodiments, one or more service provider modules 130 may process one or more requests 168 that include information associated with one or more membership parameters that are related to a specific user to attain one or more instructions for coordinated projection in accordance with the one or more membership parameters that are related to the specific user from two or more user responsive projectors 164. Numerous types of information may be processed that are associated with membership parameters that are related to a specific user 110. Examples of such information may include information related to types of memberships (e.g., health club memberships, social club memberships, credit card memberships, airline memberships), membership levels (e.g., gold card level, platinum card level, frequent flier level), membership privileges (e.g., access to frequent flier lounges, access to airline booking services), and the like. Accordingly, in some embodiments, one or more requests 168 may be processed to generate one or more instructions for projection in accordance with one or more membership parameters that are related to a specific user 110. In some embodiments, a request 168 from one or more specific users 110 may be processed to determine content that is available to the specific user 110. For example, in some embodiments, a request 168 may be to project airline booking information that is only available to elite frequent flier members. Accordingly, in some embodiments, one or more requests 168 may be processed to determine if a specific user 110 is an elite frequent flier member and to determine content that may be projected for the specific user 110 in accordance with their membership level. Accordingly, information that is related to one or more membership parameters may be used in numerous ways.

Figure 10:
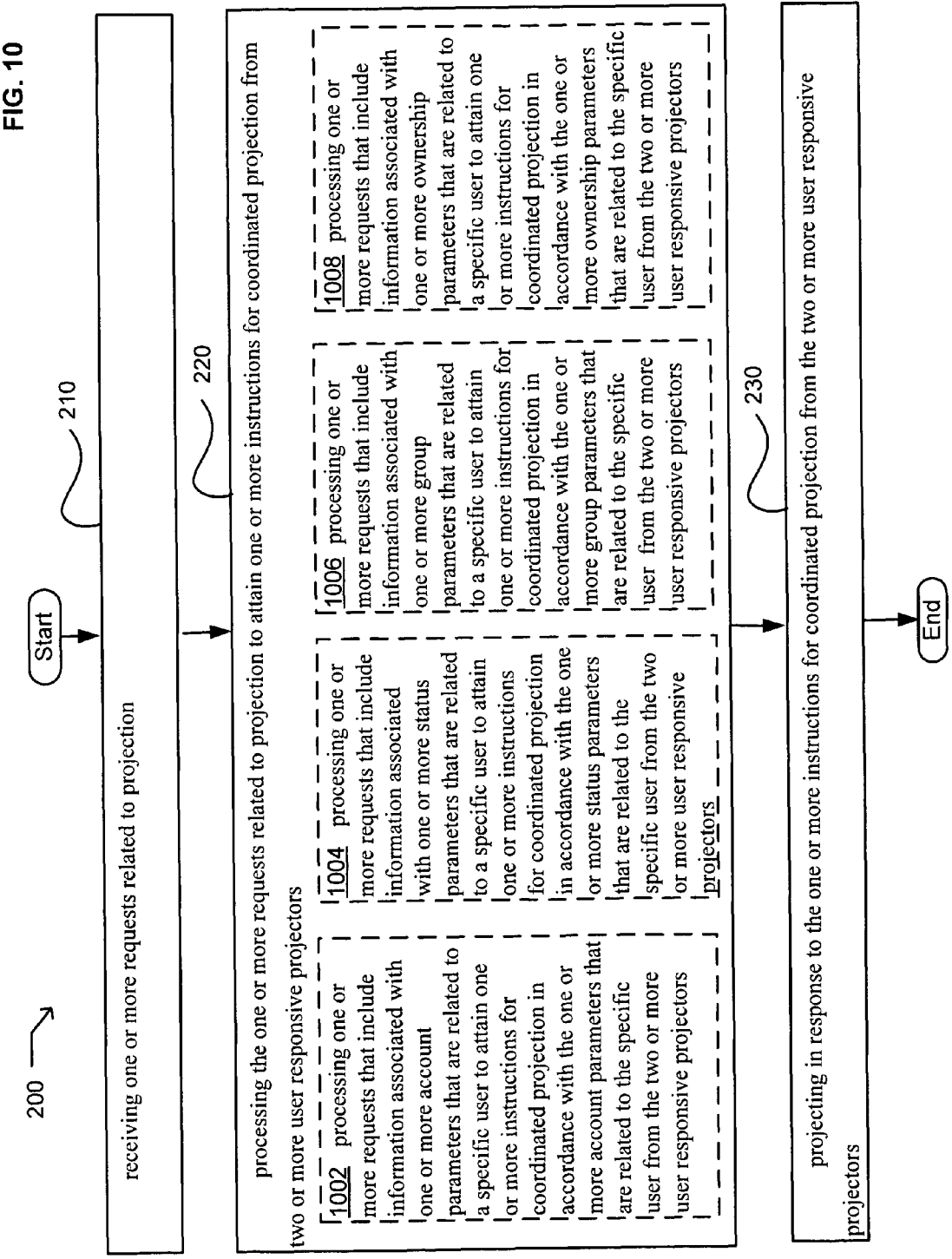

FIG. 10 illustrates alternative embodiments of the example operational flow 200 of FIG. 2. FIG. 10 illustrates example embodiments where the processing operation 220 may include at least one additional operation. Additional operations may include an operation 1002, operation 1004, operation 1006, and/or operation 1008.

At operation 1002, the processing operation 220 may include processing one or more requests that include information associated with one or more account parameters that are related to a specific user to attain one or more instructions for coordinated projection in accordance with the one or more account parameters that are related to the specific user from the two or more user responsive projectors. In some embodiments, one or more projection control units 162 may process one or more requests 168 that include information associated with one or more account parameters that are related to a specific user to attain one or more instructions for coordinated projection in accordance with the one or more account parameters that are related to the specific user from two or more user responsive projectors 164. In some embodiments, one or more service provider modules 130 may process one or more requests 168 that include information associated with one or more account parameters that are related to a specific user to attain one or more instructions for coordinated projection in accordance with the one or more account parameters that are related to the specific user from two or more user responsive projectors 164. Numerous types of information may be processed that are associated with account parameters that are related to a specific user 110. Examples of such information may include information related to types of accounts (e.g., credit card accounts, bank accounts, prepaid accounts, gift cards), account levels (e.g., gold card level, platinum card level), account privileges (e.g., access to rewards programs), and the like. Accordingly, in some embodiments, one or more requests 168 may be processed to generate one or more instructions that may be used to project in accordance with one or more account parameters that are related to a specific user 110. In some embodiments, a request 168 from one or more specific users 110 may be processed to determine content that is available to the specific user 110 in accordance with one or more account parameters. For example, in some embodiments, a request 168 may be to project information that is related to a rewards program that is only available to holders of a platinum credit card account. Accordingly, in some embodiments, one or more requests 168 may be processed to determine if a specific user 110 is a holder of a platinum credit card account and to determine content that may be projected for the specific user 110 in accordance with their account information. Accordingly, information that is related to one or more account parameters may be used in numerous ways.

At operation 1004, the processing operation 220 may include processing one or more requests that include information associated with one or more status parameters that are related to a specific user to attain one or more instructions for coordinated projection in accordance with the one or more status parameters that are related to the specific user from the two or more user responsive projectors. In some embodiments, one or more projection control units 162 may process one or more requests 168 that include information associated with one or more status parameters that are related to a specific user to attain one or more instructions for coordinated projection in accordance with the one or more status parameters that are related to the specific user from two or more user responsive projectors 164. In some embodiments, one or more service provider modules 130 may process one or more requests 168 that include information associated with one or more status parameters that are related to a specific user to attain one or more instructions for coordinated projection in accordance with the one or more status parameters that are related to the specific user from two or more user responsive projectors 164. Numerous types of information may be processed that are associated with status parameters that are related to a specific user 110. Examples of such information may include, but are not limited to, net worth, club memberships, ownership interests, and the like. In some embodiments, information associated with one or more status parameters may be processed to determine if one or more memberships are current or expired. Accordingly, in some embodiments, one or more requests 168 may be processed to generate one or more instructions for projection in accordance with one or more status parameters that are related to a specific user 110. In some embodiments, a request 168 from one or more specific users 110 may be processed to determine content that is available to the specific user 110 in accordance with one or more status parameters. For example, in some embodiments, a request 168 may be to project information that is only available to owners of a certain type of automobile. Accordingly, in some embodiments, one or more requests 168 may be processed to determine if a specific user 110 is the owner of the type of automobile required and to determine content that may be projected for the specific user 110 in accordance with their status information. Accordingly, information that is related to one or more status parameters may be used in numerous ways.

At operation 1006, the processing operation 220 may include processing one or more requests that include information associated with one or more group parameters that are related to a specific user to attain one or more instructions for coordinated projection in accordance with the one or more group parameters that are related to the specific user from the two or more user responsive projectors. In some embodiments, one or more projection control units 162 may process one or more requests 168 that include information associated with one or more group parameters that are related to a specific user to attain one or more instructions for coordinated projection in accordance with the one or more group parameters that are related to the specific user from two or more user responsive projectors 164. In some embodiments, one or more service provider modules 130 may process one or more requests 168 that include information associated with one or more group parameters that are related to a specific user to attain one or more instructions for coordinated projection in accordance with the one or more group parameters that are related to the specific user from two or more user responsive projectors 164. Numerous types of information may be processed that are associated with group parameters that are related to a specific user 110. Examples of information related to group parameters may include, but are not limited to, information associated with membership in a working group, membership in a chat group, membership in a book club, participation in a computer user group, and the like. In some embodiments, information associated with one or more group parameters may include information that is related to whether a specific user 110 is a current member in a group. For example, in some embodiments, a specific user 110 may be required to participate on a regular basis to remain a member of a group and may forfeit membership in the group if the specific user 110 is inactive. In some embodiments, the level of participation in a group by a specific user 110 may be related to projection resources that are available to the specific user 110. For example, in some embodiments, greater participation with the group by a specific user 110 may result in a greater amount of projection resources being available to the specific user 110. Accordingly, in some embodiments, one or more requests 168 may be processed to generate one or more instructions for projection in accordance with one or more group parameters that are related to a specific user 110. In some embodiments, a request 168 from one or more specific users 110 may be processed to determine content that is available to the specific user 110 in accordance with one or more group parameters. For example, in some embodiments, a request 168 may be to project information that is only available to group members who have recently been active participants with the group. Accordingly, in some embodiments, one or more requests 168 may be processed to determine if a specific user 110 has been an active participant with a group to determine content that may be projected for the specific user 110. Accordingly, information that is related to one or more group parameters may be used in numerous ways.

At operation 1008, the processing operation 220 may include processing one or more requests that include information associated with one or more ownership parameters that are related to a specific user to attain one or more instructions for coordinated projection in accordance with the one or more ownership parameters that are related to the specific user from the two or more user responsive projectors. In some embodiments, one or more projection control units 162 may process one or more requests 168 that include information associated with one or more ownership parameters that are related to a specific user to attain one or more instructions for coordinated projection in accordance with the one or more ownership parameters that are related to the specific user from two or more user responsive projectors 164. In some embodiments, one or more service provider modules 130 may process one or more requests 168 that include information associated with one or more ownership parameters that are related to a specific user to attain one or more instructions for coordinated projection in accordance with the one or more ownership parameters that are related to the specific user from two or more user responsive projectors 164. Numerous types of information may be processed that are associated with ownership parameters that are related to a specific user 110. Examples of information related to ownership parameters may include, but are not limited to, information associated with ownership of a vehicle (e.g., automobile, motorcycle, boat, airplane, helicopter), information associated with ownership of a collectable (e.g., coin, stamp, pottery, painting), information associated with ownership of a financial instrument (e.g., stock, bond, municipal bond, mutual fund), information associated with ownership of a commodity (e.g., silver, gold, platinum), and the like. Accordingly, in some embodiments, one or more requests 168 may be processed to generate one or more instructions for projection in accordance with one or more ownership parameters that are related to a specific user 110. In some embodiments, a request 168 from one or more specific users 110 may be processed to determine content that is to be projected in accordance with one or more ownership parameters. For example, in some embodiments, a request 168 may be to project information for a specific user 110 who is known to own a specific type of motorcycle. Accordingly, in some embodiments, the request 168 may be processed to obtain content for projection that is related to an item owned by a specific user 110. In some embodiments, requests 168 from more than one specific user 110 may be processed to determine content that is to be projected in accordance with ownership parameters that are associated with the specific users 110. For example, in some embodiments, ownership parameters associated with two specific users 110 may be processed to determine that both specific users 110 own large boats and material related to boating may be selected for projection in accordance with the ownership parameters. Accordingly, information that is related to one or more ownership parameters may be used in numerous ways.

Figure 11:
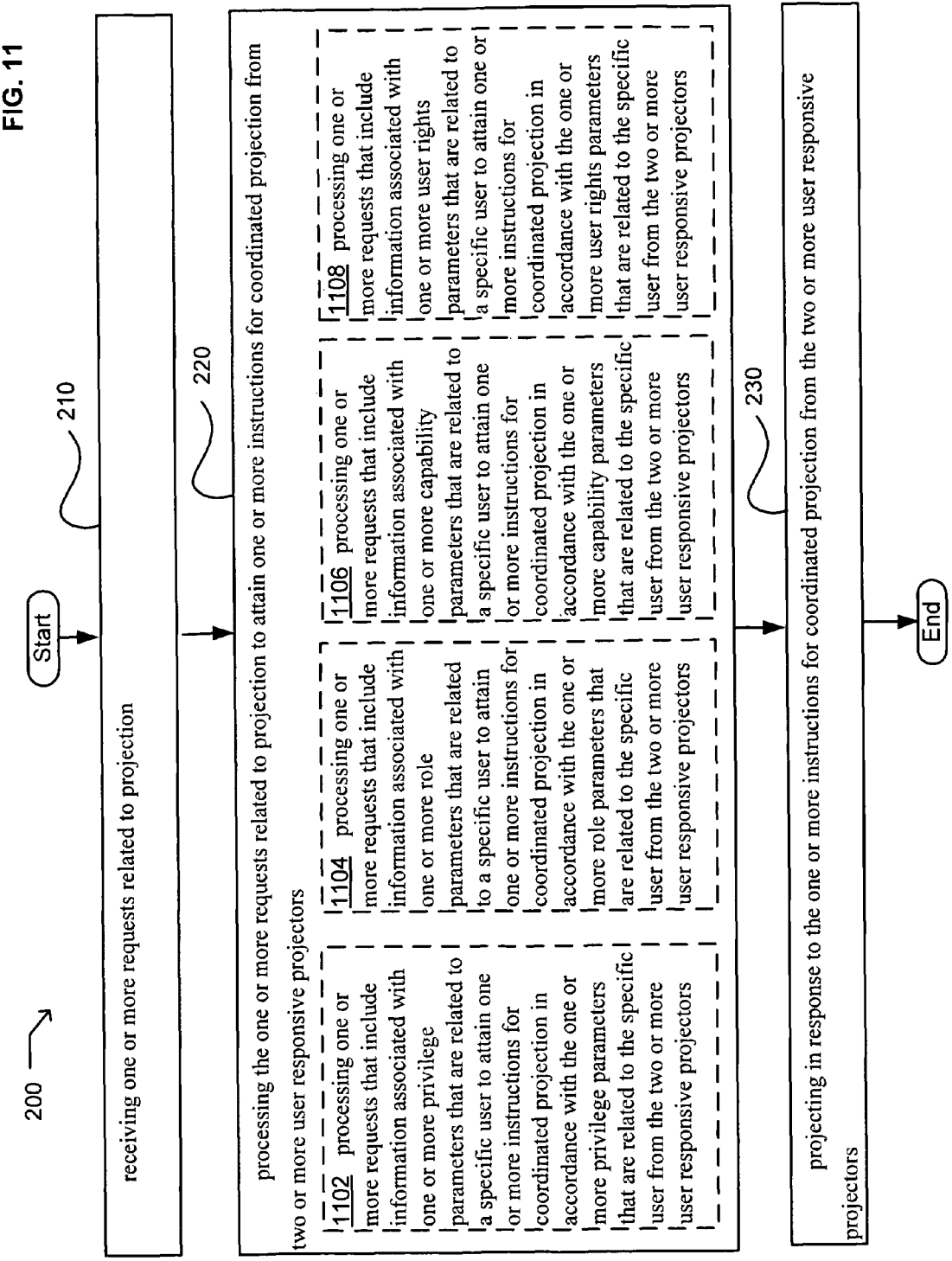

FIG. 11 illustrates alternative embodiments of the example operational flow 200 of FIG. 2. FIG. 11 illustrates example embodiments where the processing operation 220 may include at least one additional operation. Additional operations may include an operation 1102, operation 1104, operation 1106, and/or operation 1108.

At operation 1102, the processing operation 220 may include processing one or more requests that include information associated with one or more privilege parameters that are related to a specific user to attain one or more instructions for coordinated projection in accordance with the one or more privilege parameters that are related to the specific user from the two or more user responsive projectors. In some embodiments, one or more projection control units 162 may process one or more requests 168 that include information associated with one or more privilege parameters that are related to a specific user to attain one or more instructions for coordinated projection in accordance with the one or more privilege parameters that are related to the specific user from two or more user responsive projectors 164. In some embodiments, one or more service provider modules 130 may process one or more requests 168 that include information associated with one or more privilege parameters that are related to a specific user to attain one or more instructions for coordinated projection in accordance with the one or more privilege parameters that are related to the specific user from two or more user responsive projectors 164. Numerous types of information may be processed that are associated with privilege parameters that are related to a specific user 110. Examples of information related to privilege parameters may include, but are not limited to, information associated with security clearances, information associated with viewing designated files, information associated with obtaining passwords, information associated with access codes, and the like. Accordingly, in some embodiments, one or more requests 168 may be processed to generate one or more instructions that may be used to project in accordance with one or more privilege parameters that are related to a specific user 110. In some embodiments, a request 168 from one or more specific users 110 may be processed to determine content that is to be projected in accordance with one or more privilege parameters. For example, in some embodiments, a specific user 110 may request projection of protected information. Accordingly, in some embodiments, the request 168 may be processed to confirm that the specific user 110 holds a security clearance that is appropriate to view the protected information. Accordingly, information that is related to one or more privilege parameters may be used in numerous ways.

At operation 1104, the processing operation 220 may include processing one or more requests that include information associated with one or more role parameters that are related to a specific user to attain one or more instructions for coordinated projection in accordance with the one or more role parameters that are related to the specific user from the two or more user responsive projectors. In some embodiments, one or more projection control units 162 may process one or more requests 168 that include information associated with one or more role parameters that are related to a specific user to attain one or more instructions for coordinated projection in accordance with the one or more role parameters that are related to the specific user from two or more user responsive projectors 164. In some embodiments, one or more service provider modules 130 may process one or more requests 168 that include information associated with one or more role parameters that are related to a specific user to attain one or more instructions for coordinated projection in accordance with the one or more role parameters that are related to the specific user from two or more user responsive projectors 164. Numerous types of information may be processed that are associated with role parameters that are related to a specific user 110. Examples of information related to role parameters may include, but are not limited to, information associated with the occupation of a specific user, information associated with the hierarchical position of a specific user 110 (e.g., supervisor, subordinate, teacher, student), information associated with an activity of a specific user 110 (e.g., presenter, audience member, reviewer, critic), and the like. Accordingly, in some embodiments, one or more requests 168 may be processed to generate one or more instructions for projection in accordance with one or more role parameters that are related to a specific user 110. In some embodiments, a request 168 from one or more specific users 110 may be processed to determine content that is to be projected in accordance with one or more role parameters. For example, in some embodiments, a request 168 from a specific user 110 who is a teacher to project exam answers may be processed and authorized based on the role parameter of the specific user 110 being a teacher. In contrast, in some embodiments, a request 168 from a specific user 110 who is a student to project exam answers may be processed and denied based on the role parameter of the specific user 110 being a student. In some embodiments, one or more role parameters may be used to direct projection. For example, in some embodiments, a specific user 110 may be associated with a role parameter as a presenter (e.g., speaker at a conference) and have projection of lecture notes directed onto a podium for viewing by the specific user 110. In some embodiments, one or more role parameters may be used to authorize access to content for projection. For example, in some embodiments, a specific user 110 who is associated with a human resources role parameter may be authorized to access resume information for projection that is unavailable to other users 110 who are not associated with a human resources role parameter. Accordingly, information that is related to one or more role parameters may be used in numerous ways.

At operation 1106, the processing operation 220 may include processing one or more requests that include information associated with one or more capability parameters that are related to a specific user to attain one or more instructions for coordinated projection in accordance with the one or more capability parameters that are related to the specific user from the two or more user responsive projectors. In some embodiments, one or more projection control units 162 may process one or more requests 168 that include information associated with one or more capability parameters that are related to a specific user to attain one or more instructions for coordinated projection in accordance with the one or more capability parameters that are related to the specific user from two or more user responsive projectors 164. In some embodiments, one or more service provider modules 130 may process one or more requests 168 that include information associated with one or more capability parameters that are related to a specific user to attain one or more instructions for coordinated projection in accordance with the one or more capability parameters that are related to the specific user from two or more user responsive projectors 164. Numerous types of information may be processed that are associated with capability parameters that are related to a specific user 110. Examples of information related to capability parameters may include, but are not limited to, information associated with physical capabilities (e.g., ability to climb stairs, ability to walk, ability to hear, ability to see, use of a wheelchair, use of a walker), information associated with mental capabilities (e.g., ability level associated with problem solving, ability to speak, languages that are spoken by a specific user, phobias), social capabilities (e.g., extroverted behavior, introverted behavior, social phobias), gaming capabilities (e.g., level of play achieved on video games), and the like. Accordingly, in some embodiments, one or more requests 168 may be processed to generate one or more instructions for projection in accordance with one or more capability parameters that are related to a specific user 110. In some embodiments, content is to be projected in accordance with one or more capability parameters that are associated with a specific user 110. In some embodiments, a request 168 from a specific user 110 having limited mobility may be processed to generate one or more instructions to project with one or more projectors 164 that are located in an area that is accessible to the specific user 110. For example, in some embodiments, a specific user 110 who has limited mobility may enter a multi-level venue and request projection services. Accordingly, the one or more requests 168 may be processed to identify one or more projectors 164 that are accessible to the specific user 110 based on one or more of the specific user's capability parameters. In some embodiments, projection may be directed in accordance with one or more capability parameters that are associated with a specific user 110. For example, in some embodiments, a request 168 for projection by a specific user 110 who is seated in a wheelchair may be processed to assign projection by one or more projectors 164 that are configured to project at an eye level that is appropriate for a user 110 who is seated in a wheelchair. In some embodiments, a request 168 for projection by a specific user 110 who is seated in a wheelchair may be processed to generate one or more instructions to configure one or more projectors 164 to project at an eye level that is appropriate for a user 110 who is seated in a wheelchair. In some embodiments, content that is to be projected may be selected in accordance with one or more capability parameters that are associated with a specific user 110. For example, in some embodiments, a request 168 from a specific user 110 to project a video game may be processed to select the level of play of the video game based on one or more gaming capability parameters that are associated with the specific user 110. Accordingly, information that is related to one or more capability parameters may be used in numerous ways.

At operation 1108, the processing operation 220 may include processing one or more requests that include information associated with one or more user rights parameters that are related to a specific user to attain one or more instructions for coordinated projection in accordance with the one or more user rights parameters that are related to the specific user from the two or more user responsive projectors. In some embodiments, one or more projection control units 162 may process one or more requests 168 that include information associated with one or more user rights parameters that are related to a specific user to attain one or more instructions for coordinated projection in accordance with the one or more user rights parameters that are related to the specific user from two or more user responsive projectors 164. In some embodiments, one or more service provider modules 130 may process one or more requests 168 that include information associated with one or more user rights parameters that are related to a specific user to attain one or more instructions for coordinated projection in accordance with the one or more user rights parameters that are related to the specific user from two or more user responsive projectors 164. Numerous types of information may be processed that are associated with user rights parameters that are related to a specific user 110. Examples of information related to user rights parameters may include, but are not limited to, information associated with rights to access content, information associated with rights to copy content, information associated with rights to view content, information associated with rights to share content, information associated with rights to distribute content, information associated with rights to project content, and the like. Accordingly, in some embodiments, one or more requests 168 may be processed to generate one or more instructions for projecting in accordance with one or more user rights parameters that are related to a specific user 110. In some embodiments, content for projection may be selected in accordance with one or more user rights parameters that are associated with a specific user 110. For example, a specific user 110 may be associated with one or more user rights parameters that allow access to a first set of content but do not allow access to a second set of content. Accordingly, in some embodiments, one or more requests 168 may be processed to generate one or more instructions to access a first set of content for projection. Accordingly, information that is related to one or more user rights parameters may be processed in numerous ways.

Figure 12:
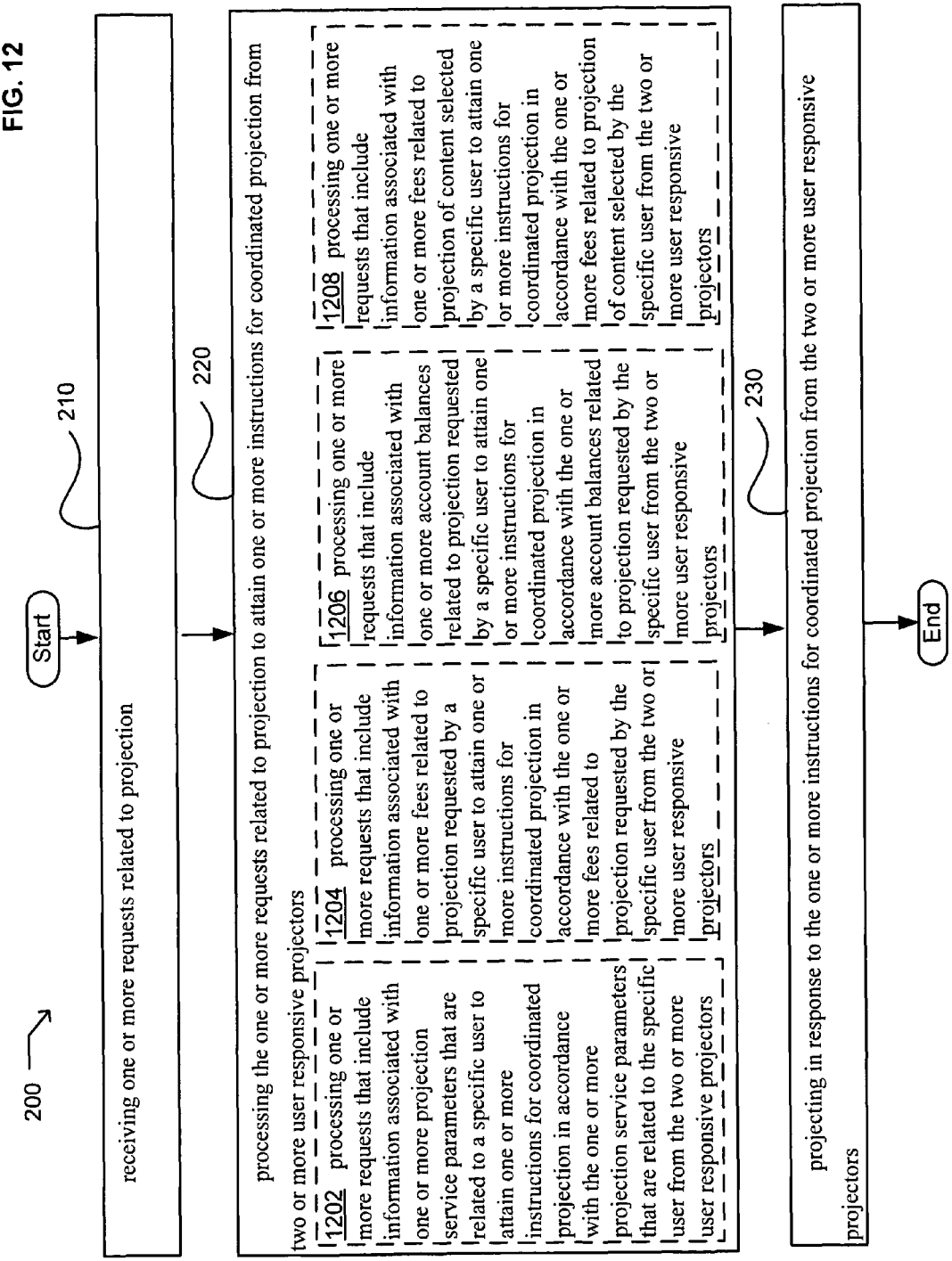

FIG. 12 illustrates alternative embodiments of the example operational flow 200 of FIG. 2. FIG. 12 illustrates example embodiments where the processing operation 220 may include at least one additional operation. Additional operations may include an operation 1202, operation 1204, operation 1206, and/or operation 1208.

At operation 1202, the processing operation 220 may include processing one or more requests that include information associated with one or more projection service parameters that are related to a specific user to attain one or more instructions for coordinated projection in accordance with the one or more projection service parameters that are related to the specific user from the two or more user responsive projectors. In some embodiments, one or more projection control units 162 may process one or more requests 168 that include information associated with one or more projection service parameters that are related to a specific user to attain one or more instructions for coordinated projection in accordance with the one or more projection service parameters that are related to the specific user from two or more user responsive projectors 164. In some embodiments, one or more service provider modules 130 may process one or more requests 168 that include information associated with one or more projection service parameters that are related to a specific user to attain one or more instructions for coordinated projection in accordance with the one or more service parameters that are related to the specific user from two or more user responsive projectors 164. Numerous types of information may be processed that are associated with projection service parameters that are related to a specific user 110. Examples of information related to projection service parameters may include, but are not limited to, information associated with projection preferences that are associated with a specific user 110 (e.g., tone, color, brightness), information associated with the projection service level purchased by a specific user 110 (e.g., types of projection services that a specific user 110 has purchased), information associated with projection from one or more specifically requested projectors 164 (e.g., projection from one or more high resolution projectors 164, projection from one or more low resolution projectors 164, projection from a single projector 164, projection from more than one projector 164, projection from more than one projectors 164 that are coordinated with each other), and the like. Accordingly, in some embodiments, one or more requests 168 may be processed to generate one or more instructions that are associated with one or more projection service parameters that may be used to select one or more projectors 164 that are to be used to project content for the specific user 110.

At operation 1204, the processing operation 220 may include processing one or more requests that include information associated with one or more fees related to projection requested by a specific user to attain one or more instructions for coordinated projection in accordance with the one or more fees related to projection requested by the specific user from the two or more user responsive projectors. In some embodiments, one or more projection control units 162 may process one or more requests 168 that include information associated with one or more fees related to projection requested by a specific user to attain one or more instructions for coordinated projection in accordance with the one or more fees related to projection requested by the specific user from two or more user responsive projectors 164. In some embodiments, one or more service provider modules 130 may process one or more requests 168 that include information associated with one or more fees related to projection requested by a specific user to attain one or more instructions for coordinated projection in accordance with the one or more fees related to projection requested by the specific user from two or more user responsive projectors 164. Numerous types of information associated with one or more fees that are associated with projection may be processed. Examples of such fees include, but are not limited to, fees associated with the use of one or more projectors 164 (e.g., use of one or more specific projectors 164, use of one or more non-specified projectors 164, use of more than one projector 164 in combination with another projector 164), fees associated with the use of one or more projection surfaces (e.g., use of one or more non-specified projection surfaces 166, use of one or more specific projection surfaces), fees associated with capture of projected content (e.g., printing of projected content, saving projected content), transmission of projected content (e.g., transmitting one or more projected images through use of a wireless connection), and the like. Accordingly, numerous types of fees that are related to projection may be processed to generate one or more instructions associated with projection.

At operation 1206, the processing operation 220 may include processing one or more requests that include information associated with one or more account balances related to projection requested by a specific user to attain one or more instructions for coordinated projection in accordance with the one or more account balances related to projection requested by the specific user from the two or more user responsive projectors. In some embodiments, one or more projection control units 162 may process one or more requests 168 that include information associated with one or more account balances related to projection requested by a specific user to attain one or more instructions for coordinated projection in accordance with the one or more account balances related to projection requested by the specific user from two or more user responsive projectors 164. In some embodiments, one or more service provider modules 130 may process one or more requests 168 that include information associated with one or more account balances related to projection requested by a specific user to attain one or more instructions for coordinated projection in accordance with the one or more account balances related to projection requested by the specific user from two or more user responsive projectors 164. Numerous types of information may be processed that are associated with one or more account balances that are related to projection requested by a specific user 110. Examples of such information include, but are not limited to, credit card limits, bank account balance (e.g., checking account, savings account), projection account balance (e.g., prepaid account to purchase projection services), gift card balance, and the like. Accordingly, in some embodiments, information associated with one or more account balances that are associated with a specific user 110 may be received and used to determine projection services that are available to the specific user 110. For example, in some embodiments, a request for use of a projection system within a venue may be processed to select one or more projectors 164 within the venue. Accordingly, information associated with one or more account balances that are associated with the specific user 110 may be processed to determine if there are adequate funds available to pay for the request 168 for projection. In some embodiments, the availability of funds within one or more accounts may be processed to determine what projection services are available to a specific user 110 who is associated with the one or more accounts. For example, in some embodiments, a specific user 110 may lack adequate funds within an account to project with a high resolution projector 164 but may have adequate funds to project with a low resolution projector 164. Accordingly, in some embodiments, information associated with one or more account balances may be processed to determine the extent of projection services that are available to a specific user 110.

At operation 1208, the processing operation 220 may include processing one or more requests that include information associated with one or more fees related to projection of content selected by a specific user to attain one or more instructions for coordinated projection in accordance with the one or more fees related to projection of content selected by the specific user from the two or more user responsive projectors. In some embodiments, one or more projection control units 162 may process one or more requests 168 that include information associated with one or more fees related to projection of content selected by a specific user to attain one or more instructions for coordinated projection in accordance with the one or more fees related to projection of content selected by the specific user from two or more user responsive projectors 164. In some embodiments, one or more service provider modules 130 may process one or more requests 168 that include information associated with one or more fees related to projection of content selected by a specific user to attain one or more instructions for coordinated projection in accordance with the one or more fees related to projection of content selected by the specific user from two or more user responsive projectors 164. Numerous types of fees that are related to projection of content selected by a specific user 110 may be processed. Examples of such fees include, but are not limited to, licensing fees associated with content, access fees associated with content, subscription fees associated with content, rental fees associated with content, and the like. Accordingly, in some embodiments, information associated with such fees may be processed to compare fees with one or more account balances that are associated with a specific user 110 to determine if content selected by the specific user 110 may be projected. Accordingly, information that is associated with one or more fees related to projection of content selected by a specific user 110 may be processed in many ways.

Figure 13:
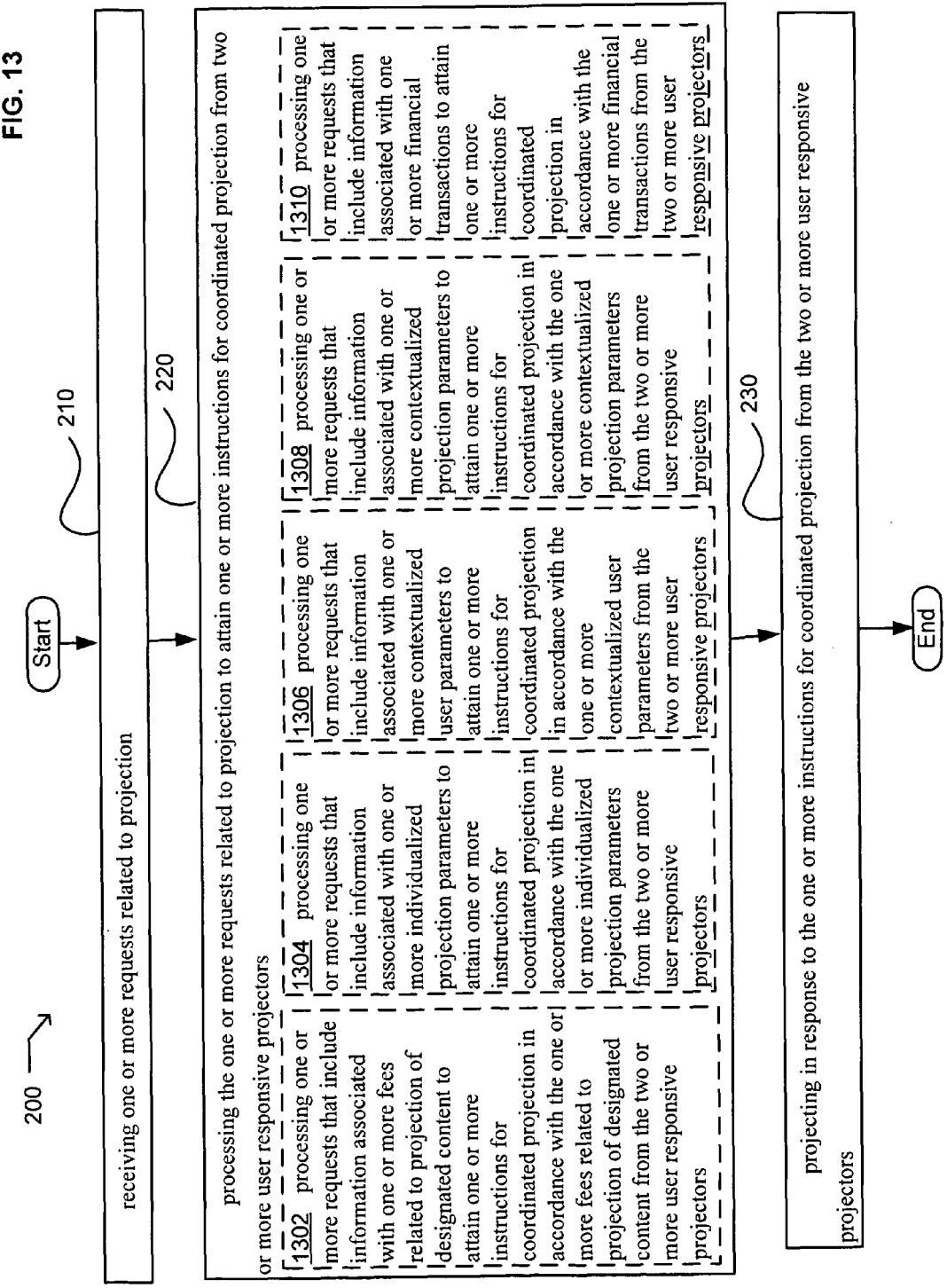

FIG. 13 illustrates alternative embodiments of the example operational flow 200 of FIG. 2. FIG. 13 illustrates example embodiments where the processing operation 220 may include at least one additional operation. Additional operations may include an operation 1302, operation 1304, operation 1306, operation 1308, and/or operation 1310.

At operation 1302, the processing operation 220 may include processing one or more requests that include information associated with one or more fees related to projection of designated content to attain one or more instructions for coordinated projection in accordance with the one or more fees related to projection of designated content from the two or more user responsive projectors. In some embodiments, one or more projection control units 162 may process one or more requests 168 that include information associated with one or more fees related to projection of designated content to attain one or more instructions for coordinated projection in accordance with the one or more fees related to projection of designated content from two or more user responsive projectors 164. In some embodiments, one or more service provider modules 130 may process one or more requests 168 that include information associated with one or more fees related to projection of designated content to attain one or more instructions for coordinated projection in accordance with the one or more fees related to projection of designated content from two or more user responsive projectors 164. Numerous types of information that is associated with one or more fees related to projection of designated content may be processed. Examples of such information include, but are not limited to, information associated with fees that are related to the use of one or more projectors 164 (e.g., use of a high resolution projector 164, use of a low resolution projector 164, acquiring priority of projection relative to another user 110, use of multiple coordinated projectors 164), information associated with fees that are related to the use of one or more projection surfaces 166 (e.g., preferred projection surface 166, capture capability of the projection surface 166), information associated with fees that are related to projection of the designated content (e.g., licensing fees, access fees), and the like.

At operation 1304, the processing operation 220 may include processing one or more requests that include information associated with one or more individualized projection parameters to attain one or more instructions for coordinated projection in accordance with the one or more individualized projection parameters from the two or more user responsive projectors. In some embodiments, one or more projection control units 162 may process one or more requests 168 that include information associated with one or more individualized projection parameters to attain one or more instructions for coordinated projection in accordance with the one or more individualized projection parameters from two or more user responsive projectors 164. In some embodiments, one or more service provider modules 130 may process one or more requests 168 that include information associated with one or more individualized projection parameters to attain one or more instructions for coordinated projection in accordance with the one or more individualized projection parameters from two or more user responsive projectors 164. Numerous types of information that are associated with one or more individualized projection parameters may be processed. Examples of such information include, but are not limited to, information associated with content that is preferred by an individual, information associated with projection preferences of an individual (e.g., color, tone, brightness), information associated with fees associated with projection (e.g., cost limit associated with an individual), and the like. Accordingly, numerous types of information may be processed to generate one or more instructions to project in accordance with one or more individualized projection parameters.

At operation 1306, the processing operation 220 may include processing one or more requests that include information associated with one or more contextualized user parameters to attain one or more instructions for coordinated projection in accordance with the one or more contextualized user parameters from the two or more user responsive projectors. In some embodiments, one or more projection control units 162 may process one or more requests 168 that include information associated with one or more contextualized user parameters to attain one or more instructions for coordinated projection in accordance with the one or more contextualized user parameters from two or more user responsive projectors 164. In some embodiments, one or more service provider modules 130 may process one or more requests 168 that include information associated with one or more contextualized user parameters to attain one or more instructions for coordinated projection in accordance with the one or more contextualized user parameters from two or more user responsive projectors 164. Numerous types of information that are associated with one or more contextualized user parameters may be processed. Examples of such information include, but are not limited to, information associated with the location of a user 110, information associated with the environment in which a user 110 is present, information associated with the context in which a user 110 is present, information associated with one or more reasons that a user 110 is at a venue, and the like. For example, in some embodiments, contextualized user parameters that are related to a venue in which a user 110 is present may be processed to generate one or more projection instructions 162I. Examples of such venues may include, but are not limited to, a restaurant, a coffee shop, a nightclub, a department store, a medical office, a dental office, a conference room, an auditorium, a classroom, an athletic event, and the like. Accordingly, in some embodiments, one or more requests 168 that include information associated with one or more venues in which a user 110 requests projection may be processed to generate one or more projection instructions 162I. In some embodiments, such contextualized user parameters may be processed to generate one or more instructions to control projection (e.g., select projection equipment that is used for projection, select content for projection). In some embodiments, one or more requests 168 that include information associated with the context with which a user 110 is present at a venue may be processed to generate one or more instructions to control projection. For example, in some embodiments, a user 110 may be a presenter at a conference. Accordingly, in some embodiments, the content that is projected at the venue may be limited to one or more topics that are discussed by the user 110 in the capacity as a presenter. In some embodiments, one or more requests 168 that include information associated with the reason that a user 110 is at a location may be processed to generate one or more instructions to control projection. For example, in some embodiments, a user 110 may attend an automobile show to learn about a new type of automobile. Accordingly, in some embodiments, projection of material may be limited to content that is related to automobiles. In some embodiments, one or more requests 168 that include information associated with the environment in which a user 110 is present may be processed to generate one or more instructions to control projection. For example, in some embodiments, a user 110 may be present at a daycare facility. Accordingly, in some embodiments, projection of material may be limited to content that is appropriate for children.

At operation 1308, the processing operation 220 may include processing one or more requests that include information associated with one or more contextualized projection parameters to attain one or more instructions for coordinated projection in accordance with the one or more contextualized projection parameters from the two or more user responsive projectors. In some embodiments, one or more projection control units 162 may process one or more requests 168 that include information associated with one or more contextualized projection parameters to attain one or more instructions for coordinated projection in accordance with the one or more contextualized projection parameters from two or more user responsive projectors 164. In some embodiments, one or more service provider modules 130 may process one or more requests 168 that include information associated with one or more contextualized projection parameters to attain one or more instructions for coordinated projection in accordance with the one or more contextualized projection parameters from two or more user responsive projectors 164. Numerous types of information that are associated with one or more contextualized projection parameters may be processed to generate one or more projection instructions 162I. Examples of such information include, but are not limited to, information associated with requests 168 for projection within a venue, information associated with requests 168 for projection onto one or more projection surfaces 166, information associated with requests 168 for projection through use of one or more projectors 164, information associated with requests 168 for projection through use of two or more coordinated projectors 164, and the like. For example, in some embodiments, a request 168 that includes information associated with projection within a venue may be processed to generate one or more projection instructions 162I. Accordingly, in some embodiments, one or more projection parameters may be selected that are based upon the context of the venue where projection is requested. For example, in some embodiments, projection may be requested within a childcare center. Accordingly, in some embodiments, information that includes parameters related to content that may be projected within a venue may be processed to generate one or more projection instructions 162I based on the type of venue in which projection is requested. In some embodiments, information that includes parameters related to one or more projection surfaces 166 onto which projection is to occur may be processed to generate one or more projection instructions 162I. Accordingly, in some embodiments, such information may be processed to generate one or more projection instructions 162I to project from one or more projectors 164 that are configured and/or configurable to project onto the one or more selected projection surfaces 166. Accordingly, information associated with one or more contextualized projection parameters may be processed to generate one or more projection instructions 162I.

At operation 1310, the processing operation 220 may include processing one or more requests that include information associated with one or more financial transactions to attain one or more instructions for coordinated projection in accordance with the one or more financial transactions from the two or more user responsive projectors. In some embodiments, one or more projection control units 162 may process one or more requests 168 that include information associated with one or more financial transactions to attain one or more instructions for coordinated projection in accordance with the one or more financial transactions from two or more user responsive projectors 164. In some embodiments, one or more service provider modules 130 may process one or more requests 168 that include information associated with one or more financial transactions to attain one or more instructions for coordinated projection in accordance with the one or more financial transactions from two or more user responsive projectors 164. Numerous types of information that are associated with one or more financial transactions may be processed to generate one or more projection instructions 162I. Examples of such information include, but are not limited to, information associated with the identity of one or more parties to the financial transaction, information associated with accounts (e.g., account numbers, account balances, types of accounts), information associated with accounts receivable, information associated with balance transfers, information associated with escrow accounts, and the like. Information associated with one or more financial transactions may be processed in numerous ways. In some embodiments, such information may be processed to attain one or more instructions to select content (e.g., bank records, account balances, fund transfer information) that may be projected for a specific user 110 (e.g., a party to the financial transaction). In some embodiments, such information may be processed to attain one or more instructions to project information in a secure location.

Figure 14:
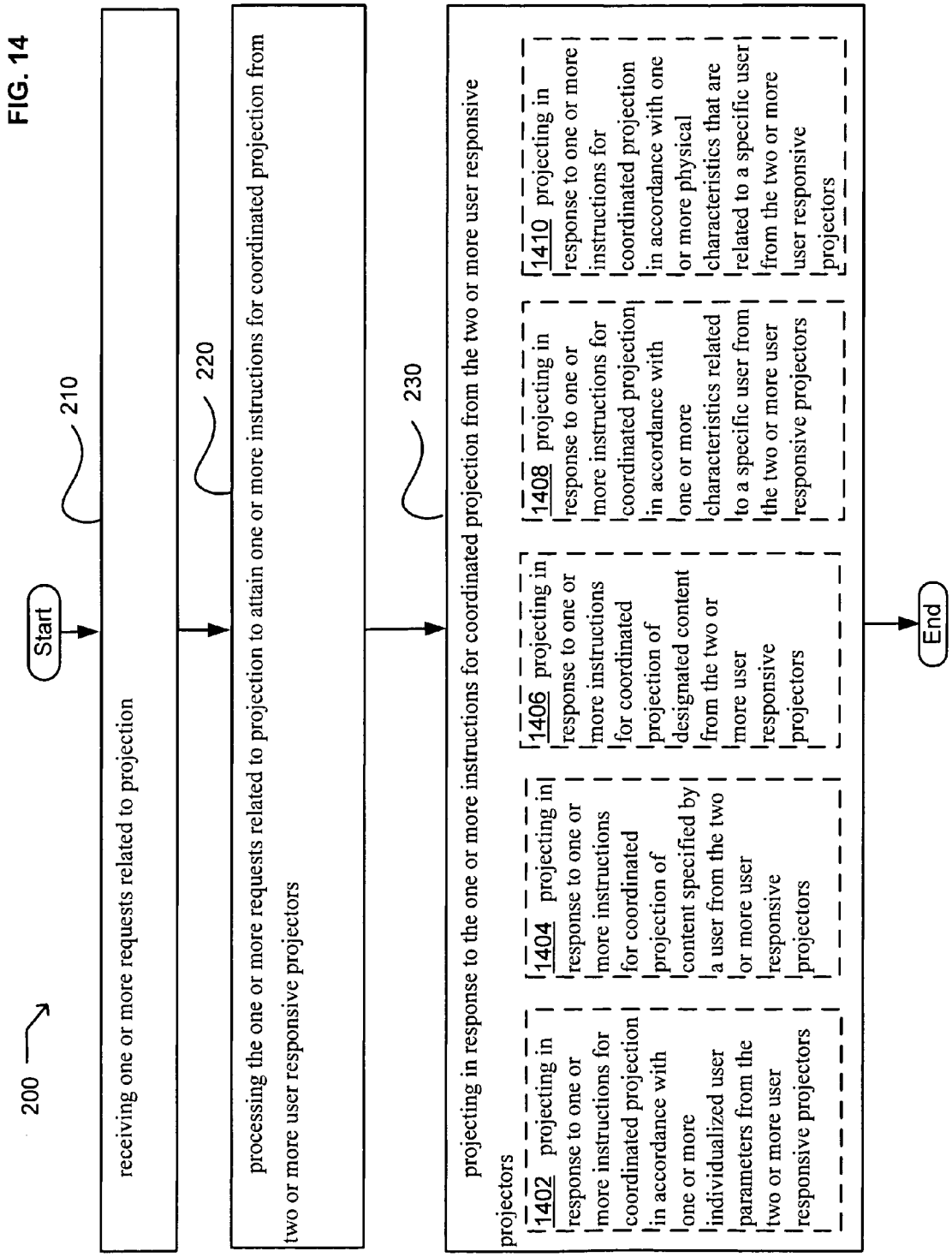

FIG. 14 illustrates alternative embodiments of the example operational flow 200 of FIG. 2. FIG. 14 illustrates example embodiments where the projecting operation 230 may include at least one additional operation. Additional operations may include an operation 1402, operation 1404, operation 1406, operation 1408, and/or operation 1410.

At operation 1402, the projecting operation 230 may include projecting in response to one or more instructions for coordinated projection in accordance with one or more individualized user parameters from the two or more user responsive projectors. In some embodiments, one or more projectors 164 may project in response to one or more instructions for coordinated projection in accordance with one or more individualized user parameters from two or more user responsive projectors 164. One or more projectors 164 may project in response to one or more instructions that include numerous types of individualized user parameters. Examples of such individualized user parameters include, but are not limited to, physical characteristics, mental characteristics, educational characteristics, societal characteristics, and the like. For example, in some embodiments, one or more projectors 164 may project in a coordinated manner with at least one other projector to project content in accordance with the height of an individual. In some embodiments, one or more projectors 164 may project in a coordinated manner with at least one other projector to project content in accordance with the educational interests of an individual. In some embodiments, one or more projectors 164 may project in a coordinated manner with at least one other projector to project content in accordance with the mental interests of an individual. Accordingly, in some embodiments, one or more projectors 164 may project in a coordinated manner with at least one other projector to project content in accordance with numerous types of individualized user parameters.

At operation 1404, the projecting operation 230 may include projecting in response to one or more instructions for coordinated projection of content specified by a user from the two or more user responsive projectors. In some embodiments, one or more projectors 164 may project in response to one or more instructions for coordinated projection of content specified by a user from two or more user responsive projectors 164. In some embodiments, one or more projectors 164 may project in response to one or more instructions to project content that is provided by a user 110. For example, in some embodiments, a user 110 may enter a venue, provide a projection system with access to content that is included on a portable memory device, and request projection of the content. Accordingly, in some embodiments, one or more projectors 164 may project content at a venue that is specified by a user 110. In some embodiments, one or more projectors 164 may project content that is specifically identified on a website. For example, in some embodiments, one or more projectors 164 may project one or more music videos that are available on the internet in response to one or more instructions to locate the website and project the music videos.

At operation 1406, the projecting operation 230 may include projecting in response to one or more instructions for coordinated projection of designated content from the two or more user responsive projectors. In some embodiments, one or more projectors 164 may project in response to one or more instructions for coordinated projection of designated content from two or more user responsive projectors 164. In some embodiments, one or more projectors 164 may project in response to one or more instructions to project designated content that is related to a topic area. For example, in some embodiments, a user 110 may request projection of designated content that is related to scuba diving. Accordingly, in some embodiments, one or more projectors 164 may project in response to one or more instructions to project content related to scuba diving. In some embodiments, one or more projectors 164 may project in response to one or more instructions to project designated content that is related to share prices on the stock market. In some embodiments, one or more projectors 164 may project in response to one or more instructions to project designated content that is related to weather conditions at a selected location. Accordingly, in some embodiments, one or more projectors 164 may project in response to numerous types of instructions to project designated content.

At operation 1408, the projecting operation 230 may include projecting in response to one or more instructions for coordinated projection in accordance with one or more characteristics related to a specific user from the two or more user responsive projectors. In some embodiments, one or more projectors 164 may project in response to the one or more instructions to project in response to one or more instructions for coordinated projection in accordance with one or more characteristics related to a specific user from two or more user responsive projectors 164. In some embodiments, one or more projectors 164 may project in response to one or more instructions that are associated with numerous characteristics related to a specific user 110. Examples of such characteristics include, but are not limited to, physical characteristics (e.g., height, vision, hearing, speech ability, language), cultural characteristics (e.g., country of origin, religion), activities (e.g., swimming, skiing, knitting), hobbies (e.g., coin collecting, stamp collecting), and the like. Accordingly, in some embodiments, one or more projectors 164 may project in response to one or more instructions to project in response to one or more characteristics that are related to one or more specific users 110. For example, in some embodiments, one or more projectors 164 may project in response to one or more instructions to project content that is related to one or more hobbies that are associated with a user 110. In some embodiments, one or more projectors 164 may project in response to one or more instructions to project in accordance with the height of a specific user 110. In some embodiments, one or more projectors 164 may project in response to one or more instructions to project and adjust the volume of sound associated with the projection in accordance with the hearing ability of a specific user 110. Accordingly, in some embodiments, one or more projectors 164 may project in response to numerous types of instructions to project in response to one or more characteristics that are related to one or more specific users 110.

At operation 1410, the projecting operation 230 may include projecting in response to one or more instructions for coordinated projection in accordance with one or more physical characteristics that are related to a specific user from the two or more user responsive projectors. In some embodiments, one or more projectors 164 may project in response to one or more instructions for coordinated projection in accordance with one or more physical characteristics that are related to a specific user from two or more user responsive projectors 164. Examples of such physical characteristics include, but are not limited to, height, weight, visual ability (e.g., myopia, color blindness, etc.), hearing ability, reading ability (e.g., reading speed), and the like. Accordingly, in some embodiments, one or more projectors 164 may project in response to one or more instructions to project in accordance with one or more physical characteristics that are related to a specific user 110. In some embodiments, one or more projectors 164 may project in response to one or more instructions to project in accordance with one or more physical characteristics that are related to a specific user 110. For example, in some embodiments, one or more projectors 164 may project in response to one or more instructions to project in accordance with the height of a specific user 110. In some embodiments, one or more projectors 164 may project in response to one or more instructions to adjust the tone of sound that accompanies a projection in accordance with the auditory characteristics of a specific user 110. In some embodiments, one or more projectors 164 may project in response to one or more instructions to adjust projection characteristics (e.g., tone, contrast, sharpness) in accordance with the visual characteristics of a specific user 110. Accordingly, in some embodiments, one or more projectors 164 may project in response to one or more instructions to adjust projection in accordance with numerous physical characteristics that are related to a specific user 110.

Figure 15:
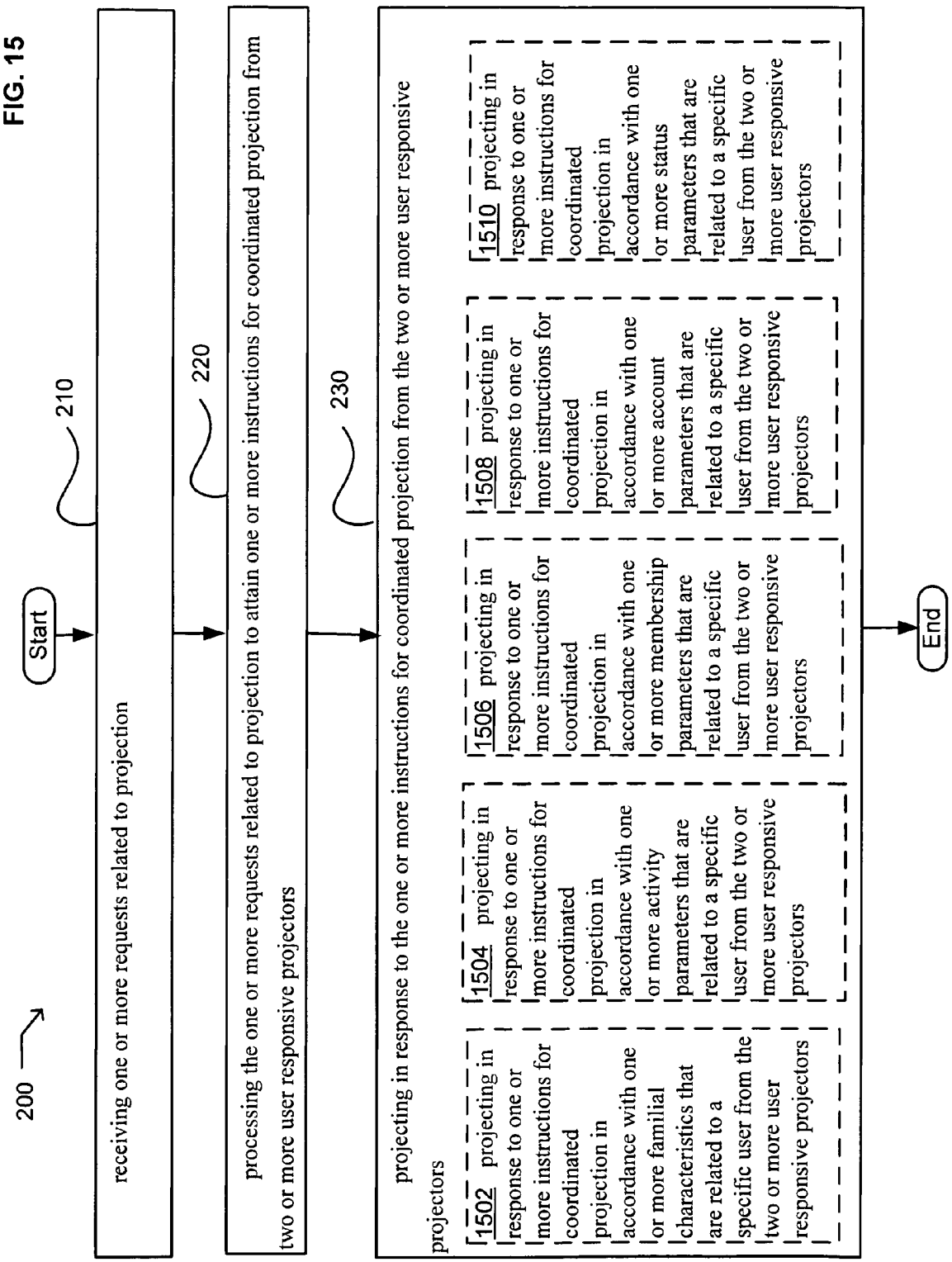

FIG. 15 illustrates alternative embodiments of the example operational flow 200 of FIG. 2. FIG. 15 illustrates example embodiments where the projecting operation 230 may include at least one additional operation. Additional operations may include an operation 1502, operation 1504, operation 1506, operation 1508, and/or operation 1510.

At operation 1502, the projecting operation 230 may include projecting in response to one or more instructions for coordinated projection in accordance with one or more familial characteristics that are related to a specific user from the two or more user responsive projectors. In some embodiments, one or more projectors 164 may project in response to one or more instructions for coordinated projection in accordance with one or more familial characteristics that are related to a specific user from two or more user responsive projectors 164. Examples of instructions associated with familial characteristics include, but are not limited to, instructions associated with parents, instructions associated with siblings, instructions associated with grandparents, instructions associated with children, instructions associated with grandchildren, instructions associated with relatives, and the like. In some embodiments, one or more projectors 164 may project in response to one or more instructions that may be associated with the health history of members of a family. For example, in some embodiments, one or more projectors 164 may project in response to one or more instructions related to the incidence of disease (e.g., cancer, diabetes, glaucoma, etc.) within members of a family. Accordingly, in some embodiments, one or more projectors 164 may project in response to instructions that may be used within a medical context for patient related matters. In some embodiments, familiar characteristics may include pictures of family members who are related to a specific user 110. Accordingly, in some embodiments, one or more projectors 164 may project in response to one or more instructions to project pictures of family members that are related to a specific user 110. Accordingly, in some embodiments, one or more projectors 164 may project in response to one or more instructions associated with one or more familial characteristics that are related to a specific user 110.

At operation 1504, the projecting operation 230 may include projecting in response to one or more instructions for coordinated projection in accordance with one or more activity parameters that are related to a specific user from the two or more user responsive projectors. In some embodiments, one or more projectors 164 may project in response to one or more instructions for coordinated projection in accordance with one or more activity parameters that are related to a specific user from two or more user responsive projectors 164. In some embodiments, one or more projectors 164 may project in response to one or more instructions associated with activity parameters that are related to a specific user 110. Examples of such instructions include instructions related to types of activities (e.g., skydiving, scuba diving, mountain climbing, skiing, etc.), scheduling of activities (e.g., calendared times where activities may occur, availability of accommodations at a location where an activity may occur, etc.), other users 110 who have an interest in a common activity (e.g., other users 110 who are scuba divers), and the like. Accordingly, in some embodiments, one or more projectors 164 may project in response to one or more instructions to project in accordance with one or more activity parameters that are related to a specific user 110. For example, in some embodiments, one or more projectors 164 may project in response to one or more instructions to select content for projection that is of interest to all and/or a majority of specific users 110.

At operation 1506, the projecting operation 230 may include projecting in response to one or more instructions for coordinated projection in accordance with one or more membership parameters that are related to a specific user from the two or more user responsive projectors. In some embodiments, one or more projectors 164 may project in response to one or more instructions for coordinated projection in accordance with one or more membership parameters that are related to a specific user from two or more user responsive projectors 164. In some embodiments, one or more projectors 164 may project in response to one or more instructions associated with membership parameters that are related to a specific user 110. Examples of such instructions may include information related to types of memberships (e.g., health club memberships, social club memberships, credit card memberships, airline memberships), membership levels (e.g., gold card level, platinum card level, frequent flier level), membership privileges (e.g., access to frequent flier lounges, access to airline booking services), and the like. Accordingly, in some embodiments, one or more projectors 164 may project in response to one or more instructions for projection in accordance with one or more membership parameters that are related to a specific user 110. In some embodiments, one or more projectors 164 may project in response to one or more instructions to project content that is available to the specific user 110. For example, in some embodiments, one or more projectors 164 may project in response to one or more instructions to project airline booking information that is only available to elite frequent flier members. Accordingly, in some embodiments, one or more projectors 164 may project in response to numerous types of instructions that are related to one or more membership parameters.

At operation 1508, the projecting operation 230 may include projecting in response to one or more instructions for coordinated projection in accordance with one or more account parameters that are related to a specific user from the two or more user responsive projectors. In some embodiments, one or more projectors 164 may project in response to one or more instructions for coordinated projection in accordance with one or more account parameters that are related to a specific user from two or more user responsive projectors 164. In some embodiments, one or more projectors 164 may project in response to one or more instructions that are associated with one or more account parameters related to a specific user 110. Examples of such instructions may include information related to types of accounts (e.g., credit card accounts, bank accounts, prepaid accounts, gift cards), account levels (e.g., gold card level, platinum card level), account privileges (e.g., access to rewards programs), and the like. Accordingly, in some embodiments, one or more projectors 164 may project in response to one or more instructions to project in accordance with one or more account parameters that are related to a specific user 110. In some embodiments, one or more projectors 164 may project in response to one or more instructions to project content in accordance with one or more account parameters. For example, in some embodiments, one or more projectors 164 may project in response to one or more instructions to project information related to a rewards program that is only available to holders of a platinum credit card account. Accordingly, in some embodiments, one or more projectors 164 may project in response to numerous types of instructions related to one or more account parameters.

At operation 1510, the projecting operation 230 may include projecting in response to one or more instructions for coordinated projection in accordance with one or more status parameters that are related to a specific user from the two or more user responsive projectors. In some embodiments, one or more projectors 164 may project in response to one or more instructions for coordinated projection in accordance with one or more status parameters that are related to a specific user from two or more user responsive projectors 164. In some embodiments, one or more projectors 164 may project in response to one or more status parameters related to a specific user 110. Examples of such instructions may include information that includes, but is not limited to, net worth, club memberships, ownership interests, and the like. Accordingly, in some embodiments, one or more projectors 164 may project in response to one or more instructions in accordance with one or more status parameters that are related to a specific user 110. In some embodiments, one or more projectors 164 may project in response to one or more instructions to project content that is available to specific user 110 in accordance with one or more status parameters. For example, in some embodiments, one or more projectors 164 may project in response to one or more instructions to project information that is only available to owners of a certain type of automobile. Accordingly, in some embodiments, one or more projectors 164 may project in response to numerous types of instructions related to one or more status parameters.

Figure 16:
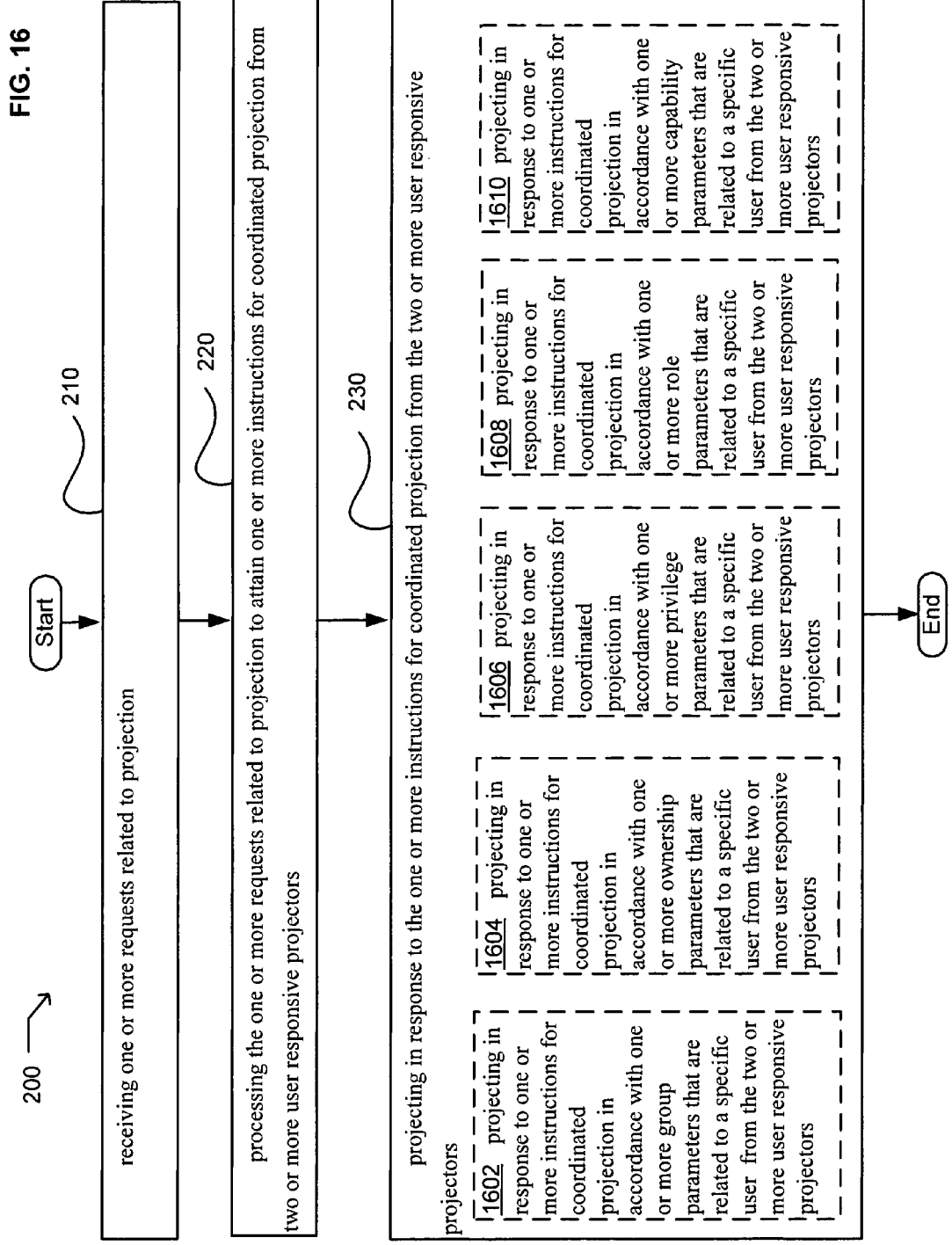

FIG. 16 illustrates alternative embodiments of the example operational flow 200 of FIG. 2. FIG. 16 illustrates example embodiments where the projecting operation 230 may include at least one additional operation. Additional operations may include an operation 1602, operation 1604, operation 1606, operation 1608, and/or operation 1610.

At operation 1602, the projecting operation 230 may include projecting in response to one or more instructions for coordinated projection in accordance with one or more group parameters that are related to a specific user from the two or more user responsive projectors. In some embodiments, one or more projectors 164 may project in response to one or more instructions for coordinated projection in accordance with one or more group parameters that are related to a specific user from two or more user responsive projectors 164. In some embodiments, one or more projectors 164 may project in response to one or more group parameters that are related to a specific user 110. Examples of instructions related to group parameters may include, but are not limited to, instructions associated with membership in a working group, membership in a chat group, membership in a book club, participation in a computer user group, and the like. In some embodiments, one or more projectors 164 may project in response to one or more instructions to project in accordance with projection resources that are available to a specific user 110 based on group membership. For example, in some embodiments, greater participation with the group by a specific user 110 may result in a greater amount of projection resources being available to the specific user 110. Accordingly, in some embodiments, one or more projectors 164 may project in response to one or more instructions for projection in accordance with one or more group parameters that are related to a specific user 110. In some embodiments, one or more projectors 164 may project in response to one or more instructions to project content that is available to the specific user 110 in accordance with one or more group parameters. For example, in some embodiments, one or more projectors 164 may project in response to one or more instructions to project information that is only available to group members who have recently been active participants with the group. Accordingly, in some embodiments, one or more projectors 164 may project in response to numerous types of instructions to project in response to one or more group parameters.

At operation 1604, the projecting operation 230 may include projecting in response to one or more instructions for coordinated projection in accordance with one or more ownership parameters that are related to a specific user from the two or more user responsive projectors. In some embodiments, one or more projectors 164 may project in response to one or more instructions for coordinated projection in accordance with one or more ownership parameters that are related to a specific user from two or more user responsive projectors 164. In some embodiments, one or more projectors 164 may project in response to one or more ownership parameters that are related to a specific user 110. Examples of instructions related to ownership parameters may include, but are not limited to, instructions associated with ownership of a vehicle (e.g., automobile, motorcycle, boat, airplane, helicopter), instructions associated with ownership of a collectable (e.g., coin, stamp, pottery, painting), instructions associated with ownership of a financial instrument (e.g., stock, bond, municipal bond, mutual fund), instructions associated with ownership of a commodity (e.g., silver, gold, platinum), and the like. Accordingly, in some embodiments, one or more projectors 164 may project in response to one or more instructions to project in accordance with one or more ownership parameters that are related to a specific user 110. In some embodiments, one or more projectors 164 may project in response to one or more instructions to project content in accordance with one or more ownership parameters. For example, in some embodiments, one or more projectors 164 may project in response to one or more instructions to project information for a specific user 110 who is known to own a specific type of motorcycle. Accordingly, in some embodiments, one or more projectors 164 may project in response to one or more instructions for projection of content that is related to an item owned by a specific user 110. In some embodiments, one or more projectors 164 may project in response to one or more instructions to project content in accordance with ownership parameters that are associated with one or more users 110. For example, in some embodiments, one or more projectors 164 may project in response to one or more instructions to project content for two or more users 110 that own large boats. Accordingly, in some embodiments, one or more projectors 164 may project in response to numerous types of instructions to project in response to one or more ownership parameters.

At operation 1606, the projecting operation 230 may include projecting in response to one or more instructions for coordinated projection in accordance with one or more privilege parameters that are related to a specific user from the two or more user responsive projectors. In some embodiments, one or more projectors 164 may project in response to one or more instructions for coordinated projection in accordance with one or more privilege parameters that are related to a specific user from two or more user responsive projectors 164. In some embodiments, one or more projectors 164 may project in response to one or more privilege parameters that are related to a specific user 110. Examples of instructions related to privilege parameters may include, but are not limited to, instructions associated with security clearances, instructions associated with viewing designated files, instructions associated with obtaining passwords, instructions associated with access codes, and the like. Accordingly, in some embodiments, one or more projectors 164 may project in response to one or more instructions for projection in accordance with one or more privilege parameters that are related to a specific user 110. For example, in some embodiments, a specific user 110 may request projection of protected information. Accordingly, in some embodiments, one or more projectors 164 may project in response to one or more instructions to project content that is selected in accordance with a security clearance held by a specific user 110. Accordingly, in some embodiments, one or more projectors 164 may project in response to numerous types of instructions to project in response to one or more privilege parameters.

At operation 1608, the projecting operation 230 may include projecting in response to one or more instructions for coordinated projection in accordance with one or more role parameters that are related to a specific user from the two or more user responsive projectors. In some embodiments, one or more projectors 164 may project in response to one or more instructions for coordinated projection in accordance with one or more role parameters that are related to a specific user from two or more user responsive projectors 164. In some embodiments, one or more projectors 164 may project in response to one or more role parameters that are related to a specific user 110. Examples of instructions related to role parameters may include, but are not limited to, instructions associated with the occupation of a specific user, instructions associated with the hierarchical position of a specific user 110 (e.g., supervisor, subordinate, teacher, student), instructions associated with an activity of a specific user 110 (e.g., presenter, audience member, reviewer, critic), and the like. Accordingly, in some embodiments, one or more projectors 164 may project in response to one or more instructions for projection in accordance with one or more role parameters that are related to a specific user 110. In some embodiments, one or more projectors 164 may project in response to one or more instructions to project content in accordance with one or more role parameters. For example, in some embodiments, one or more projectors 164 may project in response to one or more instructions to project exam answers based on the role parameter of the specific user 110 being a teacher. In some embodiments, one or more projectors 164 may project in response to one or more instructions to direct projection that are based on one or more role parameters. For example, in some embodiments, one or more projectors 164 may project in response to one or more instructions to direct projection of lecture notes onto a podium for a user 110 who is a presenter (e.g., speaker at a conference). For example, in some embodiments, one or more projectors 164 may project resume information for a specific user 110 who is associated with a human resources role parameter that is unavailable to other users 110 who are not associated with a human resources role parameter. Accordingly, in some embodiments, one or more projectors 164 may project in response to numerous types of instructions to project in response to one or more role parameters.

At operation 1610, the projecting operation 230 may include projecting in response to one or more instructions for coordinated projection in accordance with one or more capability parameters that are related to a specific user from the two or more user responsive projectors. In some embodiments, one or more projectors 164 may project in response to one or more instructions for coordinated projection in accordance with one or more capability parameters that are related to a specific user from two or more user responsive projectors 164. In some embodiments, one or more projectors 164 may project in response to one or more capability parameters that are related to a specific user 110. Examples of instructions related to capability parameters may include, but are not limited to, instructions associated with physical capabilities (e.g., ability to climb stairs, ability to walk, ability to hear, ability to see, use of a wheelchair, use of a walker), instructions associated with mental capabilities (e.g., ability level associated with problem solving, ability to speak, languages that are spoken by a specific user, phobias), social capabilities (e.g., extroverted behavior, introverted behavior, social phobias), gaming capabilities (e.g., level of play achieved on video games), and the like. Accordingly, in some embodiments, one or more projectors 164 may project in response to one or more instructions to project in accordance with one or more capability parameters that are related to a specific user 110. In some embodiments, one or more projectors 164 may project in response to one or more instructions to project content in accordance with one or more capability parameters that are associated with a specific user 110. In some embodiments, one or more projectors 164 may project in response to one or more instructions to project with one or more projectors 164 that are located in an area that is accessible to the specific user 110 having limited mobility. For example, in some embodiments, a specific user 110 who has limited mobility may enter a multi-level venue and request projection services. Accordingly, in some embodiments, one or more projectors 164 that are accessible to a specific user 110 based on one or more of the specific user's capability parameters may project in response to one or more instructions. In some embodiments, one or more projectors 164 may project in response to one or more instructions to direct projection in accordance with one or more capability parameters that are associated with a specific user 110. For example, in some embodiments, one or more projectors 164 that are configured to project at an eye level that is appropriate for a user 110 who is seated in a wheelchair may be instructed to project in accordance with the capability parameters of a user 110. In some embodiments, one or more projectors 164 may project in response to one or more instructions that facilitate configuration of the one or more projectors 164 to project at an eye level that is appropriate for a user 110 who is seated in a wheelchair. In some embodiments, one or more projectors 164 may project in response to one or more instructions that facilitate projection of content that is selected in accordance with one or more capability parameters that are associated with a specific user 110. For example, in some embodiments, one or more projectors 164 may project in response to one or more instructions that facilitate projection of a level of play of a video game based on one or more gaming capability parameters that are associated with the specific user 110. Accordingly, in some embodiments, one or more projectors 164 may project in response to numerous types of instructions to project in response to one or more capability parameters.

Figure 17:
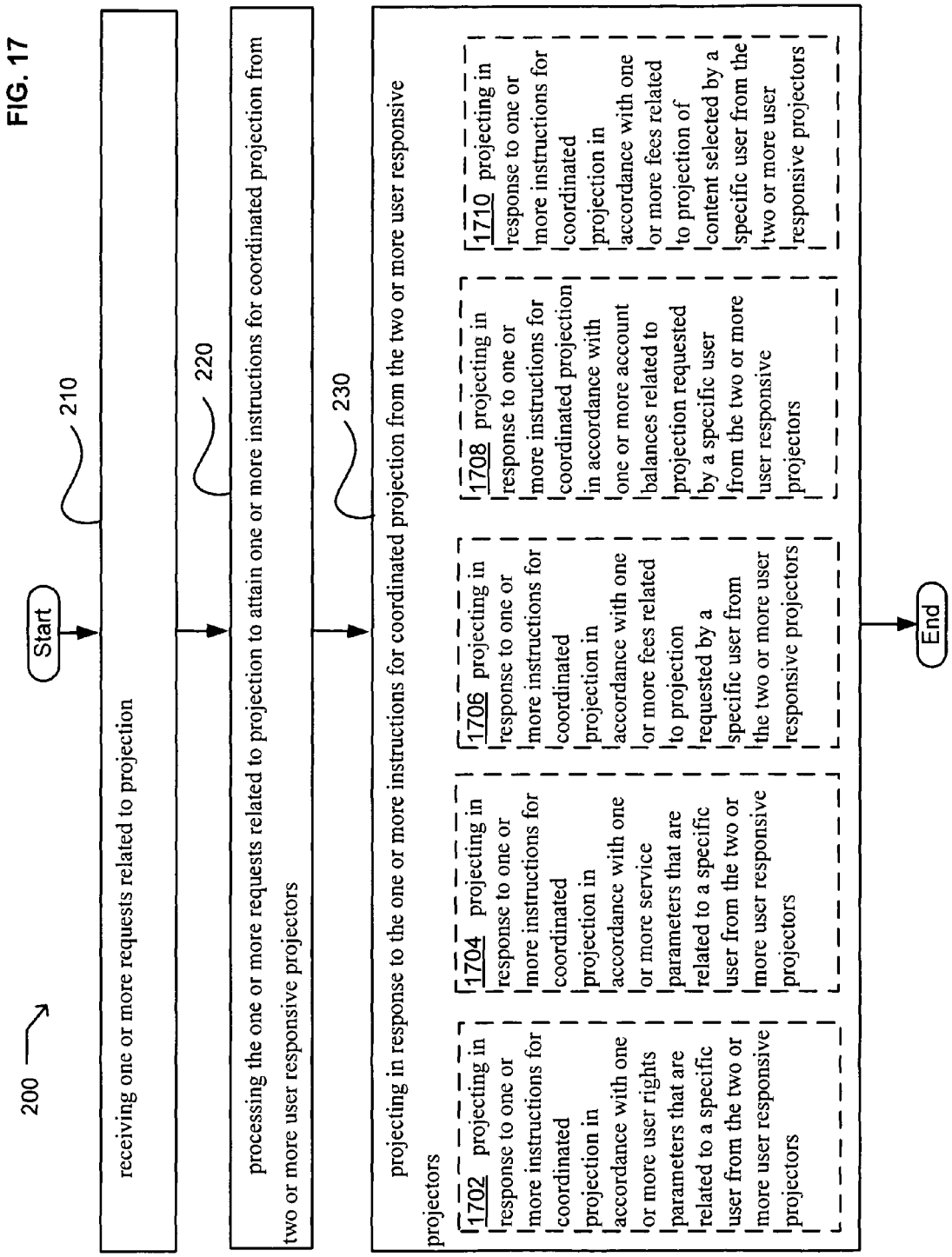

FIG. 17 illustrates alternative embodiments of the example operational flow 200 of FIG. 2. FIG. 17 illustrates example embodiments where the projecting operation 230 may include at least one additional operation. Additional operations may include an operation 1702, operation 1704, operation 1706, operation 1708, and/or operation 1710.

At operation 1702, the projecting operation 230 may include projecting in response to one or more instructions for coordinated projection in accordance with one or more user rights parameters that are related to a specific user from the two or more user responsive projectors. In some embodiments, one or more projectors 164 may project in response to one or more instructions for coordinated projection in accordance with one or more user rights parameters that are related to a specific user from two or more user responsive projectors 164. In some embodiments, one or more projectors 164 may project in response to one or more user rights parameters that are related to a specific user 110. Examples of instructions related to user rights parameters may include, but are not limited to, instructions associated with rights to access content, instructions associated with rights to copy content, instructions associated with rights to view content, instructions associated with rights to share content, instructions associated with rights to distribute content, instructions associated with rights to project content, and the like. Accordingly, in some embodiments, one or more projectors 164 may project in response to one or more instructions for projecting in accordance with one or more user rights parameters that are related to a specific user 110. In some embodiments, one or more projectors 164 may project in response to one or more instructions to project content that is selected in accordance with one or more user rights parameters that are associated with a specific user 110. For example, in some embodiments, a specific user 110 may be associated with one or more user rights parameters that allow access to a first set of content but do not allow access to a second set of content. Accordingly, in some embodiments, one or more projectors 164 may project in response to one or more instructions to access the first set of content but not to access the second set of content.

At operation 1704, the projecting operation 230 may include projecting in response to one or more instructions for coordinated projection in accordance with one or more service parameters that are related to a specific user from the two or more user responsive projectors. In some embodiments, one or more projectors 164 may project in response to one or more instructions for coordinated projection in accordance with one or more service parameters that are related to a specific user from two or more user responsive projectors 164. In some embodiments, one or more projectors 164 may project in response to projection service parameters that are related to a specific user 110. Examples of instructions related to projection service parameters may include, but are not limited to, instructions associated with projection preferences that are associated with a specific user 110 (e.g., tone, color, brightness), instructions associated with the projection service level purchased by a specific user 110 (e.g., types of projection services that a specific user 110 has purchased), instructions associated with projection from one or more specifically requested projectors 164 (e.g., projection from one or more high resolution projectors 164, projection from one or more low resolution projectors 164, projection from a single projector 164, projection from more than one projector 164, projection from more than one projectors 164 that are coordinated with each other), and the like. Accordingly, in some embodiments, one or more projectors 164 may project in response to one or more instructions that are associated with selection of the one or more projectors 164 in accordance with one or more projection service parameters.

At operation 1706, the projecting operation 230 may include projecting in response to one or more instructions for coordinated projection in accordance with one or more fees related to projection requested by a specific user from the two or more user responsive projectors. In some embodiments, one or more projectors 164 may project in response to one or more instructions for coordinated projection in accordance with one or more fees related to projection requested by a specific user from two or more user responsive projectors 164. In some embodiments, one or more projectors 164 may project in response to one or more projection related fees. Examples of such fees include, but are not limited to, fees associated with the use of one or more projectors 164 (e.g., use of one or more specific projectors 164, use of one or more non-specified projectors 164, use of more than one projector 164 in combination with another projector 164), fees associated with the use of one or more projection surfaces (e.g., use of one or more non-specified projection surfaces 166, use of one or more specific projection surfaces), fees associated with capture of projected content (e.g., printing of projected content, saving projected content), transmission of projected content (e.g., transmitting one or more projected images through use of a wireless connection), and the like. Accordingly, one or more projectors 164 may project in response to numerous types of instructions that are associated with one or more projection related fees.

At operation 1708, the projecting operation 230 may include projecting in response to one or more instructions for coordinated projection in accordance with one or more account balances related to projection requested by a specific user from the two or more user responsive projectors. In some embodiments, one or more projectors 164 may project in response to one or more instructions for coordinated projection in accordance with one or more account balances related to projection requested by a specific user from two or more user responsive projectors 164. In some embodiments, one or more projectors 164 may project in response to one or more instructions associated with information that is related to one or more account balances. Examples of such information include, but are not limited to, credit card limits, bank account balance (e.g., checking account, savings account), projection account balance (e.g., prepaid account to purchase projection services), gift card balance, and the like. Accordingly, in some embodiments, one or more projectors 164 may project in response to one or more instructions associated with one or more account balances that are associated with a specific user 110. In some embodiments, such instructions may be used to control projection services that are available to a specific user 110. For example, in some embodiments, one or more projectors 164 may project in response to one or more instructions that facilitate use of a projection system within a venue. Accordingly, in some embodiments, one or more projectors 164 may project in response to one or more instructions that facilitate use of one or more projectors 164 based upon one or more account balances that are associated with the specific user 110. For example, in some embodiments, a specific user 110 may lack adequate funds within an account to project with a high resolution projector 164 but may have adequate funds to project with a low resolution projector 164. Accordingly, in some embodiments, one or more instructions may facilitate projection from one or more projectors 164 in accordance with one or more account balances that are associated with a specific user 110.

At operation 1710, the projecting operation 230 may include projecting in response to one or more instructions for coordinated projection in accordance with one or more fees related to projection of content selected by a specific user from the two or more user responsive projectors. In some embodiments, one or more projectors 164 may project in response to one or more instructions for coordinated projection in accordance with one or more fees related to projection of content selected by a specific user from two or more user responsive projectors 164. In some embodiments, one or more projectors 164 may project in response to one or more instructions that are associated with fees that are related to projection of content selected by a specific user 110. Examples of such fees include, but are not limited to, licensing fees associated with content, access fees associated with content, subscription fees associated with content, rental fees associated with content, and the like. Accordingly, in some embodiments, one or more projectors 164 may project in response to one or more instructions that facilitate projection in accordance with one or more fees that have been compared to one or more account balances that are associated with a specific user 110. Accordingly, in some embodiments, one or more projectors 164 may project in response to one or more instructions that are associated with one or more fees related to projection of content selected by a specific user 110.

Figure 18:
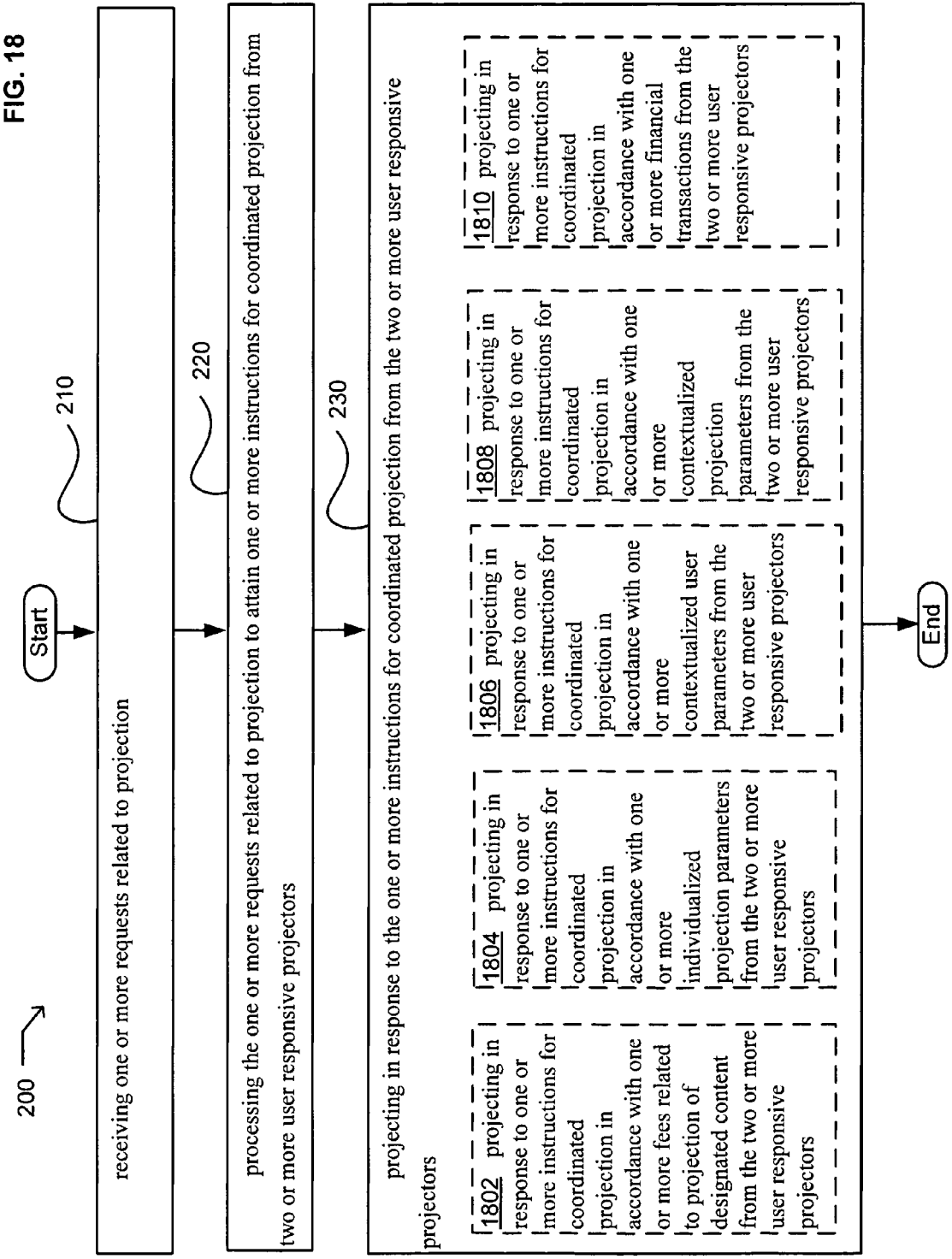

FIG. 18 illustrates alternative embodiments of the example operational flow 200 of FIG. 2. FIG. 18 illustrates example embodiments where the projecting operation 230 may include at least one additional operation. Additional operations may include an operation 1802, operation 1804, operation 1806, operation 1808, and/or operation 1810.

At operation 1802, the projecting operation 230 may include projecting in response to one or more instructions for coordinated projection in accordance with one or more fees related to projection of designated content from the two or more user responsive projectors. In some embodiments, one or more projectors 164 may project in response to one or more instructions for coordinated projection in accordance with one or more fees related to projection of designated content from two or more user responsive projectors 164. In some embodiments, one or more projectors 164 may project in response to one or more instructions that are associated with one or more fees related to projection of designated content. Examples of such instructions include, but are not limited to, instructions associated with fees that are related to the use of one or more projectors 164 (e.g., use of a high resolution projector 164, use of a low resolution projector 164, acquiring priority of projection relative to another user 110, use of multiple coordinated projectors 164), instructions associated with fees that are related to the use of one or more projection surfaces 166 (e.g., preferred projection surface 166, capture capability of the projection surface 166), instructions associated with fees that are related to projection of the designated content (e.g., licensing fees, access fees), and the like.

At operation 1804, the projecting operation 230 may include projecting in response to one or more instructions for coordinated projection in accordance with one or more individualized projection parameters from the two or more user responsive projectors. In some embodiments, one or more projectors 164 may project in response to one or more instructions for coordinated projection in accordance with one or more individualized projection parameters from two or more user responsive projectors 164. In some embodiments, one or more projectors 164 may project in response to one or more instructions that are associated with one or more individualized projection parameters. Examples of such instructions include, but are not limited to, instructions associated with content that is preferred by an individual, instructions associated with projection preferences of an individual (e.g., color, tone, brightness), instructions associated with fees associated with projection (e.g., cost limit associated with an individual), and the like. Accordingly, in some embodiments, one or more projectors 164 may project in response to numerous types of instructions that facilitate projection in accordance with one or more individualized projection parameters.

At operation 1806, the projecting operation 230 may include projecting in response to one or more instructions for coordinated projection in accordance with one or more contextualized user parameters from the two or more user responsive projectors. In some embodiments, one or more projectors 164 may project in response to one or more instructions for coordinated projection in accordance with one or more contextualized user parameters from two or more user responsive projectors 164. In some embodiments, one or more projectors 164 may project in response to one or more instructions that are associated with one or more contextualized user parameters. Examples of such instructions include, but are not limited to, instructions associated with the location of a user 110, instructions associated with the environment in which a user 110 is present, instructions associated with the context in which a user 110 is present, instructions associated with one or more reasons that a user 110 is at a venue, and the like. For example, in some embodiments, one or more projectors 164 may project in response to one or more instructions that are associated with contextualized user parameters related to a venue in which a user 110 is present. Examples of such venues may include, but are not limited to, a restaurant, a coffee shop, a nightclub, a department store, a medical office, a dental office, a conference room, an auditorium, a classroom, an athletic event, and the like. Accordingly, in some embodiments, one or more projectors 164 may project in response to one or more instructions to project in one or more venues in which a user 110 requests projection. In some embodiments, one or more projectors 164 may project in response to one or more instructions that control projection (e.g., select projection equipment that is used for projection, select content for projection). For example, in some embodiments, a user 110 may be a presenter at a conference. Accordingly, in some embodiments, one or more projectors 164 may project in response to one or more instructions that control content that is projected at the venue. In some embodiments, one or more projectors 164 may project in response to one or more instructions that control projection in accordance with the reason that a user 110 is at a location. For example, in some embodiments, a user 110 may attend an automobile show to learn about a new type of automobile. Accordingly, in some embodiments, one or more projectors 164 may project in response to one or more instructions that facilitate projection of material that is limited to content related to automobiles. In some embodiments, one or more projectors 164 may project in response to one or more instructions that control projection in accordance with the environment in which a user 110 is present. For example, in some embodiments, a user 110 may be present at a daycare facility. Accordingly, in some embodiments, one or more projectors 164 may project in response to one or more instructions that limit projection to content that is appropriate for children.

At operation 1808, the projecting operation 230 may include projecting in response to one or more instructions for coordinated projection in accordance with one or more contextualized projection parameters from the two or more user responsive projectors. In some embodiments, one or more projectors 164 may project in response to one or more instructions for coordinated projection in accordance with one or more contextualized projection parameters from two or more user responsive projectors 164. In some embodiments, one or more projectors 164 may project in response to one or more instructions that are associated with one or more contextualized projection parameters. Examples of such instructions include, but are not limited to, instructions associated with requests 168 for projection within a venue, instructions associated with requests 168 for projection onto one or more projection surfaces 166, instructions associated with requests 168 for projection through use of one or more projectors 164, instructions associated with requests 168 for projection through use of two or more coordinated projectors 164, and the like. For example, in some embodiments, one or more projectors 164 may project in response to one or more instructions that facilitate projection within a venue. Accordingly, in some embodiments, one or more projectors 164 may project in response to one or more instructions that facilitate projection of content that is selected in accordance with the venue where projection is requested. For example, in some embodiments, projection may be requested within a childcare center. Accordingly, in some embodiments, one or more projectors 164 may project in response to one or more instructions that limit projection of content that is appropriate for a childcare center. In some embodiments, one or more projectors 164 may project in response to one or more instructions that facilitate projection onto one or more projection surfaces 166. Accordingly, in some embodiments, one or more projectors 164 may project in response to one or more instructions that facilitate projection from one or more projectors 164 that are configured and/or configurable to project onto one or more selected projection surfaces 166. Accordingly, in some embodiments, one or more projectors 164 may project in response to one or more instructions that facilitate projection in accordance with one or more contextualized projection parameters.

At operation 1810, the projecting operation 230 may include projecting in response to one or more instructions for coordinated projection in accordance with one or more financial transactions from the two or more user responsive projectors. In some embodiments, one or more projectors 164 may project in response to one or more instructions for coordinated projection in accordance with one or more financial transactions from two or more user responsive projectors 164. In some embodiments, one or more projectors may project in response to numerous types of instructions for coordinated projection in accordance with one or more financial transactions from two or more user responsive projectors. For example, in some embodiments, one or more projectors may project in accordance with one or more instructions to select content (e.g., bank records, account balances, fund transfer information) that may be projected for a specific user 110 (e.g., a party to the financial transaction). In some embodiments, one or more projectors may project in response to one or more instructions to project information in a secure location.

Figure 19:
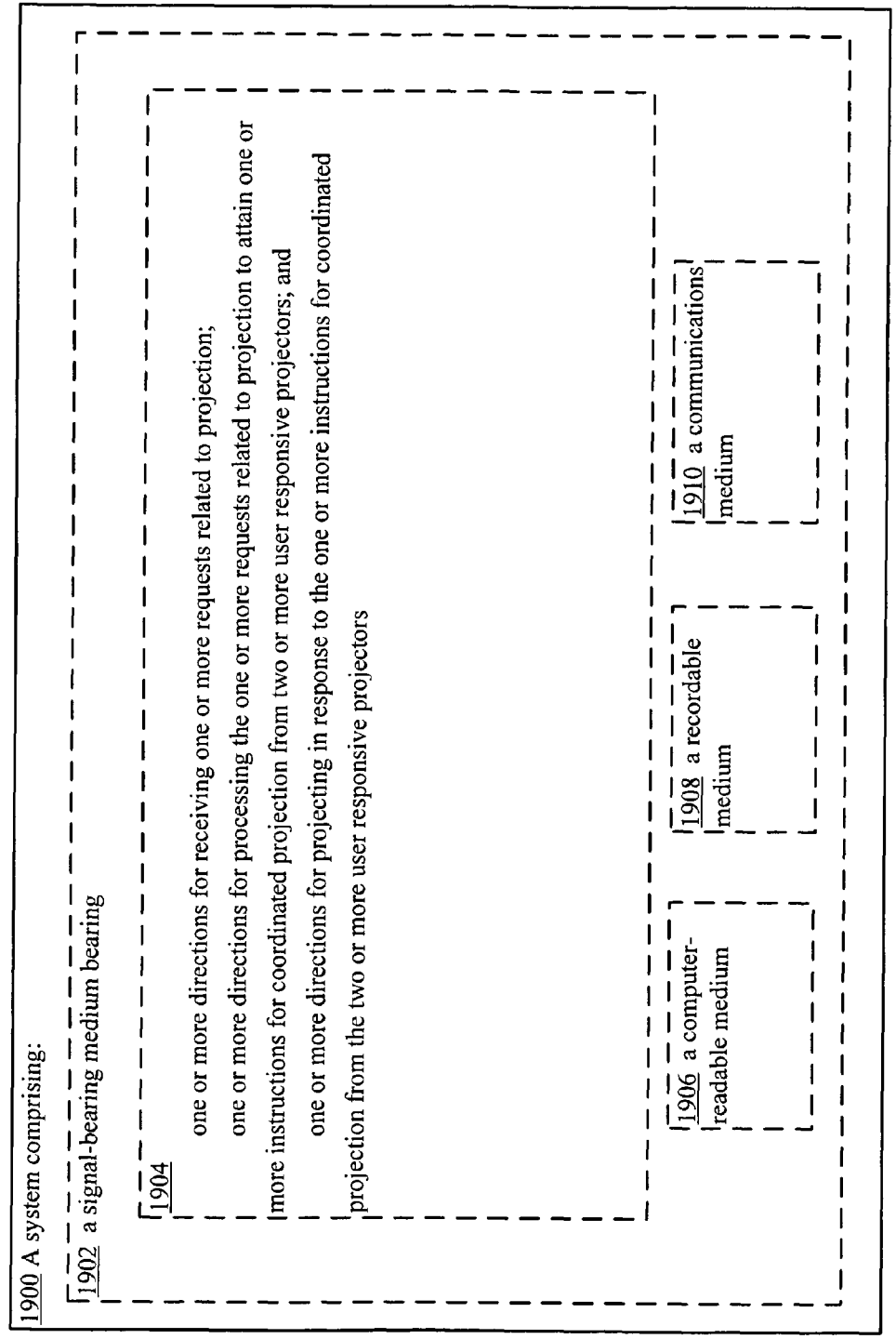
FIG. 19 illustrates a partial view of a system 1900 that includes a computer program for executing a computer process on a computing device.

FIG. 19 illustrates a partial view of a system 1900 that includes a computer program 1904 for executing a computer process on a computing device. An embodiment of system 1900 is provided using a signal-bearing medium 1902 bearing one or more directions for receiving one or more requests related to projection, one or more directions for processing the one or more requests related to projection to attain one or more instructions for coordinated projection from two or more user responsive projectors, and one or more directions for projecting in response to the one or more instructions for coordinated projection from the two or more user responsive projectors. The one or more directions may be, for example, computer executable and/or logic-implemented instructions. In some embodiments, the signal-bearing medium 1902 may include a computer-readable medium 1906. In some embodiments, the signal-bearing medium 1902 may include a recordable medium 1908. In some embodiments, the signal-bearing medium 1902 may include a communications medium 1910.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times. Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various embodiments described herein can be implemented, individually and/or collectively, by various types of electromechanical systems having a wide range of electrical components such as hardware, software, firmware, and/or virtually any combination thereof; and a wide range of components that may impart mechanical force or motion such as rigid bodies, spring or torsional bodies, hydraulics, electromagnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs. Those skilled in the art will also appreciate that examples of electromechanical systems include but are not limited to a variety of consumer electronics systems, medical devices, as well as other systems such as motorized transport systems, factory automation systems, security systems, and/or communication/computing systems. Those skilled in the art will recognize that electromechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch screen, an antenna, etc.), control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Those skilled in the art will recognize that at least a portion of the devices and/or processes described herein can be integrated into a mote system. Those having skill in the art will recognize that a typical mote system generally includes one or more memories such as volatile or non-volatile memories, processors such as microprocessors or digital signal processors, computational entities such as operating systems, user interfaces, drivers, sensors, actuators, applications programs, one or more interaction devices (e.g., an antenna USB ports, acoustic ports, etc.), control systems including feedback loops and control motors (e.g., feedback for sensing or estimating position and/or velocity; control motors for moving and/or adjusting components and/or quantities). A mote system may be implemented utilizing suitable components, such as those found in mote computing/communication systems. Specific examples of such components entail such as Intel Corporation's and/or Crossbow Corporation's mote components and supporting hardware, software, and/or firmware.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory). A sale of a system or method may likewise occur in a territory even if components of the system or method are located and/or used outside the territory. Further, implementation of at least part of a system for performing a method in one territory does not preclude use of the system in another territory.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although user 110 is shown/described herein as a single illustrated figure, those skilled in the art will appreciate that user 110 may be representative of a human user, a robotic user (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that such terms (e.g. "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

What is claimed is:

1. A system comprising:

circuitry for receiving, from one or more wireless mobile user communications devices, one or more requests for projection, the one or more wireless mobile user communications devices being configured for sending the one or more requests for projection from one or more users, the one or more wireless mobile user communications devices including one or more sensors configured to detect and one or more user interfaces that are configured to respond to at least one of: a) an application of a pressure by the one or more users to a tactile interface on a touchscreen of the one or more wireless mobile user communications devices, or b) one or more gestures by the one or more users applied to the one or more wireless mobile user communications devices, the one or more gestures to include at least one of an acceleration, a negative acceleration, or a squeeze;

circuitry for processing the one or more requests for projection to attain one or more instructions for coordinated projection from two or more user responsive projectors, the one or more requests for projection including information associated with one or more physical characteristics obtained using the one or more sensors included with the wireless communication device and that are related to a specific user to attain one or more instructions for coordinated projection, in accordance with the one or more physical characteristics that are related to the specific user, from the two or more user responsive projectors; and circuitry for projecting in response to the one or more instructions for coordinated projection from the two or more user responsive projectors, at least a first of the two or more user responsive projectors configured to project a first content and at least a second of the two or more user responsive projectors configured to project a second content, the first content to be different from the second content.

2. The system of claim 1, wherein the circuitry for receiving, from one or more wireless mobile user communications devices, one or more requests for projection, the one or more wireless mobile user communications devices being configured for sending the one or more requests for projection from one or more users, the one or more wireless mobile user communications devices including one or more sensors configured to detect and one or more user interfaces that are configured to respond to at least one of: a) an application of a pressure by the one or more users to a tactile interface on a touchscreen of the one or more wireless mobile user communications devices, or b) one or more gestures by the one or more users applied to the one or more wireless mobile user communications devices, the one or more gestures to include at least one of an acceleration, a negative acceleration, a shock, or a squeeze comprises:

circuitry for receiving one or more signals, from one or more wireless mobile user communications devices, that include the one or more requests for projection.

3. The system of claim 1, wherein the circuitry for receiving one or more requests for projection comprises:

circuitry for receiving one or more requests for projection in accordance with one or more individualized user parameters.

4. The system of claim 1, wherein the circuitry for receiving one or more requests for projection comprises:

circuitry for receiving one or more requests that include information associated with designated content.

5. The system of claim 1, wherein the circuitry for receiving, from one or more wireless mobile user communications devices, one or more requests for projection, the one or more wireless mobile user communications devices being configured for sending the one or more requests for projection from one or more users, the one or more wireless mobile user communications devices including one or more sensors configured to detect and one or more user interfaces that are configured to respond to at least one of: a) an application of a pressure by the one or more users to a tactile interface on a touchscreen of the one or more wireless mobile user communications devices, or b) one or more gestures by the one or more users applied to the one or more wireless mobile user communications devices, the one or more gestures to include at least one of an acceleration, a negative acceleration, a shock, or a squeeze comprises:

circuitry for receiving via a telecommunications network, from one or more wireless mobile user communications devices, one or more requests for projection that include information associated with one or more physical characteristics that are related to a specific user detected using a sensor coupled with the wireless communications device.

6. The system of claim 1, wherein the circuitry for receiving one or more requests for projection comprises:

circuitry for receiving one or more requests that include information associated with one or more membership parameters that are related to a specific user.

7. The system of claim 1, wherein the circuitry for receiving one or more requests for projection comprises:

circuitry for receiving one or more requests that include information associated with one or more status parameters that are related to a specific user.

8. The system of claim 1, wherein the circuitry for receiving one or more requests for projection comprises:

circuitry for receiving one or more requests that include information associated with one or more privilege parameters that are related to a specific user.

9. The system of claim 1, wherein the circuitry for receiving one or more requests for projection comprises:

circuitry for receiving one or more requests that include information associated with one or more fees related to projection requested by a specific user.

10. The system of claim 1, wherein the circuitry for receiving one or more requests for projection comprises:

circuitry for receiving one or more requests that include information associated with one or more contextualized user parameters.

11. The system of claim 1, wherein the circuitry for receiving one or more requests for projection comprises:

circuitry for receiving one or more requests that include information associated with one or more contextualized projection parameters.

12. The system of claim 1, wherein the circuitry for receiving one or more requests for projection comprises:

circuitry for receiving one or more requests that include information associated with one or more financial transactions.

13. The system of claim 1, wherein the circuitry for processing the one or more requests for projection to attain one or more instructions for coordinated projection from two or more user responsive projectors comprises:

circuitry for processing one or more signals that include the one or more requests for projection to attain one or more instructions for coordinated projection from the two or more user responsive projectors.

14. The system of claim 1, wherein the circuitry for processing the one or more requests for projection to attain one or more instructions for coordinated projection from two or more user responsive projectors comprises:

circuitry for processing one or more requests related to projection in accordance with one or more individualized user parameters to attain one or more instructions for coordinated projection in accordance with the one or more individualized user parameters from the two or more user responsive projectors.

15. The system of claim 1, wherein the circuitry for processing the one or more requests for projection to attain one or more instructions for coordinated projection from two or more user responsive projectors comprises:

circuitry for processing one or more requests that include information associated with designated content to attain one or more instructions for coordinated projection of the designated content from the two or more user responsive projectors.

16. The system of claim 1, wherein the circuitry for processing the one or more requests for projection to attain one or more instructions for coordinated projection from two or more user responsive projectors comprises:

circuitry for processing one or more requests that include information associated with one or more membership parameters that are related to a specific user to attain one or more instructions for coordinated projection in accordance with the one or more membership parameters that are related to the specific user from the two or more user responsive projectors.

17. The system of claim 1, wherein the circuitry for processing the one or more requests for projection to attain one or more instructions for coordinated projection from two or more user responsive projectors comprises:

circuitry for processing one or more requests that include information associated with one or more status parameters that are related to a specific user to attain one or more instructions for coordinated projection in accordance with the one or more status parameters that are related to the specific user from the two or more user responsive projectors.

18. The system of claim 1, wherein the circuitry for processing the one or more requests for projection to attain one or more instructions for coordinated projection from two or more user responsive projectors comprises:

circuitry for processing one or more requests that include information associated with one or more privilege parameters that are related to a specific user to attain one or more instructions for coordinated projection in accordance with the one or more privilege parameters that are related to the specific user from the two or more user responsive projectors.

19. The system of claim 1, wherein the circuitry for processing the one or more requests for projection to attain one or more instructions for coordinated projection from two or more user responsive projectors comprises:
circuitry for processing one or more requests that include information associated with one or more fees related to projection requested by a specific user to attain one or more instructions for coordinated projection in accordance with the one or more fees related to projection requested by the specific user from the two or more user responsive projectors.

20. The system of claim 1, wherein the circuitry for processing the one or more requests for projection to attain one or more instructions for coordinated projection from two or more user responsive projectors comprises:
circuitry for processing one or more requests that include information associated with one or more contextualized user parameters to attain one or more instructions for coordinated projection in accordance with the one or more contextualized user parameters from the two or more user responsive projectors.

21. The system of claim 1, wherein the circuitry for processing the one or more requests for projection to attain one or more instructions for coordinated projection from two or more user responsive projectors comprises:
circuitry for processing one or more requests that include information associated with one or more contextualized projection parameters to attain one or more instructions for coordinated projection in accordance with the one or more contextualized projection parameters from the two or more user responsive projectors.

22. The system of claim 1, wherein the circuitry for processing the one or more requests for projection to attain one or more instructions for coordinated projection from two or more user responsive projectors comprises:
circuitry for processing one or more requests that include information associated with one or more financial transactions to attain one or more instructions for coordinated projection in accordance with the one or more financial transactions from the two or more user responsive projectors.

23. The system of claim 1, wherein the circuitry for projecting in response to the one or more instructions for coordinated projection from the two or more user responsive projectors comprises:
circuitry for projecting in response to one or more instructions for coordinated projection in accordance with one or more individualized user parameters from the two or more user responsive projectors.

24. The system of claim 1, wherein the circuitry for projecting in response to the one or more instructions for coordinated projection from the two or more user responsive projectors comprises:
circuitry for projecting in response to one or more instructions for coordinated projection of designated content from the two or more user responsive projectors.

25. The system of claim 1, wherein the circuitry for projecting in response to the one or more instructions for coordinated projection from the two or more user responsive projectors comprises:
circuitry for projecting in response to one or more instructions for coordinated projection in accordance with one or more membership parameters that are related to a specific user from the two or more user responsive projectors.

26. The system of claim 1, wherein the circuitry for projecting in response to the one or more instructions for coordinated projection from the two or more user responsive projectors comprises:
circuitry for projecting in response to one or more instructions for coordinated projection in accordance with one or more status parameters that are related to a specific user from the two or more user responsive projectors.

27. The system of claim 1, wherein the circuitry for projecting in response to the one or more instructions for coordinated projection from the two or more user responsive projectors comprises:
circuitry for projecting in response to one or more instructions for coordinated projection in accordance with one or more privilege parameters that are related to a specific user from the two or more user responsive projectors.

28. The system of claim 1, wherein the circuitry for projecting in response to the one or more instructions for coordinated projection from the two or more user responsive projectors comprises:
circuitry for projecting in response to one or more instructions for coordinated projection in accordance with one or more fees related to projection requested by a specific user from the two or more user responsive projectors.

29. The system of claim 1, wherein the circuitry for projecting in response to the one or more instructions for coordinated projection from the two or more user responsive projectors comprises:
circuitry for projecting in response to one or more instructions for coordinated projection in accordance with one or more contextualized user parameters from the two or more user responsive projectors.

30. The system of claim 1, wherein the circuitry for projecting in response to the one or more instructions for coordinated projection from the two or more user responsive projectors comprises:
circuitry for projecting in response to one or more instructions for coordinated projection in accordance with one or more contextualized projection parameters from the two or more user responsive projectors.

31. The system of claim 1, wherein the circuitry for projecting in response to the one or more instructions for coordinated projection from the two or more user responsive projectors comprises:
circuitry for projecting in response to one or more instructions for coordinated projection in accordance with one or more financial transactions from the two or more user responsive projectors.

32. The system as recited in claim 1, wherein the one or more sensors detect biometric characteristics of a user, and wherein the circuitry for receiving is configured to receive from the one or more wireless mobile user communications devices the one or more requests for projection including sensed biometric characteristics of one or more users, and wherein the circuitry for projecting in response to the one or more instructions for coordinated projection from the two or more user responsive projectors projects the first content and the second content based on the received sensed biometric characteristics.

33. The system as recited in claim 1, wherein the one or more wireless mobile user communications devices are configured to send the one or more requests for projection from the one or more users via a telecommunications network.

34. A system comprising:
    circuitry for receiving, from one or more wireless mobile user communications devices, one or more requests for projection, the one or more wireless mobile user communications devices being configured for sending the one or more requests for projection from one or more users, the one or more wireless mobile user communications devices including one or more sensors configured to detect and one or more user interfaces that are configured to respond to at least one of:
        a) an application of a pressure by the one or more users to a tactile interface on a touchscreen of the one or more wireless mobile user communications devices, or
        b) one or more gestures by the one or more users applied to the one or more wireless mobile user communications devices, the one or more gestures to include at least one of an acceleration, a negative acceleration, or a squeeze;
    circuitry for processing the one or more requests for projection to attain one or more instructions for coordinated projection from two or more user responsive projectors; and
    circuitry for projecting in response to the one or more instructions for coordinated projection from the two or more user responsive projectors, at least a first of the two or more user responsive projectors configured to project a first content and at least a second of the two or more user responsive projectors configured to project a second content, the first content to be different from the second content, wherein the circuitry for processing the one or more requests for projection to attain one or more instructions for coordinated projection from two or more user responsive projectors comprises:
        circuitry for processing one or more requests for projection that include information associated with one or more physical characteristics obtained using the one or more sensors included with the wireless communication device and that are related to a specific user to attain one or more instructions for coordinated projection in accordance with the one or more physical characteristics that are related to the specific user from the two or more user responsive projectors, the one or more physical characteristics to include at least weight.

35. A system comprising:
    circuitry for receiving, from one or more wireless mobile user communications devices, one or more requests for projection, the one or more wireless mobile user communications devices being configured for sending the one or more requests for projection from one or more users, the one or more wireless mobile user communications devices including one or more sensors configured to detect and one or more user interfaces that are configured to respond to at least one of:
        a) an application of a pressure by the one or more users to a tactile interface on a touchscreen of the one or more wireless mobile user communications devices, or
        b) one or more gestures by the one or more users applied to the one or more wireless mobile user communications devices, the one or more gestures to include at least one of an acceleration, a negative acceleration, or a squeeze;
    circuitry for processing the one or more requests for projection to attain one or more instructions for coordinated projection from two or more user responsive projectors; and
    circuitry for projecting in response to the one or more instructions for coordinated projection from the two or more user responsive projectors, at least a first of the two or more user responsive projectors configured to project a first content and at least a second of the two or more user responsive projectors configured to project a second content, the first content to be different from the second content, wherein the circuitry for projecting in response to the one or more instructions for coordinated projection from the two or more user responsive projectors comprises:
        circuitry for projecting in response to one or more instructions for coordinated projection in accordance with one or more physical characteristics that are related to a specific user from the two or more user responsive projectors, the one or more physical characteristics obtained using the one or more sensors included with the wireless communications device, the one or more physical characteristics to include at least weight.

36. A system comprising:
    means for receiving, from one or more wireless mobile user communications devices, one or more requests for projection, the one or more wireless communications devices including one or more sensors and being configured for sending the one or more requests for projection from one or more users, the one or more wireless mobile user communications devices including one or more user interfaces that are configured to respond to one or more gestures, the one or more gestures to include at least one of: a squeeze, a positive acceleration or a negative acceleration;
    means for processing the one or more requests for projection to attain one or more instructions for coordinated projection from two or more user responsive projectors, the one or more requests for projection including information associated with one or more physical characteristics obtained using the one or more sensors included with the one or more wireless communication devices and that are related to a specific user to attain one or more instructions for coordinated projection, in accordance with the one or more physical characteristics that are related to the specific user, from the two or more user responsive projectors; and
    means for projecting in response to the one or more instructions for coordinated projection from the two or more user responsive projectors, at least a first of the two or more user responsive projectors configured to project a first content and at least a second of the two or more user responsive projectors configured to project a second content, the first content to be different from the second content.

37. A system comprising:
    a non-transitory signal-bearing medium bearing:
    one or more directions for receiving, from one or more wireless mobile user communications devices, one or more requests for projection, the one or more wireless communications devices being configured for sending the one or more requests for projection from one or more users, the one or more wireless mobile user communications devices including one or more sensors configured to detect and one or more user interfaces that are configured to respond to at least one of: a) an application of a pressure by the one or more users to a tactile interface on a touchscreen of the one or more wireless mobile user communications devices, or b) one or more gestures applied to the one or more wireless mobile user communications devices, the one or more gestures including at least one of an acceleration, a negative acceleration, or a squeeze;

one or more directions for processing the one or more requests for projection to attain one or more instructions for coordinated projection from two or more user responsive projectors, the one or more requests for projection including information associated with one or more physical characteristics obtained using the one or more sensors included with the wireless communication device and that are related to a specific user to attain one or more instructions for coordinated projection, in accordance with the one or more physical characteristics that are related to the specific user, from the two or more user responsive projectors; and one or more directions for projecting in response to the one or more instructions for coordinated projection from the two or more user responsive projectors, at least a first of the two or more user responsive projectors configured to project a first content and at least a second of the two or more user responsive projectors configured to project a second content, the first content to be different from the second content.

* * * * *